(12) United States Patent
Chen et al.

(10) Patent No.: US 11,039,127 B2
(45) Date of Patent: Jun. 15, 2021

(54) VIDEO IMAGE ENCODING AND DECODING METHOD, APPARATUS, AND DEVICE

(71) Applicant: HUAWEI TECHNOLOGIES CO., LTD., Guangdong (CN)

(72) Inventors: Huanbang Chen, Shenzhen (CN); Hong Zhang, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/786,660

(22) Filed: Feb. 10, 2020

(65) Prior Publication Data

US 2020/0177877 A1    Jun. 4, 2020

Related U.S. Application Data

(63) Continuation of application No. PCT/CN2018/099512, filed on Aug. 9, 2018.

(30) Foreign Application Priority Data

Aug. 11, 2017 (CN) .......................... 201710687117.5

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11); *H04N 19/517* (2014.11)

(58) Field of Classification Search
CPC .. H04N 19/105; H04N 19/139; H04N 19/176; H04N 19/517; H04N 19/523;
(Continued)

(56) References Cited

U.S. PATENT DOCUMENTS

2005/0141616 A1    6/2005  Lim
2010/0315560 A1*  12/2010  Hahn ................... H04N 19/577
                                                          348/699
(Continued)

FOREIGN PATENT DOCUMENTS

CN        1325220 A        12/2001
CN        1961582 A         5/2007
(Continued)

OTHER PUBLICATIONS

Zhao J et al: "On Affine Motion Vectors", Joint Video Exploration Team (JVET) of ITU-T SG 16 WP 3 and ISO/IEC JTC 1/SC 29/WG 11, JVET-D0151, Oct. 2016, total 4 pages. XP030150411.
(Continued)

*Primary Examiner* — Jared Walker

(57) ABSTRACT

The present disclosure provides a video image decoding method in which a size of an affine motion compensation image sub-block in an affine image block is determined based on a motion vector difference, motion vector precision, a distance between control points in the affine image block, and a size of the affine image block, where the size includes a length in a horizontal direction and a length in a vertical direction, so that a length of the affine image block in a horizontal/vertical direction is an integer multiple of the length of the affine motion compensation image sub-block in the horizontal/vertical direction.

38 Claims, 16 Drawing Sheets

(51) Int. Cl.
*H04N 19/176* (2014.01)
*H04N 19/517* (2014.01)

(58) Field of Classification Search
CPC ...... H04N 19/54; H04N 19/119; H04N 19/13; H04N 19/52
See application file for complete search history.

(56) References Cited

U.S. PATENT DOCUMENTS

| | | |
|---|---|---|
| 2012/0039387 A1 | 2/2012 | Ha et al. |
| 2013/0301716 A1 | 11/2013 | Zheng et al. |
| 2017/0188041 A1* | 6/2017 | Li .................. H04N 19/182 |
| 2017/0332095 A1* | 11/2017 | Zou ................. H04N 19/567 |
| 2018/0070102 A1* | 3/2018 | Zhang .............. H04N 19/573 |
| 2018/0098063 A1* | 4/2018 | Chen ................ H04N 19/52 |
| 2018/0270500 A1* | 9/2018 | Li ................... H04N 19/54 |
| 2019/0335196 A1 | 10/2019 | Zhang et al. |

FOREIGN PATENT DOCUMENTS

| | | |
|---|---|---|
| CN | 102611884 A | 7/2012 |
| CN | 104539966 A | 4/2015 |
| CN | 106303543 A | 1/2017 |
| EP | 1158806 A1 | 11/2001 |
| EP | 1274254 A2 | 1/2003 |
| NO | 2016184261 A1 | 11/2016 |

OTHER PUBLICATIONS

Alshin A et al: "Description of SOR, HOR and 360° video coding technology proposal by Samsung, Huawei, GoPro, and HiSilicon", buJoint Video Exploration Team (JVET) of ITU-T SG 16 WP 3 and ISO/IEC JTC 1/SC 29/WG 11, JVET-J0024, Apr. 14, 2018 (Apr. 14, 2018), total 116 pages. XP030151190.

Li Li et al: "An Efficient Four-Parameter Affine Motion Model for Video Coding", Submitted to IEEE Transactions on Circuits and Systems for Video Technology, Feb. 21, 2017, total 14 pages. XP080747890.

Na Zhang et al., "Motion vector derivation of deformable block," Image Processing (ICIP), 2012 19th IEEE International Conference on , vol., no., pp. 1549,1552, Sep. 30, 2012-Oct. 3, 2012. pp. 1549-1552.

* cited by examiner

S730

Proportionally adjust the first horizontal distance based on a proportion of the motion vector precision to a first component of the motion vector difference, to obtain a length of the affine motion compensation image sub-block in a horizontal direction; and determine whether a length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjust the length of the affine motion compensation image sub-block in the horizontal direction, so that the length of the affine image block in the horizontal direction is an integer multiple of an adjusted length of the affine motion compensation image sub-block in the horizontal direction — S1201

Proportionally adjust the first vertical distance based on a proportion of the motion vector precision to a second component of the motion vector difference, to obtain a length of the affine motion compensation image sub-block in a vertical direction; and determine whether a length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjust the length of the affine motion compensation image sub-block in the vertical direction, so that the length of the affine image block in the vertical direction is an integer multiple of an adjusted length of the affine motion compensation image sub-block in the vertical direction — S1203

Proportionally adjust the first horizontal distance based on a proportion of the motion vector precision to a first component of the motion vector difference, to obtain a length of the affine motion compensation image sub-block in a horizontal direction; and determine whether a length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjust the length of the affine motion compensation image sub-block in the horizontal direction, so that the length of the affine image block in the horizontal direction is an integer multiple of an adjusted length of the affine motion compensation image sub-block in the horizontal direction — S1501

Proportionally adjust the first vertical distance based on a proportion of the motion vector precision to a second component of the motion vector difference, to obtain a length of the affine motion compensation image sub-block in a vertical direction; and determine whether a length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjust the length of the affine motion compensation image sub-block in the vertical direction, so that the length of the affine image block in the vertical direction is an integer multiple of an adjusted length of the affine motion compensation image sub-block in the vertical direction — S1503

FIG. 15

VIDEO IMAGE ENCODING AND DECODING METHOD, APPARATUS, AND DEVICE

CROSS-REFERENCE TO RELATED APPLICATIONS

This application is a continuation of International Application No. PCT/CN2018/099512, filed on Aug. 9, 2018, which claims priority to Chinese Patent Application No. 201710687117.5, filed on Aug. 11, 2017. The disclosures of the aforementioned applications are hereby incorporated by reference in their entireties.

TECHNICAL FIELD

The present disclosure relates to the field of video image processing, and in particular, to a video image encoding method, a video image decoding method, an video image encoding apparatus, a video image decoding apparatus, an encoding device, and a decoding device.

BACKGROUND

As internet technologies rapidly develop and peoples material and spiritual cultures are increasingly enriched, there are increasing demands on the internet for applications of videos, especially for applications of high-definition videos. However, a high-definition video has a quite large amount of data. To transmit the high-definition video on the internet with a limited bandwidth, a problem that needs to be first resolved is compression and encoding of the high-definition video. Currently, there are two international organizations dedicated to development of video coding standards: the Motion Picture Experts Group (Motion Picture Experts Group, MPEG for short) of the International Organization for Standardization (International Organization for Standardization, ISO for short)/International Electrotechnical Commission (International Electrotechnical Commission, IEC for short) and the Video Coding Experts Group (Video Coding Experts Group, VCEG for short) of the International Telecommunication Union-Telecommunication Standardization Sector (International Telecommunication Union-Telecommunication Standardization Sector, ITU-T for short). The MPEG, established in 1986, is specialized in developing related standards that are mainly applied to storage, broadcast television, streaming media on the internet or a wireless network, and the like in the multimedia field. The ITU-T mainly develops video coding standards for the field of real-time video communication, such as video phones, video conferences, or other applications.

In the past decades, video coding standards specific to various applications have been successfully developed internationally, mainly including: the MPEG-1 standard for a video compact disc (Video Compact Disc, VCD for short), the MPEG-2 standard for a digital versatile disc (Digital Video Disc, DVD for short) and digital video broadcasting (Digital Video Broadcasting, DVB for short), the H.261 standard, H.263 standard, and H.264 standard for a video conference, the MPEG-4 standard that allows encoding of an object in any shape, and the latest high efficiency video coding (High Efficiency Video Coding, HEVC for short) standard.

According to both the video coding standard H.264 and the latest video coding standard HEVC that are widely used currently, various types of encoding operations such as block-based prediction, transform, and entropy encoding are performed by using an image block as a basic unit. The image block is a two-dimensional sampling point array that may be a square array or a rectangular array. For example, an image block with a size of 4×4 may be considered as a square sampling point array including a total of 4×4, that is, 16, sampling points. As shown in FIG. 1, the image block may be denoted as B. An image block signal is a sampling value of a sampling point in the image block, and may be represented as B(x,y), x,y=0 . . . 3, where (x,y) represents coordinates of each sampling point in the image block. Similarly, an image may also be represented as a two-dimensional sampling point array, and is denoted by using a method similar to a method used for the image block. In addition, a sampling point may also be referred to as a pixel, and is to be used without distinction in this specification of the present disclosure.

A video sequence includes images arranged frame by frame. Generally, consecutive images are generated at a quite short time interval, and the images change slightly. Consequently, there is a small difference between the consecutive images. Therefore, only a difference between a current image and a reference image may be encoded based on a time correlation between the consecutive images. The reference image is usually a reconstructed encoded image whose generation time is close to that of the current image. In this way, an amount of to-be-encoded information is reduced, and a signal compression effect is achieved. In a video coding technology, this type of method is referred to as an inter-frame prediction coding technology, and the technology is widely used in current video coding standards. FIG. 2 shows an inter-frame prediction encoding architecture. A to-be-encoded image, which is usually each/each frame of image in a video, is input and is split into image blocks that do not overlap with each other. An encoder obtains a motion vector of an image block through motion estimation, and the encoder obtains, through motion compensation, a motion compensation prediction signal of the image block by using the motion vector of the image block. Then, the motion compensation prediction signal is subtracted from an original signal of the image block, to obtain a prediction residual signal. After undergoing transform, quantization, and entropy encoding, the prediction residual signal is written into a bitstream. In the encoding process, if an obtained motion compensation prediction signal of the image block is more accurate, a quantity of obtained prediction residual signals is smaller, a quantity of bits that need to be encoded is smaller, and a compression rate of the image block is higher.

The motion estimation is to find, from a reference image by using the current image block B, an image block B' that has a same size and that best matches the current image block. A location offset of the image block B relative to B' in space is referred to as the motion vector of the image block B. The motion compensation is a process of obtaining a prediction signal from the reference image based on the motion vector of the image block B. An obtained signal is referred to as the motion compensation prediction signal.

A decoder side performs dequantization and inverse transform on the prediction residual signal of the image block to obtain a reconstructed residual signal, then obtains the motion compensation prediction signal from the reference image through motion compensation prediction based on the motion vector of the image block, and may obtain a reconstructed signal of the image block by adding the motion compensation prediction signal and the reconstructed residual signal of the image block.

FIG. 3 shows split of an image block and a relationship between the image block and a motion vector. An image A(t) at a moment t is split into image blocks that have different sizes and that do not overlap with each other. An arrow in each image block schematically represents a motion vector determined by an encoder side, and a length and a direction respectively represent motion intensity and a motion direction of a current image block. A motion vector of each image block is applied to all sampling points in the image block. To be specific, a prediction signal of each image block is obtained from a specified reference image for all the sampling points in the image block based on a location offset represented by the motion vector.

Motion compensation prediction based on a block structure is friendly to the implementation in software and hardware, has low complexity, and can provide comparatively good compression efficiency when computing resources are limited. However, there are also some weaknesses. For example, in the method, one motion vector is used to indicate motions of all pixels in an image block. When all the pixels have a same motion direction and a same size, for example, in a translational motion, the method can be used to accurately indicate the motions of all the pixels. When the pixels in the image block have different motion directions or sizes, for example, in motions such as scaling and rotation, the method cannot be used to accurately indicate the motions of all the pixels. Consequently, an accurate prediction signal cannot be obtained, and compression performance is degraded.

To overcome the weaknesses of an existing motion compensation prediction technology, a motion compensation prediction technology based on a motion vector field that changes linearly is proposed. The motion vector field is a motion vector field of an image block. The image block is split into smaller subunits in certain scenario. A subunit may be as small as a pixel and as big as the original block. Each subunit has a motion vector. Motion vectors of all subunits in the image block form the motion vector field of the image block. The motion vector field of the image block may change linearly or non-linearly. That the motion vector field of the image block changes linearly means that motion vectors of adjacent subunits in the image block change evenly. If the motion vectors of the adjacent units in the image block change unevenly, the motion vector field of the image block changes non-linearly. This specification mainly focuses on the motion compensation prediction technology based on a motion vector field that varies linearly. In the document with the name Motion Vector Derivation of Deformable Block (Image Processing (ICIP), the 2012 19$^{th}$ IEEE International Conference on, pp. 1549-1552, Sep. 30, 2012 to Oct. 3, 2012) proposed by Na Zhang, Xiaopeng Fan, Debin Zhao, and Wen Gao, it is proposed that four vertexes in an image block are used as control points, and a bilinear interpolation method is performed on motion vectors of the four control points to obtain a motion vector of each 4×4 unit in the image block. The motion vectors of the four vertexes in the image block are obtained based on motion vectors of surrounding image blocks, and motion vectors of all 4×4 units form a motion vector field of the image block. Then, a motion compensation prediction signal of the image block is obtained from a reference image based on the motion vector field. In the motion compensation prediction technology based on a motion vector field, a size of a unit having an independent motion vector is decreased, non-translational motions such as rotation and scaling can be indicated more accurately, and a more accurate motion compensation prediction signal can be obtained. The foregoing motion vector field is obtained by performing bilinear interpolation on motion vectors of control points, and the motion vector field meets a bilinear model. The bilinear interpolation is a mathematical interpolation method. Referring to FIG. 4, a specific interpolation method is described as follows:

It is assumed that a value of a function $f$ at P=(x,y) needs to be calculated, and values of the function $f$ at four points $Q_{11}=(x_1,y_1)$, $Q_{12}=(x,y_2)$, $Q_{21}=(x_2,y_1)$, and $Q_{22}=(x_2,y_2)$ are already known. First, linear interpolation is performed in a direction of x, to obtain:

$$f(R_1) = \frac{x_2 - x}{x_2 - x_1} f(Q_{11}) + \frac{x - x_1}{x_2 - x_1} f(Q_{21}), R_1 = (x, y_1) \quad (1)$$
$$f(R_2) = \frac{x_2 - x}{x_2 - x_1} f(Q_{12}) + \frac{x - x_1}{x_2 - x_1} f(Q_{22}), R_1 = (x, y_2)$$

Then, linear interpolation is performed in a direction of y, to obtain:

$$f(P) \approx \frac{y_2 - y}{y_2 - y_1} f(R_1) + \frac{y - y_1}{y_2 - y_1} f(R_2) \quad (2)$$

A value at the point P can be obtained by substituting a result obtained from Formula (1) into Formula (2). Motion vectors of all points in the image block can be obtained based on the motion vectors of the control points by using the interpolation method.

In this method, the motion vector of the control point is selected based on a motion vector of a surrounding image block, and the selected motion vector may be inaccurate. If the motion vector of the control point is obtained through motion estimation and search, the motion vector of the control point needs to be written into a bitstream. In this case, a more efficient method is required, for example, an affine transform model is used, to indicate the motion vector field of the image block. Therefore, a motion compensation prediction technology based on affine transform is proposed.

The affine transform represents a mapping relationship between two spaces, and common affine transform includes rotation, scaling, and translation. The motion vector field that is of the image block and that is obtained by using the affine transform model changes linearly, and the motion vector field meets affine transform. A common 6-parameter affine transform model may represent the foregoing three motions. Specifically, as shown in Formula (3), (x,y) are coordinates of a pixel P of the affine image block in the current image, (x',y') are coordinates of a pixel P' that is in a reference image and that matches the pixel P, and a, b, c, d, e, f are affine transform parameters. If the affine transform parameters are known, the position (x',y') of the pixel P=(x,y) in the reference image can be calculated, and therefore a prediction signal of the pixel can be obtained from the reference image.

$$\begin{cases} x' = ax + by + e \\ y' = cx + dy + f \end{cases} \quad (3)$$

The affine parameter is usually calculated based on motion vectors of some pixels in the image block. The motion vector may be expressed by Formula (4):

$$\begin{cases} vx = x - x' \\ vy = y - y' \end{cases} \quad (4)$$

Formula (3) is substituted into Formula (4), to obtain:

$$\begin{cases} vx = (1-a)x - by - e \\ vy = (1-d)y - cx - f \end{cases} \quad (5)$$

Specific values of the affine transform parameters can be obtained by substituting a plurality of groups of known motion vectors, for example, three groups of known motion vectors, into Formula (5). Therefore, the motion vectors of all the points in the image block can be calculated by using Formula (3) and Formula (4). In practice, generally, a motion vector of a corner point (a control point) in an image block is first obtained through motion estimation, then an affine transform parameter is calculated based on the motion vector of the corner point, and motion vectors of all pixels in the image block are calculated. A motion vector of a corner point is shown in FIG. 5(a) and FIG. 5(b). FIG. 5(a) shows an image block X. A width of the image block is w, and a height is h. Coordinates of an upper left corner point are (0,0), and a motion vector is $\vec{v}_0 = (vx_0, vy_0)$. Coordinates of an upper right corner point are (w,0), and a motion vector is $\vec{v}_1 = (vx_1, vy_1)$ Coordinates of a lower left corner point are (0,h), and a motion vector is $\vec{v}_2 = (vx_2, vy_2)$. The following 6-parameter affine transform model may be obtained by separately substituting the three motion vectors $\vec{v}_0 = (vx_0, vy_0)$, $\vec{v}_1 = (vx_1, vy_1)$, and $\vec{v}_2 = (vx_2, vy_2)$ into Formula 5:

$$\begin{cases} vx = \frac{vx_1 - vx_0}{w}x + \frac{vx_2 - vx_0}{h}y + vx_0 \\ vy = \frac{vy_1 - vy_0}{w}x + \frac{vy_2 - vy_0}{h}y + vy_0 \end{cases} \quad (6)$$

The motion vectors of the three vertexes in the image block may be different. As shown in FIG. 5(b), a mapping relationship of the image block in a reference image is indicated by dashed lines. After the motion vectors of all the points in the image block are calculated, motion compensation prediction signals of all the points in the image block are obtained through motion compensation prediction.

In the foregoing content, the 6-parameter affine transform model is used as an example. However, the affine transform model is not limited to the 6-parameter model, and may be a 4-parameter affine transform model shown in Formulas (7) and (8), a 2-parameter scaling model shown in Formula (9), or the like. If the 4-parameter affine transform model is selected for the image block for motion compensation prediction, the affine model has four unknown parameters, and the parameters of the model can be obtained by using two groups of motion vectors. The two groups of motion vectors may be motion vectors of two corner points in the image block, or may be motion vectors of two points in the image block.

$$\begin{cases} x' = ax + by + e \\ y' = -bx + ay + f \end{cases} \quad (7)$$

$$\begin{cases} x' = ax + e \\ y' = by + f \end{cases} \quad (8)$$

$$\begin{cases} x' = ax \\ y' = by \end{cases} \quad (9)$$

Formula (3) is substituted into Formula (7), to obtain:

$$\begin{cases} v_x = (1-a)x - by + e \\ v_y = bx + (1-a)y + f \end{cases} \quad (10)$$

Coordinates of an upper left corner point are (0, 0), and a motion vector is $\vec{v}_0 = (vx_0, vy_0)$. Coordinates of an upper right corner point are (w,0), and a motion vector is $\vec{v}_1 = (vx_1, vy_1)$. The coordinates and the motion vectors of both the corner points are substituted into Formula (10), and a motion model formula for which the upper left corner point and the upper right corner point are used as control points may be obtained:

$$\begin{cases} v_x = \frac{vx_1 - vx_0}{w}x - \frac{vy_1 - vy_0}{w}y + vx_0 \\ v_y = \frac{vy_1 - vy_0}{w}x + \frac{vx_1 - vx_0}{w}y + v_{y0} \end{cases} \quad (11)$$

Coordinates of an upper left corner point are (0, 0), and a motion vector is $\vec{v}_0 = (vx_0, vy_0)$. Coordinates of a lower left corner point are (0,h), and a motion vector is $\vec{v} = (vx_2, vy_2)$. The coordinates and the motion vectors of both the corner points are substituted into Formula (10), and a motion model formula for which the upper left corner point and the lower left corner point are used as control points may be obtained:

$$\begin{cases} v_x = \frac{vy_2 - vy_0}{H}x + \frac{vx_2 - vx_0}{H}y + vx_0 \\ v_y = -\frac{vx_2 - vx_0}{H}x + \frac{vy_2 - vy_0}{H}y + v_{y0} \end{cases} \quad (12)$$

Compared with the latest video coding standard HEVC, for a video frame/image sequence including rotation and scaling motions, the motion compensation prediction technology based on a motion vector field that changes linearly can significantly improve encoding performance. The foregoing motion vector field that changes linearly includes a motion vector field generated by using an affine transform model and a motion vector field generated by using a bilinear model. The motion compensation prediction technology based on affine transform is used as an example. After an affine transform parameter of an image block is obtained, a motion vector of each point in the image block needs to be calculated, and motion compensation prediction is performed based on the motion vector of each point, to obtain a motion compensation prediction signal of each point. Because motion vectors of all pixels in the image block may be different, different operations need to be performed on the pixels based on the motion vectors. Pixel-based motion compensation prediction has high complexity. To reduce encoding/decoding complexity, in a related technology, an image block is tried to be further split into image sub-blocks, a motion vector of each image sub-block is calculated, and then a motion compensation prediction signal of each image sub-block is obtained.

However, in the related technology, sizes of the image sub-blocks are fixed. An image sub-block with an excessively small size leads to comparatively high encoding/decoding complexity, and an image sub-block with an excessively large size degrades encoding/decoding performance. Consequently, application of such an efficient encoding method is greatly limited in practice.

SUMMARY

The present disclosure provides a video image decoding method, a video image encoding method, a decoding apparatus, an encoding apparatus, a decoding device, and an encoding device. An image sub-block with an appropriate size may be selected, so that an entire image block is split into a plurality of image sub-blocks with a same size for processing, to reduce encoding/decoding complexity, and improve encoding/decoding performance.

According to a first aspect, a video image decoding method is provided, including: determining a motion vector difference of an affine image block; determining motion vector precision of the affine image block; determining a size of an affine motion compensation image sub-block in the affine image block based on the motion vector difference, the motion vector precision, a distance between control points in the affine image block, and a size of the affine image block, where the size includes a length in a horizontal direction and a length in a vertical direction, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and the control points are pixels used to determine the motion vector difference; and performing decoding processing on the affine image block based on the size of the affine motion compensation image sub-block.

In the video image decoding method provided in the first aspect of the present disclosure, the size of the affine motion compensation image sub-block is adaptively determined based on the determined two parameters, that is, the motion vector difference and the motion vector precision, and in combination with the distance between the control points in the affine image block and the size of the affine image block, so that the affine image block can be split into a plurality of affine motion compensation image sub-blocks with a same size. This can greatly reduce complexity on a decoder side and improve decoding efficiency.

Based on the first aspect of the present disclosure, a process of determining and adjusting the size of the affine motion compensation image sub-block may be specifically: proportionally adjusting the first horizontal/vertical distance based on a proportion of the motion vector precision to a first component/second component of the motion vector difference, to obtain the length of the affine motion compensation image sub-block in the horizontal/vertical direction; and determining whether the length of the affine image block in the horizontal/vertical direction is an integer multiple of the length of the affine motion compensation image sub-block in the horizontal/vertical direction, and if the length of the affine image block in the horizontal/vertical direction is not an integer multiple of the length of the affine motion compensation image sub-block in the horizontal/vertical direction, adjusting the length of the affine motion compensation image sub-block in the horizontal/vertical direction, so that the length of the affine image block in the horizontal/vertical direction is an integer multiple of an adjusted length of the affine motion compensation image sub-block in the horizontal/vertical direction. In this specific implementation, the length of the affine motion compensation image sub-block in the horizontal/vertical direction is obtained by adjusting the first horizontal/vertical distance between the control points based on a proportion relationship between the motion vector precision and the first component/second component of the motion vector difference, so that the size of the affine motion compensation image sub-block can match the motion vector precision of the affine image block. This ensures decoding quality and reduces decoding complexity.

Based on the first aspect of the present disclosure, the adjusting the length of the affine motion compensation image sub-block in the horizontal/vertical direction, so that the length of the affine image block in the horizontal/vertical direction is an integer multiple of an adjusted length of the affine motion compensation image sub-block in the horizontal/vertical direction may be specifically: adjusting, that is, increasing/decreasing, the length of the affine motion compensation image sub-block in the horizontal/vertical direction by one or more unit lengths, and then cyclically performing the foregoing solution until the length of the affine image block in the horizontal/vertical direction is an integer multiple of an adjusted length of the affine motion compensation image sub-block in the horizontal/vertical direction. The unit length is usually one unit pixel. To be specific, the length of the affine motion compensation image sub-block in the horizontal/vertical direction is adjusted, that is, increased/decreased, by 1. In addition, the foregoing adjustment may be adjusting, that is, increasing/decreasing, the length of the affine motion compensation image sub-block in the horizontal/vertical direction by a fixed step size, and the step size is an adjustment value, that is, a basic unit used for adjusting a length of the affine motion compensation image sub-block in the horizontal/vertical direction in each cycle. The step size may be any value, and is usually the foregoing one unit pixel, or may be another value such as 2.5 unit pixels. Optionally, the step size/adjustment value used in the foregoing adjustment may vary according to parity of an initial length (that is, an unadjusted length) of the affine motion compensation image sub-block in the horizontal/vertical direction. For example, when the initial length of the affine motion compensation image sub-block in the horizontal direction is an odd number, an odd step size is selected. For example, an odd quantity of unit lengths, such as one unit length, is used as the step size for the adjustment. When the initial length of the affine motion compensation image sub-block in the horizontal direction is an even number, an even step size is selected. For example, an even quantity of unit lengths is used as the step size. In this implementation, it can be ensured that the length of the affine motion compensation image sub-block in the horizontal/vertical direction can rapidly approximate to a value by which the length of the affine image block in the horizontal/vertical direction is divisible, and complexity is further reduced.

To improve efficiency and reduce an operation time, in the decoding method provided in the first aspect of the present disclosure, the length of the affine motion compensation image sub-block in the horizontal/vertical direction may be adjusted to a closest value by which the length of the affine image block in the horizontal/vertical direction is divisible.

If differences between the length of the affine motion compensation image sub-block in the horizontal/vertical direction and two adjacent values by which the length of the affine image block in the horizontal/vertical direction is divisible are equal, an adjustment may be selected according to requirements of an encoder side and a decoder side. For example, if a low latency is required, an adjustment, that is, an increase, may be selected. If high quality is required, an adjustment, that is, a decrease, is selected.

When it is determined that the length of the affine image block in the horizontal/vertical direction is not an integer multiple of the length of the affine motion compensation image sub-block in the horizontal/vertical direction, to further simplify an algorithm, a same table may be separately established on the encoder side and the decoder side, and a possible maximum length of the affine image block in the horizontal/vertical direction is split into a plurality of intervals by using an allowed minimum divisor as a start value, for example, $2^N$. An interval span is $2^{N+i}$, where $i \in (0, (\log_2 W \max)-1)$, and $W_{max}$ is the possible maximum length of the affine image block in the horizontal/vertical direction. An interval within which the length of the affine motion compensation image sub-block in the horizontal/vertical direction falls is determined, and a lower limit value or an upper limit value of the interval within which the length of the affine motion compensation image sub-block in the horizontal/vertical direction falls is used as a finally determined length of the affine motion compensation image sub-block in the horizontal/vertical direction. For a rule for obtaining the lower limit value or the upper limit value, refer to an agreement between the encoder side and the decoder side. An upper limit value or a lower limit value of an approximate interval may be explicitly indicated by using a bitstream, or may be selected in a round-off manner. By using the foregoing table, a final length of the affine motion compensation image sub-block in the horizontal/vertical direction may be determined through table lookup based on the initial length of the affine motion compensation image sub-block in the horizontal/vertical direction. Therefore, system complexity is reduced, and a calculation time is reduced.

Optionally, to further reduce calculation complexity in the solution, in the decoding method provided in the first aspect of the present disclosure, not only if the length of the affine image block in the horizontal/vertical direction is an integer multiple of the length of the affine motion compensation image sub-block in the horizontal/vertical direction is determined, but whether the length of the affine motion compensation image sub-block in the horizontal/vertical direction is an integer multiple of a preset length S that facilitates a calculation also needs to be determined. To be specific, whether the length of the affine motion compensation image sub-block in the horizontal/vertical direction meets the following two conditions needs to be determined:

(1) the length of the affine image block in the horizontal/vertical direction is an integer multiple of the length of the affine motion compensation image sub-block in the horizontal/vertical direction; and (2) the length of the affine motion compensation image sub-block in the horizontal/vertical direction is an integer multiple of the preset length S.

If the length of the affine motion compensation image sub-block in the horizontal/vertical direction does not meet the two conditions, the length of the affine motion compensation image sub-block in the horizontal/vertical direction is adjusted, so that the length of the affine motion compensation image sub-block in the horizontal/vertical direction meets the condition (1) and the condition (2). To be specific, the length of the affine image block in the horizontal/vertical direction is an integer multiple of an adjusted length of the affine motion compensation image sub-block in the horizontal/vertical direction, and the adjusted length of the affine motion compensation image sub-block in the horizontal/vertical direction is an integer multiple of the preset length. The preset length S is usually 4, or may be a value such as 8, 16, or 32, or S is equal to $2^n$, where n is zero or a positive integer. It should be noted that a value of S should not be greater than the size of the affine image block. This solution is applicable to an affine image block in any shape. When the affine image block is split according to a quadtree (Quad Tree) rule, or the size of the affine image block is 2N×2N, namely, in a shape of a square, provided that either of the foregoing determining conditions (1) and (2) is met, the other condition can be met. Therefore, only one of the determining conditions needs to be activated/applied. A sequence for determining whether the conditions (1) and (2) are met and a sequence for adjusting the length of the affine motion compensation image sub-block in the horizontal/vertical direction based on a determining result may be interchanged randomly.

In the decoding method provided in the first aspect of the present disclosure, to avoid a case in which the size of the affine motion compensation image sub-block is invalid, that is, less than an allowed minimum size but greater than the size of the affine image block, an amplitude limiting operation may be selected and performed on the length, determined in the foregoing manner, of the affine motion compensation image sub-block in the horizontal/vertical direction. To be specific, a comparison manner is used, to enable the length of the affine motion compensation image sub-block in the horizontal/vertical direction to fall within a range from a lower limit Tm/Tn to an upper limit W/H. Tm/Tn is a preset value and is usually 4, and W/H is the length of the affine image block in the horizontal/vertical direction.

Further, the decoding method provided in the first aspect of the present disclosure is applicable to an affine transform model based on three control points and an affine transform model based on two control points. In the affine transform model based on three control points, the lengths of the affine motion compensation image sub-block in the vertical direction and the horizontal direction need to be independently obtained and independently adjusted. Correspondingly, in the affine transform model based on two control points, only the length that is of the affine motion compensation image sub-block in one of the horizontal direction and the vertical direction and that needs to be independently obtained is obtained, and the length in the other direction is further deduced; and the lengths in both the directions need to be independently adjusted. When the size of the affine image block is 2N×2N of a regular square, because the lengths of the affine image block in the horizontal direction and the vertical direction are the same, only one of the lengths of the affine image block in the horizontal direction and the vertical direction needs to be determined and adjusted.

According to a second aspect, a video image encoding method is provided, mainly including: determining a motion vector difference of an affine image block; determining motion vector precision of the affine image block; determining a size of an affine motion compensation image sub-block in the affine image block based on the motion vector difference, the motion vector precision, a distance between control points in the affine image block, and a size of the affine image block, where the size includes a length in a horizontal direction and a length in a vertical direction, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and the control points are pixels used to determine the motion vector difference; and performing encoding processing on the affine image block based on the size of the affine motion compensation image sub-block.

In the video image encoding method provided in the second aspect of the present disclosure, the size of the affine motion compensation image sub-block is adaptively determined based on the determined two parameters, that is, the motion vector difference and the motion vector precision, and in combination with the distance between the control points in the affine image block and the size of the affine image, so that the affine image block can be split into a plurality of affine motion compensation image sub-blocks with a same size. This can greatly reduce complexity on an encoder side and improve encoding efficiency. The video image encoding method in the second aspect of the present disclosure includes the same core steps, that is, determining a size of an affine motion compensation image sub-block and adjusting the size of the affine motion compensation image sub-block, as the video image decoding method in the first aspect of the present disclosure, but includes the different last step. Therefore, the solutions in the video image decoding method in the first aspect of the present disclosure are also applicable to the video image encoding method in the second aspect of the present disclosure. For details, refer to the foregoing descriptions of the video image decoding method in the first aspect.

According to a third aspect, a video image decoding apparatus is provided, mainly including: a motion vector difference determining module, configured to determine a motion vector difference of an affine image block; a motion vector precision determining module, configured to determine motion vector precision of the affine image block; an image sub-block size determining module, configured to determine a size of an affine motion compensation image sub-block in the affine image block based on the motion vector difference, the motion vector precision, a distance between control points in the affine image block, and a size of the affine image block, where the size includes a length in a horizontal direction and a length in a vertical direction, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and the control points are pixels used to determine the motion vector difference; and a decoding module, configured to perform decoding processing on the affine image block based on the size of the affine motion compensation image sub-block.

The video image decoding apparatus provided in the third aspect of the present disclosure corresponds to the video image decoding method provided in the first aspect of the present disclosure, has functions of implementing all steps in the video image decoding method provided in the first aspect of the present disclosure, and can achieve same technical effects, that is, greatly reduce complexity on a decoder side and improve decoding efficiency.

According to a fourth aspect, a video image encoding apparatus is provided, mainly including: a motion vector difference determining module, configured to determine a motion vector difference of an affine image block; a motion vector precision determining module, configured to determine motion vector precision of the affine image block; an image sub-block size determining module, configured to determine a size of an affine motion compensation image sub-block in the affine image block based on the motion vector difference, the motion vector precision, a distance between control points in the affine image block, and a size of the affine image block, where the size includes a length in a horizontal direction and a length in a vertical direction, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and the control points are pixels used to determine the motion vector difference; and an encoding module, configured to perform encoding processing on the affine image block based on the size of the affine motion compensation image sub-block.

The video image encoding apparatus provided in the fourth aspect of the present disclosure corresponds to the video image encoding method provided in the second aspect of the present disclosure, has functions of implementing all steps in the video image encoding method provided in the second aspect of the present disclosure, and can achieve same technical effects, that is, greatly reduce complexity on an encoder side and improve encoding efficiency.

According to a fifth aspect, a video image decoding device is provided, including a processor and a nonvolatile memory, where the processor invokes program code stored in the memory to implement the decoding method provided in the first aspect of the present disclosure.

According to a sixth aspect, a video image encoding device is provided, including a processor and a nonvolatile memory, where the processor invokes program code stored in the memory to implement the encoding method provided in the second aspect.

Based on the foregoing technical solutions, according to the video image encoding method, the video image decoding method, the encoding apparatus, the decoding apparatus, the encoding device, and the decoding device in the embodiments of the present disclosure, the size of the affine motion compensation image sub-block is adaptively determined based on the determined two parameters, that is, the motion vector difference and the motion vector precision, and in combination with the distance between the control points in the affine image block and the size of the affine image, so that the affine image block can be split into a plurality of affine motion compensation image sub-blocks with a same size. This reduces encoding/decoding complexity and improves encoding/decoding efficiency.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following descriptions show merely some embodiments of the present disclosure, and a person of ordinary skill in the art may still derive other drawings from these accompanying drawings without creative efforts.

FIG. 12 is another schematic flowchart of a video image decoding method according to an embodiment of the present disclosure;

FIG. 15 is another schematic flowchart of a video image encoding method according to an embodiment of the present disclosure;

DESCRIPTION OF EMBODIMENTS

An objective of the present disclosure is to reduce encoding/decoding complexity while maintaining motion compensation prediction performance based on an affine transform, so that a method can be effectively practicable. In this specification, an image block that independently has an affine transform parameter is referred to as an affine image block, that is, an affine block. An image sub-block that is obtained through split from the affine image block and that is used for motion compensation prediction is referred to as an affine motion compensation (Affine Motion Compensation, Affine-MC for short) sub-image, and is denoted as an affine-MC block. A technical solution provided in the present disclosure is to adaptively split an affine block into a plurality of affine-MC blocks with a same size according to an encoding/decoding requirement. A specific method is to adaptively split, based on motion vector precision of the affine block, a motion vector of the affine block, and a distance between control points in the affine block, the affine block into the affine-MC blocks that meet the requirement.

A decoder side is used as an example below to describe solutions of the present disclosure by using specific embodiments.

Figure 1:
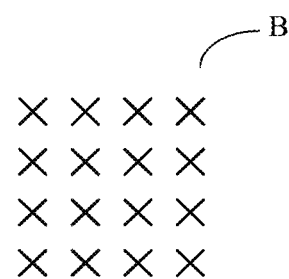
FIG. 1 is a schematic diagram of an image block in a video image encoding process.
Figure 2:
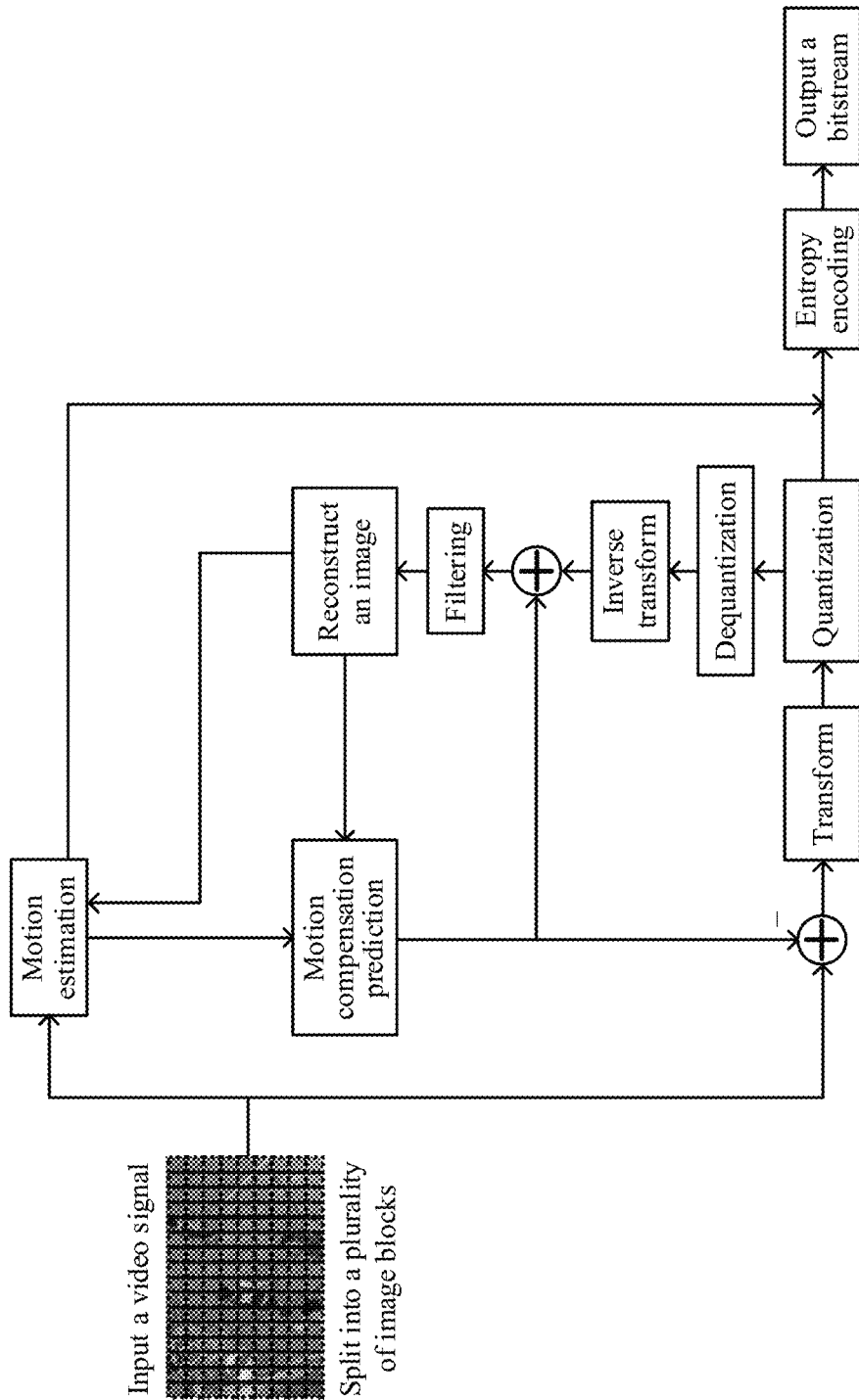
FIG. 2 is a schematic diagram of a basic video image encoding procedure.
Figure 3:
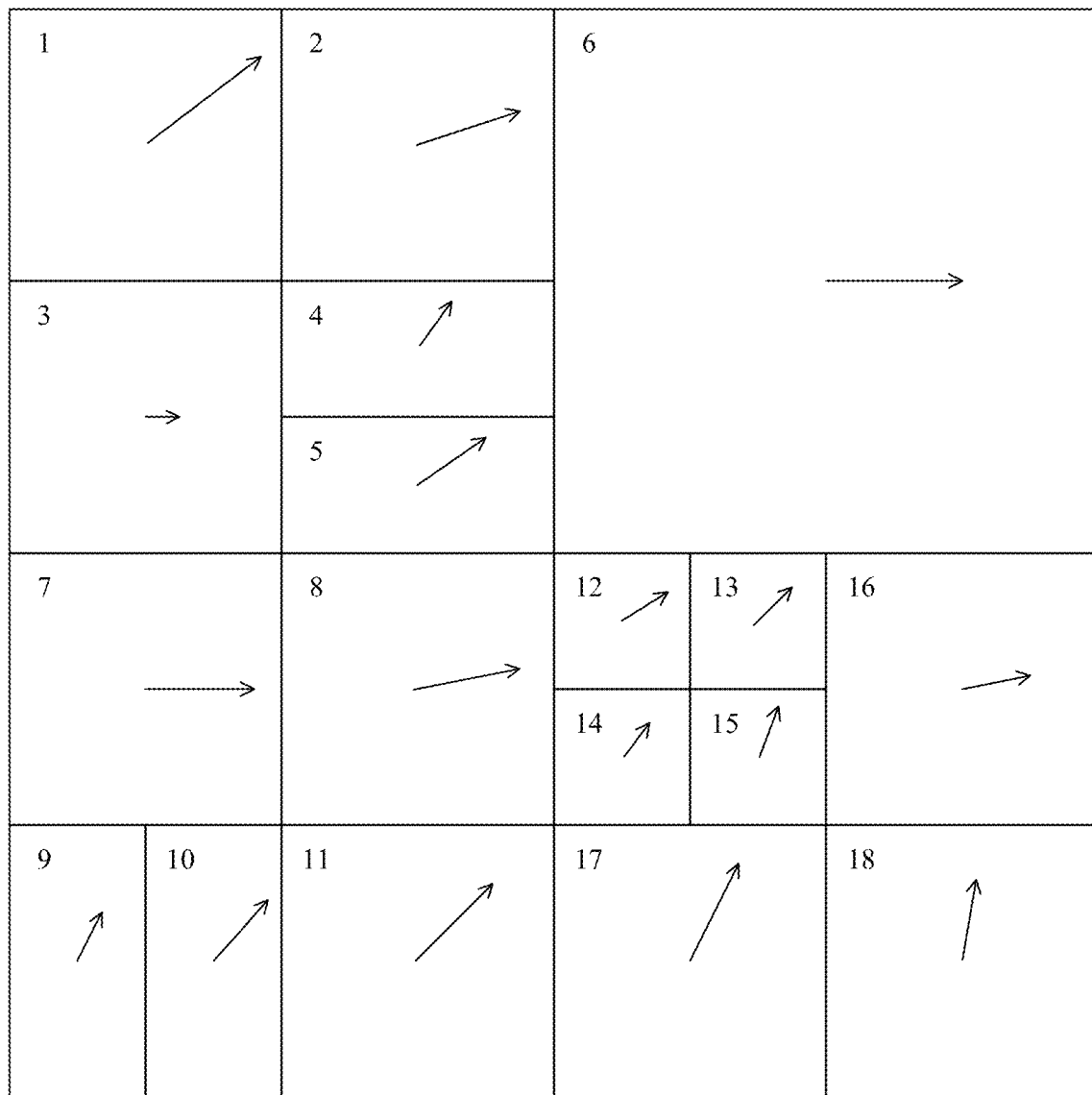
FIG. 3 is a schematic diagram of split of an image block and a relationship between the image block and a motion vector in a video image encoding process.
Figure 4:
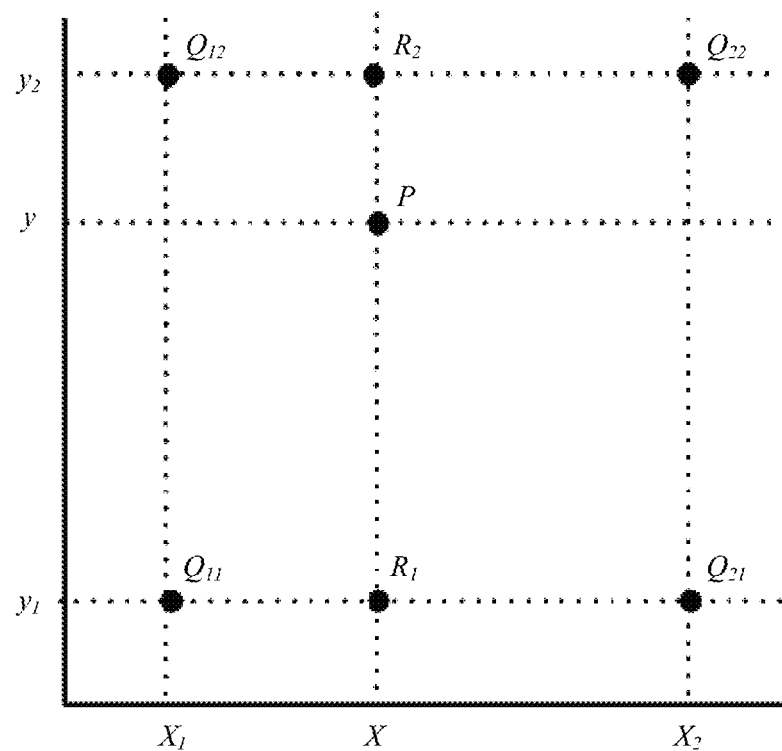
FIG. 4 is a schematic diagram of obtaining a motion vector field of an image block through bilinear interpolation.
Figure 5A:
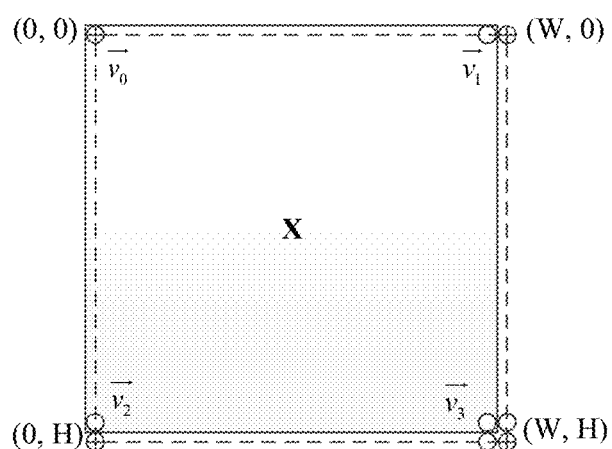
FIG. 5(a) and FIG. 5(b) are a schematic diagram of obtaining a motion vector field of an image block by using an affine transform model.
Figure 5B:
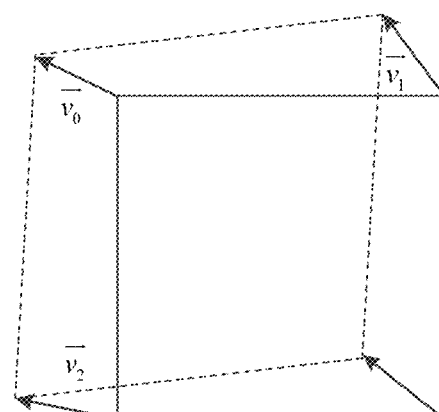
Figure 6:
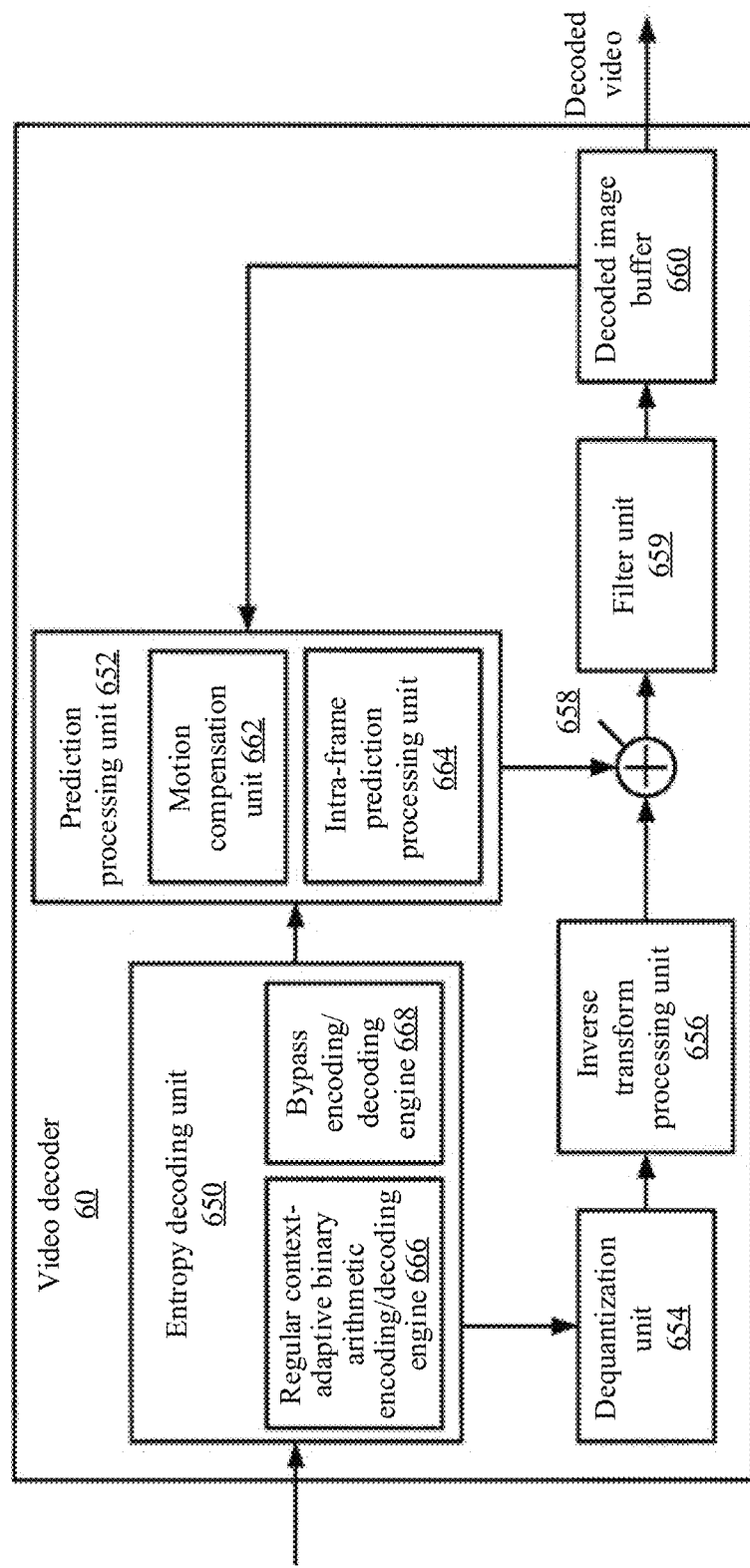
FIG. 6 is a schematic framework diagram of a video decoder used for a decoding method according to an embodiment of the present disclosure.

On the decoder side, a decoder is usually used to implement a decoding method, and decodes and reconstructs an encoded video bitstream. A basic logical structure of the decoder is shown in FIG. 6. A video decoder 60 includes an entropy decoding unit 650, a prediction processing unit 652, a dequantization unit 654, an inverse transform processing unit 656, a reconstruction unit 658, a filter unit 659, and a decoded image buffer 660. The prediction processing unit 652 includes a motion compensation unit 662 and an intra-frame prediction processing unit 664. The entropy decoding unit 650 includes a regular CABAC encoding/decoding engine 666 and a bypass encoding/decoding engine 668. In another embodiment, the video decoder 60 may include more or fewer or different function components.

A basic working process of the video decoder 60 is as follows: After receiving an encoded video bitstream (referred to as a bitstream for short below), the entropy decoding unit 650 parses the bitstream to extract a syntactic element from the bitstream. As a part of bitstream parsing, the entropy decoding unit 650 may parse out the syntactic element that is in the bitstream and on which entropy encoding has been performed. The prediction processing unit 652, the dequantization unit 654, the inverse transform processing unit 656, the reconstruction unit 658, and the filter unit 659 may decode video data based on the syntactic element extracted from the bitstream, that is, generate decoded video data. The syntactic element may include a regular CABAC encoded/decoded binary codeword and a bypass encoded/decoded binary codeword. The entropy decoding unit 650 may use the regular CABAC encoding/decoding engine 666 to decode the regular CABAC encoded/decoded binary codeword, and may use the bypass encoding/decoding engine 668 to decode the bypass encoded/decoded binary codeword.

The prediction processing unit 652 includes the motion compensation unit 662 and the intra-frame prediction processing unit 664. When inter-frame prediction encoding is used for a to-be-decoded image block, the motion compensation unit 662 may determine one or more reference blocks based on motion information of the to-be-decoded image block, and generate a predictive pixel block of the to-be-decoded image block based on the reference block. When intra-frame prediction encoding is used for the to-be-decoded image block, the intra-frame prediction processing unit 664 performs intra-frame prediction to generate a predictive pixel block of the image block. The intra-frame prediction processing unit 664 may generate the predictive pixel block of the to-be-decoded image block based on a pixel of a spatially adjacent image block by using an intra-frame prediction mode.

The reconstruction unit 658 reconstructs the predictive pixel block obtained by the prediction processing unit 652 and residual data of the to-be-decoded image block that has been processed by the dequantization unit 654 and the inverse transform processing unit 656, to obtain a reconstructed image block of the to-be-decoded image block. A frame of image that includes a plurality of image blocks is filtered by the filter unit 659, and then stored in the decoded image buffer 660. In this way, decoding of the encoded video bitstream is completed. A decoded image stored in the decoded image buffer 660 may be directly output to a display device for display, or may be used as a reference image in a subsequent bitstream decoding process.

Figure 7:
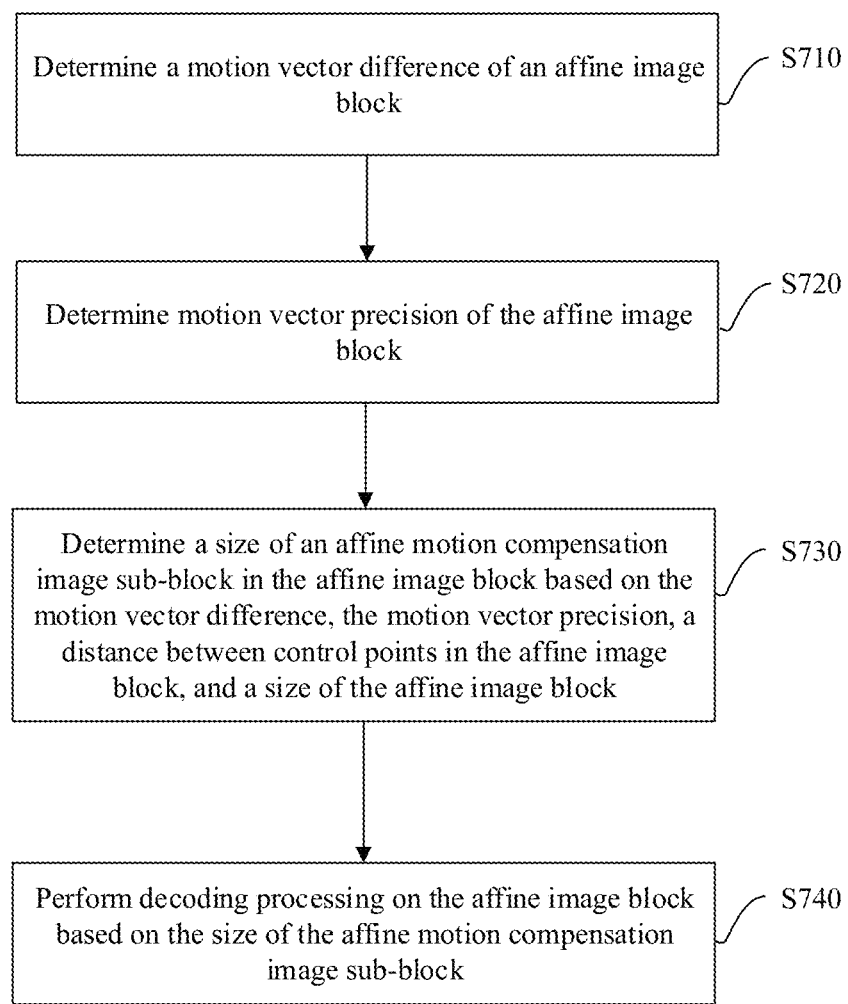
FIG. 7 is a schematic flowchart of a video image decoding method according to an embodiment of the present disclosure.

The technical solution of the present disclosure is applied to a process in which the motion compensation unit 662 performs motion compensation prediction decoding. An example decoding process is shown in FIG. 7. It should be noted that a decoding method and an encoding method in the present disclosure are essentially the same, and the decoding method is a reverse process of the encoding method. Although the decoding method is used as an example in the following, unless clearly stated, the method is basically the same as the encoding method. Therefore, in a decoding process described in the following, an explanation and a description related to encoding do not constitute any conflict or inconsistency with the solution.

FIG. 7 is a schematic flowchart of a video image decoding method according to an embodiment of the present disclosure. Specifically, as shown in FIG. 7, the method 700 includes the following steps:

S710. Determine a motion vector difference of an affine image block.

S720. Determine motion vector precision of the affine image block.

S730. Determine a size of an affine motion compensation image sub-block in the affine image block based on the motion vector difference, the motion vector precision, a distance between control points in the affine image block, and a size of the affine image block, where the size includes a length in a horizontal direction and a length in a vertical direction, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and the control points are pixels used to determine the motion vector difference.

S740. Perform decoding processing on the affine image block based on the size of the affine motion compensation image sub-block.

Specifically, a decoding/encoding device determines the motion vector difference of the affine image block based on the determined control points, determines the motion vector precision of the affine image block, and determines the size of the affine motion compensation image sub-block in the affine image block based on the determined motion vector difference and motion vector precision, the distance between the control points, and the size of the affine image block, where the size of the affine motion compensation image sub-block is a size used for splitting the affine image block, and the affine image block is split into a plurality of affine motion compensation image sub-blocks with a same size based on the split size. Then, the decoding/encoding device decodes the affine image block based on the affine motion compensation image sub-blocks. It should be noted that the affine image block is usually in a shape of a regular rectangle or square. Correspondingly, the affine motion compensation image sub-block is also in a shape of a regular rectangle or square. Therefore, after the lengths of the affine motion compensation sub-image in the horizontal direction and the vertical direction are determined, the overall size of the affine motion compensation sub-image can be determined. The horizontal direction and the vertical direction are a reference coordinate system that is commonly used in the art and is used to locate a position of an image block/an affine image block in a video image. The horizontal direction generally represents a direction of a long side of a regular rectangular video image, the vertical direction generally represents a direction of a short side of the regular rectangular video image, and the horizontal direction and the vertical direction are perpendicular to each other. Without loss of generality, the horizontal direction may be replaced with a first direction, and the vertical direction may be replaced with a second direction perpendicular to the first direction. However, for ease of description, the horizontal direction and the vertical direction are used for description in this specification. In addition, the decoding an affine image block described in the decoding method in this specification is a process of parsing out encoded data from a bitstream and reconstructing and restoring an encoded image by using an affine image block as a basic unit. Although the decoding an affine image block is used, it cannot be considered that the affine image block has been reconstructed.

By performing the video image decoding method in this embodiment of the present disclosure, the motion compensation unit 662 determines the size of the affine motion compensation image sub-block based on the determined motion vector difference and motion vector precision of the affine image block, the distance between the control points, and the size of the affine image block, splits the affine image block into a plurality of affine motion compensation sub-images with a same size based on the size of the affine motion compensation image sub-block, and then performs decoding processing. Therefore, in a decoding process, an affine motion compensation image sub-block with an appropriate size can be adaptively selected based on a change of the foregoing parameters, decoding complexity is reduced, and performance is improved.

It should be understood that, in this embodiment of the present disclosure, the affine image (Affine) block is an image block whose motion vectors of all units meet same affine models, for example, a same affine model, and that can be represented by using a same parameter or a same group of parameters. The unit is a group of pixels, for example, may be a pixel, or may be a 1×3 or 2×4 block structure or the like. This is not limited in the present disclosure. In addition, in this embodiment of the present disclosure, any non-overlapping pixels may be selected as control points to determine the motion vector difference of the affine block. This is not limited in the present disclosure.

Preferably, S710 includes:

determining a first component of the motion vector difference based on a difference between motion vectors of a first control point and a second control point that are located on a same horizontal line; and/or determining a second component of the motion vector difference based on a difference between motion vectors of a third control point and a fourth control point that are located on a same vertical line.

There is a first horizontal distance between the first control point and the second control point, and there is a first vertical distance between the third control point and the fourth control point. It should be noted that and/or in the solution included in step S710 specifically indicates the following three different technical solutions:

Solution 1: A method for determining the motion vector difference of the affine image block based on three control points includes: determining the first component of the motion vector difference based on the difference between the motion vectors of the first control point and the second control point that are located on the same horizontal line, and determining the second component of the motion vector difference based on the difference between the motion vectors of the third control point and the fourth control point that are located on the same vertical line.

Solution 2: A method for determining the motion vector difference of the affine image block based on two control points in the horizontal direction includes: determining the first component of the motion vector difference based on the difference between the motion vectors of the first control point and the second control point that are located on the same horizontal line.

Solution 3: A method for determining the motion vector difference of the affine image block based on two control points in the vertical direction includes: determining the second component of the motion vector difference based on the difference between the motion vectors of the third control point and the fourth control point that are located on the same vertical line.

It should be understood that in this embodiment of the present disclosure, the first component of the motion vector difference is a horizontal component of the motion vector difference, and the second component of the motion vector difference is a vertical component of the motion vector difference. In Solution 1, the first component of the motion vector difference and the second component of the motion vector difference jointly reflect the motion vector difference of the affine image block. However, in Solution 2 and Solution 3, the first component of the motion vector difference and the second component of the motion vector difference independently reflect the motion vector difference of the affine image block. In other words, in Solution 1, the motion vector difference of the affine image block includes the first component of the motion vector difference and the second component of the motion vector difference; in Solution 2, the motion vector difference of the affine image block includes the first component of the motion vector difference; and in Solution 3, the motion vector difference of the affine image block includes the second component of the motion vector difference. It should also be understood that in this embodiment of the present disclosure, first, second, third, and fourth are only used to distinguish between pixels and should not constitute any limitation on the protection scope of the present disclosure. For example, the first control point may also be referred to as the second control point, and the second control point may be referred to as the first control point.

Optionally, in this embodiment of the present disclosure, the first control point and the third control point are the same pixel. To be specific, three control points are selected, and one of the three control points is located on a same horizontal line as one of the other two control points, and is located on a same vertical line as the last control point.

Optionally, in this embodiment of the present disclosure, the first control point, the second control point, the third control point, and the fourth control point are vertexes of the affine block. It is assumed that four vertexes in an affine block are respectively denoted as an upper left vertex, a lower left vertex, an upper right vertex, and a lower right vertex.

In Solution 1, any three vertexes in the two orthogonal directions may be selected to determine a motion vector difference of the affine block. For example, the upper left vertex, the lower left vertex, and the upper right vertex may be selected, or the upper left vertex, the upper right vertex, and the lower right vertex may be selected.

In Solution 2, any two vertexes located on a same horizontal line may be selected to determine a motion vector difference of the affine block. For example, the upper left vertex and the upper right vertex may be selected, or the lower left vertex and the lower right vertex may be selected.

In Solution 3, any two vertexes located on a same vertical line may be selected to determine a motion vector difference of the affine block. For example, the upper left vertex and the lower left vertex may be selected, or the upper right vertex and the lower right vertex may be selected. This is not limited in the present disclosure.

Optionally, in this embodiment of the present disclosure, a difference between components that are of the motion vectors of the first control point and the second control point and that are in any one of the two directions (the horizontal direction and the vertical direction, or referred to as an x direction and a y direction) may be determined as the first component of the motion vector difference of the affine block, and a difference between components that are of the motion vectors of the third control point and the fourth control point and that are in any one of the two directions may be determined as the second component of the motion vector difference of the affine block. The manner of determining the motion vector difference is applicable to Solutions 1, 2, and 3. Alternatively, according to actual requirements for encoding complexity and encoding performance, a value between two differences between the components of the motion vectors of the first control point and the second control point in the two directions may be selected and determined as the first component, and a value between two differences between the components of the motion vectors of the third control point and the fourth control point in the two directions may be selected and determined as the second component. This is not limited in the present disclosure.

A motion vector of each of the first control point to the fourth control point usually includes two components, that is, a horizontal component and a vertical component. Therefore, in the foregoing steps, the determining a first component of the motion vector difference based on a difference between motion vectors of a first control point and a second control point that are located on a same horizontal line, and the determining a second component of the motion vector difference based on a difference between motion vectors of a third control point and a fourth control point that are located on a same vertical line may be specifically implemented in the following manner:

determining a first horizontal component difference and a first vertical component difference between the motion vectors of the first control point and the second control point, and determining a larger one of the first horizontal component difference and the first vertical component difference as the first component of the motion vector difference; and correspondingly determining a second horizontal component difference and a second vertical component difference between the motion vectors of the third control point and the fourth control point, and determining a larger one of the second horizontal component difference and the second vertical component difference as the second component of the motion vector difference.

Figure 8:
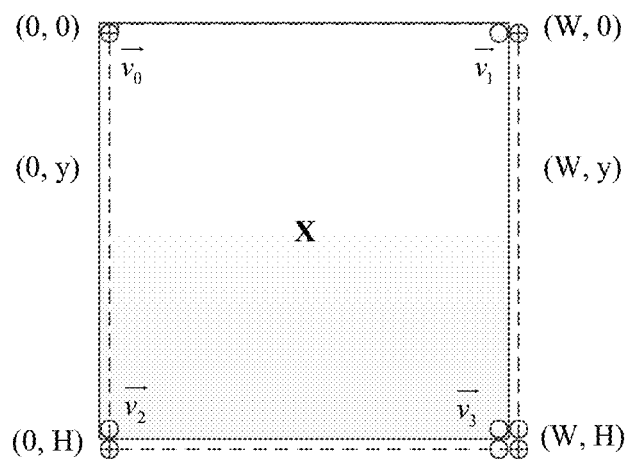
FIG. 8 is a schematic diagram of an affine image block and control points according to an embodiment of the present disclosure.

To be specific, if $vx_{(x,y)}$ and $vy_{(x,y)}$ are used to represent a horizontal component and a vertical component of a motion vector of a pixel on a position (x,y), the motion vector difference of the affine block may be determined according to Formulas (13) and (14):

$$\Delta mv_{hor} = \max(|vx_{(W,y)} - vx_{(0,y)}|, |vy_{(W,y)} - vy_{(0,y)}|) \quad (13)$$

$$\Delta mv_{ver} = \max(|vx_{(x,H)} - vx_{(x,0)}|, |vy_{(x,H)} - vy_{(x,0)}|) \quad (14)$$

max represents a maximum value, $\Delta mv_{hor}$ represents the horizontal component of the motion vector difference of the affine block, $\Delta mv_{ver}$ represents the vertical component of the motion vector difference of the affine block, W represents the first horizontal distance between the first control point and the second control point, and H represents the first vertical distance between the third control point and the fourth control point. Referring to FIG. 8, Formula (13) expresses that a motion vector horizontal difference $\Delta mv_{hor}$ is a maximum delta of components of motion vectors of two control points in a same horizontal direction, in other words, an absolute value of a motion vector difference is the largest. For example, vertexes 0 and 1 or vertexes 2 and 3 may be selected as the control points to calculate $\Delta mv_{hor}$. Formula (14) expresses that a motion vector vertical difference $\Delta mv_{ver}$ is a maximum delta of components of motion vectors of two control points in a same vertical direction, in other words, an absolute value of a motion vector difference is the largest. For example, vertexes 0 and 2 or vertexes 1 and 3 may be selected as the control points to calculate $\Delta mv_{ver}$. It may be understood that Formulas (13) and (14) are applicable to any one of Solutions 1, 2, and 3. Details are as follows:

In Solution 1, the motion vector difference of the affine image block is determined based on three control points, and the motion vector difference includes the first component and the second component. Therefore, in Solution 1, the motion vector difference of the affine image block is obtained by using a combination of Formula (13) and Formula (14).

In Solution 2, the motion vector difference of the affine image block is determined based on two control points in the horizontal direction, and the motion vector difference includes only the first component. Therefore, in Solution 2, the motion vector difference of the affine image block is obtained by using Formula (13). FIG. 8 is used as an example. In most cases, a motion vector of a vertex in the affine block is known. In this case, the motion vector difference may be directly calculated based on the motion vector of the vertex in the affine block.

If motion vectors $\vec{v}_0$ and $\vec{v}_1$ of vertexes in the affine block in FIG. 8 are known, then:

$$\Delta mv_{hor} = \max(|vx_1 - vx_0|, |vy_1 - vy_0|) \quad (15)$$

If motion vectors $\vec{v}_2$ and $\vec{v}_3$ of vertexes in the affine block in FIG. 8 are known, then:

$$\Delta mv_{hor} = \max(|vx_3 - vx_2|, |vy_3 - vy_2|) \quad (16)$$

A combination of other known motion vectors may also be selected. This is not limited in the present disclosure.

The motion vectors of the control points used in the foregoing solution may be obtained based on an affine transform model. For example, when a 4-parameter affine transform model is used, and (0,0) on an upper left corner and (W,0) on an upper right corner in the affine image block are used as the control points, a model formula is as follows:

$$\begin{cases} vx = \dfrac{vx_1 - vx_0}{W}x - \dfrac{vy_1 - vy_0}{W}y + vx_0 \\ vy = \dfrac{vy_1 - vy_0}{W}x + \dfrac{vx_1 - vx_0}{W}y + v_{y0} \end{cases} \quad (17)$$

$(vx_0,vy_0)$ and $(vx_1,vy_1)$ are respectively motion vectors of the control points on the upper left corner and the upper right corner. If coordinates (0,h) and (w,h) of control points on a lower left corner and a lower right corner are substituted into the formula, $(vx_2,vy_2)$ and $(vx_3,vy_3)$ may be obtained.

In Solution 3, the motion vector difference of the affine image block is determined based on two control points in the vertical direction, and the motion vector difference includes only the second component. Therefore, in Solution 3, the motion vector difference of the affine image block is obtained by using Formula (14). FIG. 8 is used as an example. In most cases, a motion vector of a vertex in the affine block is known. In this case, the motion vector difference may be directly calculated based on the motion vector of the vertex in the affine block.

If motion vectors $\vec{v}_0$ and $\vec{v}_2$ of vertexes in the affine block in FIG. 8 are known, then:

$$\Delta mv_{ver} = \max(|vx_2 - vx_0|, |vy_2 - vy_0|) \quad (18)$$

If motion vectors $\vec{v}_1$ and $\vec{v}_3$ of vertexes in the affine block in FIG. 8 are known, then:

$$\Delta mv_{ver} = \max(|vx_3 - vx_1|, |vy_3 - vy_1|) \quad (19)$$

A combination of other known motion vectors may also be selected. This is not limited in the present disclosure.

The motion vectors of the control points used in the foregoing solution may be obtained based on an affine transform model. For example, when a 4-parameter affine transform model is used, and (0,0) on an upper left corner and (0,H) on a lower left corner are used as the control points, a model formula is as follows:

$$\begin{cases} v_x = \dfrac{vy_2 - vy_0}{H}x + \dfrac{vx_2 - vx_0}{H}y + vx_0 \\ v_y = -\dfrac{vx_2 - vx_0}{H}x + \dfrac{vy_2 - vy_0}{H}y + v_{y0} \end{cases} \quad (20)$$

$(vx_0,vy_0)$ and $(vx_2,vy_2)$ are respectively motion vectors of the control points on the upper left corner and the lower left corner. If coordinates (w,0) and (w,h) of control points on an upper right corner and a lower right corner are substituted into the formula, $(vx_1,vy_1)$ and $(vx_3,vy_3)$ may be obtained.

Optionally, in this embodiment of the present disclosure, the motion vector difference is obtained based on an affine model, that is, the motion vector difference is obtained by determining an affine transform parameter of a pixel in the affine image block. It should be noted that pixels in the affine image block have a same affine transform parameter.

Correspondingly, the foregoing step of determining a first horizontal component difference and a first vertical component difference between the motion vectors of the first control point and the second control point is specifically: determining the first horizontal component difference and the first vertical component difference based on the affine transform parameter and the first horizontal distance; and the foregoing step of determining a second horizontal component difference and a second vertical component difference between the motion vectors of the third control point and the fourth control point is specifically: determining the second horizontal component difference and the second vertical component difference based on the affine transform parameter and the first vertical distance.

It should be understood that sequence numbers of the foregoing processes do not indicate an execution sequence. The execution sequence of the processes should be determined based on functions and internal logic of the processes, and should not constitute any limitation on the implementation processes of this embodiment of the present disclosure.

Optionally, in this embodiment of the present disclosure, the affine transform model may be a prior-art 6-parameter affine transform model, or may be a prior-art 4-parameter or 2-parameter affine transform model. The 6-parameter affine transform model is mainly applied to a scenario in Solution 1 based on three control points, and the 4-parameter affine transform model is mainly applied to scenarios in Solution 2 and Solution 3 based on two control points. The following describes a process of obtaining the motion vector difference based on an affine transform parameter by separately using the 6-parameter affine transform model and the 4-parameter affine transform model as an example.

In the 6-parameter affine transform model, it is assumed that (x,y) are coordinates of a pixel P of the current affine image block in the current image, (x',y') are coordinates of a pixel P' that is in a reference image and that matches the pixel P, and a,b,c,d,e,f are affine transform parameters. If the affine transform parameters are known, the position (x',y') of the pixel (x,y) in the reference image can be calculated, and therefore a prediction signal of the pixel can be obtained from the reference image.

$$x'=ax+by+e \tag{21}$$

$$y'=cx+dy+f \tag{22}$$

The affine transform parameter may usually be calculated based on motion vectors of some pixels in the affine image block, and a horizontal component and a vertical component of a motion vector may be expressed by Formulas (23) and (24), respectively:

$$vx=x-x' \tag{23}$$

$$vy=y-y' \tag{24}$$

Formula (21) is substituted into Formula (23), and Formula (22) is substituted into Formula (24), to obtain a horizontal component and a vertical component of a motion vector of the pixel whose coordinates are (x,y), where the horizontal component and the vertical component are expressed by Formulas (25) and (26), respectively:

$$vx=(1-a)x-by-e \tag{25}$$

$$vy=(1-d)y-cx-f \tag{26}$$

Formula (25) is substituted into Formula (13), and Formula (26) is substituted into Formula (14). In this way, Formulas (13) and (14) are transformed into Formulas (27) and (28), respectively:

$$\Delta mv_{hor}=\max(|(1-a)W|,|-cW|) \tag{27}$$

$$\Delta mv_{ver}=\max(|-bH|,|(1-d)H|) \tag{28}$$

The first component and the second component of the motion vector difference of the affine block can be determined based on the distance between the control points and by determining the affine transform parameters a, b, c, and d.

In the 4-parameter affine transform model, it is assumed that (x,y) are coordinates of a pixel P of the affine image block in the current image, (x',y') are coordinates of a pixel P' that is in a reference image and that matches the pixel P, and a, b, e, f are affine transform parameters. If the affine transform parameters are known, the position (x',y') of the pixel (x,y) in the reference image can be calculated, and therefore a prediction signal of the pixel can be obtained from the reference image:

$$\begin{cases} x' = ax+by+e \\ y' = -bx+ay+f \end{cases} \tag{29}$$

$$\begin{cases} x' = ax+e \\ y' = by+f \end{cases} \tag{30}$$

Formula (29) corresponds to the scenario in Solution 2 in which the motion vector difference of the affine image block is determined based on two control points in the horizontal direction. Formula (30) corresponds to the scenario in Solution 3 in which the motion vector difference of the affine image block is determined based on two control points in the vertical direction.

The affine transform parameters may usually be calculated based on motion vectors of some pixels in the image block. For a horizontal component and a vertical component of a motion vector, refer to Formulas (23) and (24). Formulas (29) and (30) are substituted into Formulas (23) and (24), respectively, to obtain a horizontal component and a vertical component of a motion vector of the pixel whose coordinates are (x,y), where the horizontal component and the vertical component are expressed by Formulas (31) and (32), respectively:

$$\begin{cases} vx = (1-a)x-by-e \\ vy = bx+(1-a)y-f \end{cases} \tag{31}$$

$$\begin{cases} vx = (1-a)x-e \\ vy = (1-b)y-f \end{cases} \tag{32}$$

Formulas (31) and (32) are substituted into Formulas (13) and (14). In this way, Formulas (13) and (14) are transformed into Formulas (33) and (34), respectively:

$$\Delta mv_{hor}=\max(|(1-a)W|,|bW|) \tag{33}$$

$$\Delta mv_{ver}=\max(|bH|,|(1-a)H|) \tag{34}$$

The first component or the second component of the motion vector difference of the affine block in the scenario in Solution 2 or Solution 3 can be determined based on the distance between the control points and by determining the affine transform parameters a and b.

It should be understood that a method for determining the motion vector difference when the 2-parameter affine transform model is used is essentially the same as the method for determining the motion vector difference when the 6-parameter affine transform model or the 4-parameter affine transform model is used. For brevity, details are not described herein again.

Optionally, in this embodiment of the present disclosure, in a decoding process, the affine transform parameter may be obtained by performing iterative calculation on the parameter. For example, the parameter a is increased by 1, to determine whether a motion compensation prediction signal based on the model is optimal. Alternatively, the affine transform parameter may be obtained through deduction based on an affine transform parameter of an adjacent affine block. However, this is not limited in the present disclosure.

Optionally, in this embodiment of the present disclosure, the motion vector of the first control point, the motion vector of the second control point, the motion vector of the third control point, and the motion vector of the fourth control point may be determined, to determine the motion vector difference of the affine image block.

Correspondingly, in the scenario in Solution 1, a difference between a horizontal component of the motion vector of the first control point and a horizontal component of the motion vector of the second control point is determined as the first horizontal component difference; a difference between a vertical component of the motion vector of the first control point and a vertical component of the motion vector of the second control point is determined as the first vertical component difference; a difference between a horizontal component of the motion vector of the third control point and a horizontal component of the motion vector of the fourth control point is determined as the second horizontal component difference; and a difference between a vertical component of the motion vector of the third control point and a vertical component of the motion vector of the fourth control point is determined as the second vertical component difference.

In the scenario in Solution 2, a difference between a horizontal component of the motion vector of the first control point and a horizontal component of the motion vector of the second control point is determined as the first horizontal component difference; and a difference between a vertical component of the motion vector of the first control point and a vertical component of the motion vector of the second control point is determined as the first vertical component difference.

In the scenario in Solution 3, a difference between a horizontal component of the motion vector of the third control point and a horizontal component of the motion vector of the fourth control point is determined as the second horizontal component difference; and a difference between a vertical component of the motion vector of the third control point and a vertical component of the motion vector of the fourth control point is determined as the second vertical component difference.

Specifically, the motion vectors of the control points may be directly determined, and the first component and the second component of the motion vector difference of the affine block can be directly obtained by calculating differences between components of the motion vectors.

Figure 9:
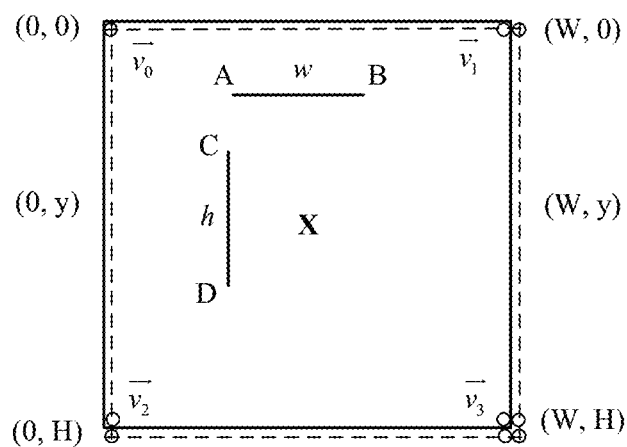
FIG. 9 is another schematic diagram of an affine image block and control points according to an embodiment of the present disclosure.

For example, FIG. 9 is a schematic diagram of an affine image block and control points according to an embodiment of the present disclosure. Two control points A and B with a distance w are located on a same horizontal line, and two control points C and D with a distance h are located on a same vertical line. If motion vectors of the control points A, B, C, and D are known, the first component and the second component of the motion vector difference of the affine block may be determined according to Formulas (35) and (36):

$$\Delta mv_{hor} = \max(vx_B - vx_A, vy_B - vy_A) \quad (35)$$

$$\Delta mv_{ver} = \max(vx_C - vx_D, vy_C - vy_D) \quad (36)$$

Optionally, in this embodiment of the present disclosure, the control points A and C may be the same pixel.

Optionally, in this embodiment of the present disclosure, the control points A, B, C, and D may be vertexes of the affine block. In this case, the distance between the control points A and B is a width W of the affine block, and the distance between the control points C and D is a height H of the affine block.

Optionally, in this embodiment of the present disclosure, the first control point and the second control point are two adjacent pixels, and the third control point and the fourth control point are two adjacent pixels. In other words, the control points are not necessarily selected from the four corner points, also referred to as vertexes, in the affine image block, but may be points that are on any positions in the affine image block and that are jointly set by an encoder side and a decoder side, explicitly indicated in a bitstream by using signaling, or obtained through estimation or duplication based on control points in a surrounding affine image block. In this case, determining the first horizontal component difference, the first vertical component difference, the second horizontal component difference, and the second vertical component difference is specifically as follows:

A motion vector of a first pixel, a motion vector of a second pixel, and a motion vector of a third pixel are determined, where the first pixel, the second pixel, and the third pixel are pixels that do not overlap with each other; a second horizontal distance and a second vertical distance between the first pixel and the second pixel are determined; a third horizontal distance and a third vertical distance between the first pixel and the third pixel are determined; and the first horizontal component difference, the first vertical component difference, the second horizontal component difference, and the second vertical component difference are determined based on the motion vector of the first pixel, the motion vector of the second pixel, the motion vector of the third pixel, the second horizontal distance, the second vertical distance, the third horizontal distance, and the third vertical distance. The foregoing is described by using Solution 1 based on three control points as an example. A difference between Solution 2 or Solution 3 based on two control points and Solution 1 based on three control points lies in: Only a first component difference or a second component difference in Solution 1 is used as the motion vector difference of the affine image block based on two control points.

Figure 10:
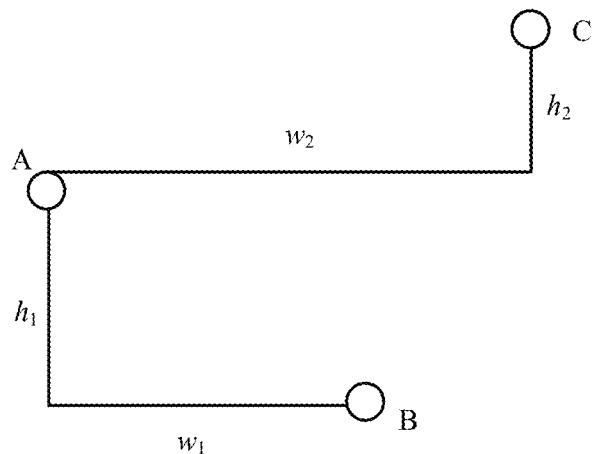
FIG. 10 is a schematic diagram of three non-overlapping pixels in an affine image block according to an embodiment of the present disclosure.

Specifically, it is assumed that A, B, and C are any three pixels in the image block that do not overlap with each other, positions of the three pixels are shown in FIG. 10, and motion vectors of the three pixels are $(vx_A, vy_A)$, $(vx_B, vy_B)$, and $(vx_C, vy_C)$, respectively. A distance between the pixel A and the pixel B in the horizontal direction is $w_1$, and a distance between the pixel A and the pixel B in the vertical direction is h. A distance between the pixel A and the pixel C in the horizontal direction is $w_2$, and a distance between the pixel A and the pixel C in the vertical direction is $h_2$. A distance between the pixel B and the pixel C in the horizontal direction is $w_2-w_1$, and a distance between the pixel B and the pixel C in the vertical direction is $h_1+h_2$. It is assumed that differences between horizontal components of motion vectors of two pixels that are adjacent in the horizontal direction are $\Delta mvx_{hor}$ and $\Delta mvy_{hor}$, respectively, and differences between vertical components of motion vectors of two pixels that are adjacent in the vertical direction are $\Delta mvx_{ver}$ and $\Delta mvy_{ver}$, respectively. Because a motion vector in the image block changes linearly, $\Delta mvx_{hor}$, $\Delta mvy_{hor}$, $\Delta mvx_{ver}$, and $\Delta mvy_{ver}$ may be determined by determining the motion vectors of the pixels A, B, and C, and a motion vector difference between the adjacent pixels in the image block can be determined. Specifically, the motion vector difference may be determined according to Formulas (37) to (40):

$$vx_B = vx_A + w_1 \cdot \Delta mvx_{hor} + h_1 \cdot \Delta mvx_{ver} \tag{37}$$

$$vy_B = vy_A + w_1 \cdot \Delta mvy_{hor} + h_1 \cdot \Delta mvy_{ver} \tag{38}$$

$$vx_C = vx_A + w_2 \cdot \Delta mvx_{hor} + h_2 \cdot \Delta mvx_{ver} \tag{39}$$

$$vy_C = vy_A + w_2 \cdot \Delta mvy_{hor} + h_2 \cdot \Delta mvy_{ver} \tag{40}$$

Alternatively, the motion vector difference may be determined according to Formulas (37) and (38) and Formulas (41) and (42):

$$vx_C = vx_B + (w_2 - w_1) \cdot \Delta mvx_{hor} + (h_2 + h_1) \cdot \Delta mvx_{ver} \tag{41}$$

$$vy_C = vy_B + (w_2 - w_1) \cdot \Delta mvy_{hor} + (h_2 + h_1) \cdot \Delta mvy_{ver} \tag{42}$$

Optionally, in this embodiment of the present disclosure, a decoding device may obtain motion vectors of all control points through motion estimation and search, may obtain the motion vectors of all the control points based on a surrounding image block, or may calculate the motion vectors of all the control points based on an affine transform model. Alternatively, the decoding device may obtain motion vectors of some control points through motion estimation and search, and obtain motion vectors of other control points based on an adjacent image block. Alternatively, the decoding device may obtain motion vectors of some control points through affine motion estimation and search, and calculate motion vectors of other control points based on an affine transform model. Alternatively, the decoding device may obtain motion vectors of some control points based on an adjacent image block, and calculate motion vectors of other control points based on an affine transform model. However, this is not limited in the present disclosure.

Optionally, in S720, a first preset value may be determined as the motion vector precision of the affine image block; or the motion vector precision of the affine image block may be determined based on a feature of an adjacent image block of the affine image block. The adjacent image block is an image block adjacent to the affine image block in space and/or in time.

Figure 11:
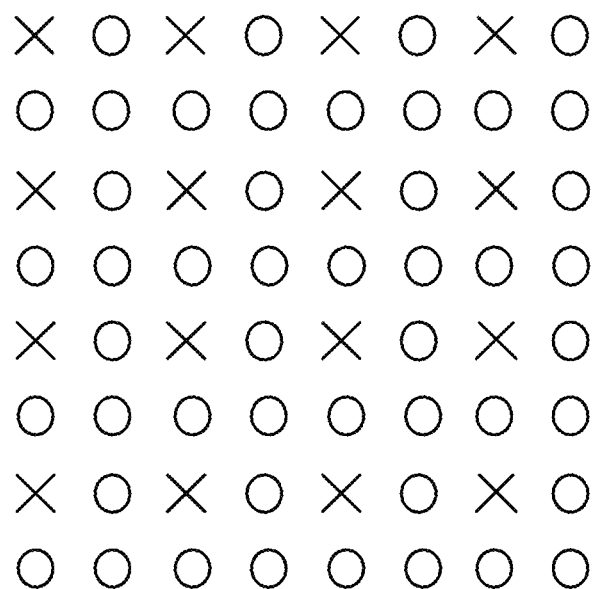
FIG. 11 is still another schematic diagram of an affine image block according to an embodiment of the present disclosure.

Specifically, a value of a motion vector of the affine block may be an integer. In this case, the motion vector precision is taken as an integer-pixel precision, that is, the pixel precision is 1. Alternatively, a value of a motion vector may not be an integer. In this case, the motion vector precision is taken as a sub-pixel precision, including precision such as ½, ¼, or ⅛. FIG. 11 shows a 4×4 image block, where x represents a pixel on an integer pixel position, and a collected image has only pixels on integer-pixel positions; and O represents a pixel on a ½ precision position, and the pixel on the ½ precision position needs to be obtained by performing interpolation on a pixel on an integer-pixel position. A value of a pixel on another precision position needs to be obtained by performing further interpolation on a pixel with integer-pixel precision or a pixel with ½ precision. If a motion vector precision of a current pixel is an integer, the current pixel points to a position of x in a reference image. If motion vector precision of the current pixel is ½, the current pixel points to a position of O in the reference image.

The motion vector precision of the affine block is the highest motion vector precision for all pixels in the affine block. The motion vector precision of the affine block may be preset, for example, integer-pixel precision, or precision such as ½, ¼, ⅛, or ¹⁄₁₆. Alternatively, the motion vector precision of the affine block may be determined based on a feature of an adjacent image block of the affine block. For example, if a surrounding image is comparatively smooth, it may be predicted that the current affine block is also smooth, and comparatively high motion vector precision, for example, precision such as ⅛ or ¹⁄₁₆, may be selected; otherwise, comparatively low motion vector precision, for example, integer-pixel precision or precision of ½, is selected. The obtained precision is denoted as MvAc.

Optionally, as shown in FIG. 12, S730 specifically includes the following steps.

S1201. Proportionally adjust the first horizontal distance based on a proportion of the motion vector precision to the first component of the motion vector difference, to obtain the length of the affine motion compensation image sub-block in the horizontal direction; and determine whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjust the length of the affine motion compensation image sub-block in the horizontal direction, so that the length of the affine image block in the horizontal direction is an integer multiple of an adjusted length of the affine motion compensation image sub-block in the horizontal direction.

Specifically, the proportion of the motion vector precision to the first component of the motion vector difference is a ratio of the motion vector precision to the first component of the motion vector difference. A product of the ratio and the first horizontal distance is the length of the affine motion compensation image sub-block in the horizontal direction, and may also be referred to as an initial length in the horizontal direction. It may be understood that the initial length of the affine motion compensation image sub-block in the horizontal direction may not be an integer in some cases. In this case, the initial length needs to be rounded. To ensure prediction precision, rounding-down is usually performed. To be specific, a decimal part is directly discarded. For example, an initial length value is 8.35 (that is, a length of 8.35 unit pixels), and 8 is directly used as the length of the affine motion compensation image sub-block in the horizontal direction. Certainly, a rounding-off principle may alternatively be used. To be specific, if a decimal part is less than 5, rounding-down is performed; and if a decimal part is greater than 5, rounding-up is performed. For example, when the length is calculated to be 8.86, 9 is used as the length. To ensure efficiency, a minimum value of the initial length should not be less than a preset value, for example, not less than a preset value such as 2, 4, 8, or $2^N$. The preset value is usually set to 4. The initial length should also not be greater than the length of the affine image block in the horizontal direction. Whether the initial length in the horizontal direction or the rounded initial length in the horizontal direction is appropriate depends on whether the length of the affine image block in the horizontal direction is divisible by the initial length. If the length of the affine image block in the horizontal direction is divisible by the initial length, it indicates that the affine image block can be split into an integer quantity of sub-blocks in the horizontal direction based on the initial length in the horizontal direction or the rounded initial length in the horizontal direction. An adjustment manner is usually a method in which the initial length in the horizontal direction or the rounded initial length in the horizontal directions is gradually increased/decreased. To be specific, if it is determined that the length of the affine image block in the horizontal direction is not an integer multiple of the length of the affine motion compensation image sub-block in the horizontal direction, the length of the affine motion compensation image sub-block in the horizontal direction is adjusted, that is, increased/decreased, by one or more unit lengths, and then the foregoing solution is cyclically performed until the length of the affine image block in the horizontal direction is an integer multiple of an adjusted length of the affine motion compensation image sub-block in the horizontal direction. The unit length is usually one unit pixel. To be specific, the length of the affine motion compensation image sub-block in the horizontal direction is adjusted, that is, increased/decreased, by 1. Without loss of generality, in other words, the length of the affine motion compensation image sub-block in the horizontal direction is adjusted, that is, increased/decreased, by a fixed step size. The step size is an adjustment value, that is, a basic unit or an amplitude used for adjusting the length of the affine motion compensation image sub-block in the horizontal direction in each cycle. The step size is usually the foregoing one unit pixel, or may be another value, for example, two pixel units. Optionally, the step size/adjustment value used in the foregoing adjustment may vary according to parity of the initial length of the affine motion compensation image sub-block in the horizontal direction. For example, when the initial length of the affine motion compensation image sub-block in the horizontal direction is an odd number, an odd step size is selected. For example, an odd quantity of unit lengths, such as one unit length, is used as the step size for the adjustment. When the initial length of the affine motion compensation image sub-block in the horizontal direction is an even number, an even step size is selected. For example, an even quantity of unit lengths is used as the step size.

In addition, whether the adjustment is an increase or a decrease may be selected according to an agreement between the decoder side and the encoder side, may be explicitly indicated by the encoder side in a bitstream and selected by the decoder side based on the explicit indication, may be deduced by using a motion vector precision value of a surrounding adjacent block, or may be determined based on a ratio relationship between the length of the affine image block in the horizontal direction and the length of the affine motion compensation image sub-block in the horizontal direction. For example, if the ratio is less than a threshold, the decrease is selected; otherwise, the increase is selected.

To simplify an algorithm and ensure encoding and decoding efficiency, if it is determined that the length of the affine image block in the horizontal direction is not an integer multiple of the length of the affine motion compensation image sub-block in the horizontal direction, the length of the affine motion compensation image sub-block in the horizontal direction is adjusted, that is, increased, by one preset unit length, and then the foregoing solution is cyclically performed until the length of the affine image block in the horizontal direction is an integer multiple of an adjusted length of the affine motion compensation image sub-block in the horizontal direction.

In addition, to improve efficiency and reduce an operation time, the length of the affine motion compensation image sub-block in the horizontal direction may be adjusted to a closest value by which the length of the affine image block in the horizontal direction is divisible. For example, the length of the affine motion compensation image sub-block in the horizontal direction is 7, while the length of the affine image block in the horizontal direction is 16. In this case, the length of the affine motion compensation image sub-block in the horizontal direction is increased by 1 to change to 8 by which 16 is divisible. Likewise, if the length of the affine motion compensation image sub-block in the horizontal direction is 5, the length of the affine motion compensation image sub-block in the horizontal direction is decreased by 1 to change to 4 by which 16 is divisible. If differences between the length of the affine motion compensation image sub-block in the horizontal direction and two adjacent values by which the length of the affine image block in the horizontal direction is divisible are equal, for example, the length of the affine motion compensation image sub-block in the horizontal direction is 6, the length of the affine image block in the horizontal direction is 16, and two values that are adjacent to the length 6 and by which 16 is divisible are 4 and 8, respectively, an adjustment may be selected according to requirements of the encoder side and the decoder side. For example, if a low latency is required, an adjustment, that is, an increase, may be selected. If high quality is required, an adjustment, that is, a decrease, is selected. This is not limited in the present disclosure.

In addition, in step S1201, when it is determined that the length of the affine image block in the horizontal direction is not an integer multiple of the length of the affine motion compensation image sub-block in the horizontal direction, to further simplify the algorithm, a same table may be separately established on the encoder side and the decoder side, and a possible maximum length of the affine image block in the horizontal direction is split into a plurality of intervals by using an allowed minimum divisor as a start value, for example, $2^N$. An interval span is $2^{N+i}$, where $i \in (0, (\log_2 W_{max})-1)$, and $W_{max}$ is the possible maximum length of the affine image block in the horizontal direction. An interval within which the length of the affine motion compensation image sub-block in the horizontal direction falls is determined, and a lower limit value or an upper limit value of the interval within which the length of the affine motion compensation image sub-block in the horizontal direction falls is used as a finally determined length of the affine motion compensation image sub-block in the horizontal direction. For a rule for obtaining the lower limit value or the upper limit value, refer to an agreement between the encoder side and the decoder side. An upper limit value or a lower limit value of an approximate interval may be explicitly indicated by using a bitstream, or may be selected in a round-off manner. By using the foregoing table, the final length of the affine motion compensation image sub-block in the horizontal direction may be determined through table lookup based on the initial length of the affine motion compensation image sub-block in the horizontal direction. Therefore, the step of adjusting the length of the affine motion compensation image sub-block in the horizontal direction in step S1201 can be replaced, system complexity is reduced, and a calculation time is reduced.

Optionally, to further reduce calculation complexity in the solution, in step S1201, not only if the length of the affine image block in the horizontal direction is an integer multiple of the length of the affine motion compensation image sub-block in the horizontal direction is determined, but whether the length of the affine motion compensation image sub-block in the horizontal direction is an integer multiple of a preset length S that facilitates a calculation also needs to be determined. To be specific, whether the length of the affine motion compensation image sub-block in the horizontal direction meets the following conditions needs to be determined:

(1) The length of the affine image block in the horizontal direction is an integer multiple of the length of the affine motion compensation image sub-block in the horizontal direction; and (2) the length of the affine motion compensation image sub-block in the horizontal direction is an integer multiple of the preset length S.

If the length of the affine motion compensation image sub-block in the horizontal direction does not meet the two conditions, the length of the affine motion compensation image sub-block in the horizontal direction is adjusted, so that the length of the affine motion compensation image sub-block in the horizontal direction meets the condition (1) and the condition (2). To be specific, the length of the affine image block in the horizontal direction is an integer multiple of an adjusted length of the affine motion compensation image sub-block in the horizontal direction, and the adjusted length of the affine motion compensation image sub-block in the horizontal direction is an integer multiple of the preset length. The preset length S is usually 4, or may be a value such as 8, 16, or 32. In other words, $S=2^n$, where n is zero or a positive integer. This solution is applicable to an affine image block in any shape. When the affine image block is split according to a quadtree (Quad Tree) rule, provided that either of the foregoing determining conditions (1) and (2) is met, the other condition can be met. Therefore, only one of the determining conditions needs to be activated/applied. A sequence for determining whether the conditions (1) and (2) are met and a sequence for adjusting the length of the affine motion compensation image sub-block in the horizontal direction based on a determining result may be interchanged randomly. For distinguishing, an adjustment performed for a first time may be referred to as a first adjustment, and an adjustment performed for a second time (if necessary) may be referred to as a readjustment.

Optionally, an amplitude limiting operation needs to be performed on the length that is of the affine motion compensation image sub-block in the horizontal direction and that is determined in the foregoing manner. To be specific, a comparison manner is used, to enable M to fall within a range from a lower limit Tm to an upper limit W. Tm is a preset value and is usually 4, and W is the length of the affine image block in the horizontal direction.

S1203. Proportionally adjust the first vertical distance based on a proportion of the motion vector precision to the second component of the motion vector difference, to obtain the length of the affine motion compensation image sub-block in the vertical direction; and determine whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjust the length of the affine motion compensation image sub-block in the vertical direction, so that the length of the affine image block in the vertical direction is an integer multiple of an adjusted length of the affine motion compensation image sub-block in the vertical direction.

Specifically, the proportion of the motion vector precision to the second component of the motion vector difference is a ratio of the motion vector precision to the second component of the motion vector difference. A product of the ratio and the first vertical distance is the length of the affine motion compensation image sub-block in the vertical direction, and may also be referred to as an initial length in the vertical direction. It may be understood that the initial length of the affine motion compensation image sub-block in the vertical direction may not be an integer in some cases. In this case, the initial length needs to be rounded. To ensure precision, rounding-down is usually performed. To be specific, a decimal part is directly discarded. For example, an initial length value is 8.35 (that is, a length of 8.35 unit pixels), and 8 is directly used as the length of the affine motion compensation image sub-block in the vertical direction. Certainly, a rounding-off principle may alternatively be used. To be specific, if a decimal part is less than 5, rounding-down is performed; and if a decimal part is greater than 5, rounding-up is performed. For example, when the length is calculated to be 8.86, 9 is used as the length. To ensure efficiency, a minimum value of the initial length should not be less than a preset value, for example, not less than a preset value such as 2, 4, 8, or $2^N$. The preset value is usually set to 4. The initial length should also not be greater than the length of the affine image block in the vertical direction. Whether the initial length in the vertical direction or the rounded initial length in the vertical direction is appropriate depends on whether the length of the affine image block in the vertical direction is divisible by the initial length. If the length of the affine image block in the vertical direction is divisible by the initial length, it indicates whether the affine image block can be split into an integer quantity of sub-blocks in the vertical direction based on the initial length in the vertical direction or the rounded initial length in the vertical direction. An adjustment manner is usually a method in which the initial length in the vertical direction or the rounded initial length in the vertical direction is gradually increased/decreased. To be specific, if it is determined that the length of the affine image block in the vertical direction is not an integer multiple of the length of the affine motion compensation image sub-block in the vertical direction, the length of the affine motion compensation image sub-block in the vertical direction is adjusted, that is, increased/decreased, by one or more unit lengths, and then the foregoing solution is cyclically performed until the length of the affine image block in the vertical direction is an integer multiple of an adjusted length of the affine motion compensation image sub-block in the vertical direction. The unit length is usually one unit pixel. To be specific, the length of the affine motion compensation image sub-block in the vertical direction is adjusted, that is, increased/decreased, by 1. Without loss of generality, in other words, the length of the affine motion compensation image sub-block in the vertical direction is adjusted, that is, increased/decreased, by a fixed step size. The step size is an adjustment value, that is, a basic unit or an amplitude used for adjusting the length of the affine motion compensation image sub-block in the vertical direction in each cycle. The step size is usually the foregoing one unit pixel, or may be another value, for example, two pixel units. Optionally, the step size/adjustment value used in the foregoing adjustment may vary according to parity of the initial length of the affine motion compensation image sub-block in the vertical direction. For example, when the initial length of the affine motion compensation image sub-block in the vertical direction is an odd number, an odd step size is selected. For example, an odd quantity of unit lengths, such as one unit length, is used as the step size for the adjustment. When the initial length of the affine motion compensation image sub-block in the vertical direction is an even number, an even step size is selected. For example, an even quantity of unit lengths is used as the step size.

In addition, whether the adjustment is an increase or a decrease may be selected according to an agreement between the decoder side and the encoder side, may be explicitly indicated by the encoder side in a bitstream and selected by the decoder side based on the explicit indication, may be deduced by using a motion vector precision value of a surrounding adjacent block, or may be determined based on a ratio relationship between the length of the affine image block in the vertical direction and the length of the affine motion compensation image sub-block in the vertical direction. For example, if the ratio is less than a threshold, the decrease is selected; otherwise, the increase is selected.

To simplify an algorithm and ensure encoding and decoding efficiency, if it is determined that the length of the affine image block in the vertical direction is not an integer multiple of the length of the affine motion compensation image sub-block in the vertical direction, the length of the affine motion compensation image sub-block in the vertical direction is adjusted, that is, increased, by one preset unit length, and then the foregoing solution is cyclically performed until the length of the affine image block in the vertical direction is an integer multiple of an adjusted length of the affine motion compensation image sub-block in the vertical direction.

In addition, to improve efficiency and reduce an operation time, the length of the affine motion compensation image sub-block in the vertical direction may be adjusted to a closest value by which the length of the affine image block in the vertical direction is divisible. For example, the length of the affine motion compensation image sub-block in the vertical direction is 7, while the length of the affine image block in the vertical direction is 16. In this case, the length of the affine motion compensation image sub-block in the vertical direction is increased by 1 to change to 8 by which 16 is divisible. Likewise, if the length of the affine motion compensation image sub-block in the vertical direction is 5, the length of the affine motion compensation image sub-block in the vertical direction is decreased by 1 to change to 4 by which 16 is divisible. If differences between the length of the affine motion compensation image sub-block in the vertical direction and two adjacent values by which the length of the affine image block in the vertical direction is divisible are equal, for example, the length of the affine motion compensation image sub-block in the vertical direction is 6, the length of the affine image block in the vertical direction is 16, and two values that are adjacent to the length 6 and by which 16 is divisible are 4 and 8, respectively, an adjustment may be selected according to requirements of the encoder side and the decoder side. For example, if a low latency is required, an adjustment, that is, an increase, may be selected. If high quality is required, an adjustment, that is, a decrease, is selected. This is not limited in the present disclosure.

In addition, in step S1203, when it is determined that the length of the affine image block in the vertical direction is not an integer multiple of the length of the affine motion compensation image sub-block in the vertical direction, to further simplify the algorithm, a same table may be separately established on the encoder side and the decoder side, and a possible maximum length of the affine image block in the vertical direction is split into a plurality of intervals by using an allowed minimum divisor as a start value, for example, $2^N$. An interval span is $2^{N+i}$, where $i \in (0, (\log_2 W_{max})-1)$, and $W_{max}$ is the possible maximum length of the affine image block in the vertical direction. An interval within which the length of the affine motion compensation image sub-block in the vertical direction falls is determined, and a lower limit value or an upper limit value of the interval within which the length of the affine motion compensation image sub-block in the vertical direction falls is used as a finally determined length of the affine motion compensation image sub-block in the vertical direction. For a rule for obtaining the lower limit value or the upper limit value, refer to an agreement between the encoder side and the decoder side. An upper limit value or a lower limit value of an approximate interval may be explicitly indicated by using a bitstream, or may be selected in a round-off manner. By using the foregoing table, the final length of the affine motion compensation image sub-block in the vertical direction may be determined through table lookup based on the initial length of the affine motion compensation image sub-block in the vertical direction. Therefore, the step of adjusting the length of the affine motion compensation image sub-block in the vertical direction in step S1203 can be replaced, system complexity is reduced, and a calculation time is reduced.

Optionally, to further reduce calculation complexity in the solution, in step S1203, not only if the length of the affine image block in the vertical direction is an integer multiple of the length of the affine motion compensation image sub-block in the vertical direction is determined, but whether the length of the affine motion compensation image sub-block in the vertical direction is an integer multiple of the preset length S that facilitates a calculation also needs to be determined. To be specific, whether the length of the affine motion compensation image sub-block in the vertical direction meets the following conditions needs to be determined:

(1) The length of the affine image block in the vertical direction is an integer multiple of the length of the affine motion compensation image sub-block in the vertical direction; and (2) the length of the affine motion compensation image sub-block in the vertical direction is an integer multiple of the preset length S.

If the length of the affine motion compensation image sub-block in the vertical direction does not meet the two conditions, the length of the affine motion compensation image sub-block in the vertical direction is adjusted, so that the length of the affine motion compensation image sub-block in the vertical direction meets the condition (1) and the condition (2). To be specific, the length of the affine image block in the vertical direction is an integer multiple of an adjusted length of the affine motion compensation image sub-block in the vertical direction, and the adjusted length of the affine motion compensation image sub-block in the vertical direction is an integer multiple of the preset length. The preset length S is usually 4, or may be a value such as 8, 16, or 32. In other words, $S=2^n$, where n is zero or a positive integer. This solution is applicable to an affine image block in any shape. When the affine image block is split according to a quadtree (Quad Tree) rule, provided that either of the foregoing determining conditions (1) and (2) is met, the other condition can be met. Therefore, only one of the determining conditions needs to be activated/applied. A sequence for determining whether the conditions (1) and (2) are met and a sequence for adjusting the length of the affine motion compensation image sub-block in the horizontal direction based on a determining result may be interchanged randomly. For distinguishing, an adjustment performed for a first time may be referred to as a first adjustment, and an adjustment performed for a second time (if necessary) may be referred to as a readjustment.

The foregoing steps S1201 and S1203 are applicable to the scenario in Solution 1 based on three control points. In the scenario based on three control points, the lengths of the affine motion compensation image sub-blocks in the horizontal direction and the vertical direction are separately calculated. For the scenarios in Solution 2 and Solution 3 based on two control point, only step S1201 or step S1203 may be performed to independently calculate the length of the affine motion compensation image sub-block in the horizontal direction or the length of the affine motion compensation image sub-block in the vertical direction. Then, the length of the affine motion compensation image sub-block in the horizontal/vertical direction or the adjusted length of the affine motion compensation image sub-block in the horizontal/vertical direction is used as an initial length of the affine motion compensation image sub-block in the other direction, that is, in the vertical/horizontal direction, and the foregoing determining is separately performed, that is:

determining whether the length of the affine image block in the vertical/horizontal direction is an integer multiple of the length of the affine motion compensation image sub-block in the vertical/horizontal direction; or determining whether the length of the affine image block in the vertical/horizontal direction is an integer multiple of the length of the affine motion compensation image sub-block in the vertical/horizontal direction, and determining whether the length of the affine motion compensation image sub-block in the vertical/horizontal direction is an integer multiple of the preset length S.

In the scenarios of Solution 2 and Solution 3 based on two control points, according to a requirement, only the length of the affine motion compensation image sub-block in the horizontal direction may be calculated for the three control points scenario, or only the length of the affine motion compensation image sub-block in the vertical direction may be calculated; and the other size component of the affine motion compensation image sub-block is deduced or calculated based on one obtained size component, that is, the length in the horizontal direction or the length in the vertical direction. It may be understood that when the size of the affine image block is in a shape of a regular 2N×2N square, because the lengths of the affine image block in the horizontal direction and the vertical direction are the same, only one of the lengths of the affine image block in the horizontal direction and the vertical direction needs to be determined.

Optionally, an amplitude limiting operation needs to be performed on the length that is of the affine motion compensation image sub-block in the vertical direction and that is determined in the foregoing manner. To be specific, a comparison manner is used, to enable M to fall within a range from a lower limit Tm to an upper limit W. Tm is a preset value and is usually 4, and W is the length of the affine image block in the vertical direction.

Specifically, the obtained motion vector differences $\Delta mv_{hor}$ and $\Delta mv_{ver}$ are usually comparatively small, indicating that precision of a motion vector of each pixel is excessively high, for example, $\frac{1}{32}$ or $\frac{1}{64}$. Excessively high motion vector precision contributes little to compression performance of a video, and causes a huge amount of calculation. Therefore, the affine block is split into a plurality of affine-MC blocks based on the previously obtained expected motion vector precision MvAc, to ensure that motion vector precision of each affine-MC block reaches MvAc. A smaller value of $\Delta mv_{hor}$ and $\Delta mv_{ver}$ is not less than MvAc.

Optionally, in this embodiment of the present disclosure, it is assumed that the horizontal distance between the first control point and the second control point is W, and the vertical distance between the third control point and the fourth control point is H, and it is assumed that a width of the affine-MC block is aMcW or is denoted as M, and a height is aMcH or is denoted as N.

In the scenario in Solution 1, determining the motion vector difference of the affine image block based on three control points and obtaining the size of the affine motion compensation image sub-block may be implemented by using the following Formula (43), that is, M and N are determined according to Formula (43) or (44):

$$\frac{\Delta mv_{hor}}{W} = \frac{MvAc}{aMcW}, \text{ and } \frac{\Delta mv_{ver}}{H} = \frac{MvAc}{aMcH} \quad (43)$$

or $$\frac{\Delta mv_{hor}}{W} = \frac{MvAc}{M}, \text{ and } \frac{\Delta mv_{ver}}{H} = \frac{MvAc}{N} \quad (44)$$

This is equivalent to:

$$\begin{cases} \text{If } \Delta mv_{hor} \neq 0, M = \frac{MvAc}{\Delta mv_{hor}} \times W; \text{ If } \Delta mv_{hor} = 0, M = W \\ \text{If } \Delta mv_{ver} \neq 0, N = \frac{MvAc}{\Delta mv_{ver}} \times H; \text{ If } \Delta mv_{ver} = 0, N = H \end{cases} \quad (45)$$

In the scenario in Solution 2, determining the motion vector difference of the affine image block based on two control points in the horizontal direction and obtaining the size of the affine motion compensation image sub-block may be implemented by using the following Formula (46), that is, M and N are determined according to Formula (46):

$$\frac{\Delta mv_{hor}}{W} = \frac{MvAc}{M} = \frac{MvAc}{N} \quad (46)$$

This is equivalent to:

$$\text{If } \Delta mv_{hor} \neq 0, M = N = \frac{MvAc}{\Delta mv_{hor}} \times W; \quad (47)$$

$$\text{If } \Delta mv_{hor} = 0, M = N = W$$

In the scenario in Solution 3, determining the motion vector difference of the affine image block based on two control points in the vertical direction and obtaining the size of the affine motion compensation image sub-block may be implemented by using the following Formula (48), that is, M and N are determined according to Formula (48):

$$\frac{\Delta mv_{ver}}{H} = \frac{MvAc}{M} = \frac{MvAc}{N} \quad (48)$$

This is equivalent to:

$$\text{If } \Delta mv_{ver} \neq 0, M = N = \frac{MvAc}{\Delta mv_{ver}} \times H; \quad (49)$$

$$\text{If } \Delta mv_{ver} = 0, M = N = H$$

After M and N are calculated according to Formulas (45), (47), and (49), to simplify an algorithm, whether M and N facilitate an operation, namely, whether the affine image block with a width W and a height H can be evenly split into an integer quantity of affine motion compensation image sub-blocks, needs to be further determined. To be specific, whether W is divisible by M and whether H is divisible by N need to be determined. If W is indivisible by M and/or H is indivisible by N, the value by which W and/or H is indivisible, that is, M and/or N, is adjusted, so that W is divisible by M, H is divisible by N, and M and N meet Tm≤M≤W and Tn≤N≤H.

An adjustment method may be as follows:

(1) When W is indivisible by M, M is gradually decreased/increased until W is divisible by M. When H is indivisible by N, N is gradually decreased/increased until H is divisible by N. When M=N, only either of M and N needs to be adjusted.

Optionally, an upper limit and a lower limit of M and an upper limit and a lower limit of N are limited, so that Tm≤M≤W, Tn≤N≤H, and Tm and Tn are usually set to 4.

(2) A table lookup manner is used: In a constructed two-dimensional table, W and M are input, and M that meets the condition is output; and H and N are input, and N that meets the condition is output.

Optionally, after M and N are calculated according to Formulas (45), (47), and (49), M and N are further adjusted, so that W is divisible by M, H is divisible by N, and M and N each are a multiple of S, and meet Tm≤M≤W, and Tn≤N≤H.

An adjustment method may be as follows:

(1) When W is indivisible by M or M is not a multiple of S, M is gradually decreased until W is divisible by M and M is a multiple of S. When H is indivisible by N or N is not a multiple of S, N is gradually decreased until H is divisible by N and N is a multiple of S. S is usually set to 4. When M=N, only either of M and N needs to be adjusted.

Optionally, an upper limit and a lower limit of M and an upper limit and a lower limit of N are limited, so that Tm≤M≤W, Tn≤N≤H, and Tm and Tn are usually set to 4.

(2) A table lookup manner is used: In a constructed two-dimensional table, W and M are input, and M that meets the condition is output; and H and N are input, and N that meets the condition is output.

Specifically, the foregoing solutions may be implemented by using the following example algorithm code in Table 1.

TABLE 1

| | |
|---|---|
| // get affine sub-block width and height<br>Int blockWidth = width;<br>Int blockHeight = height; | |
| Int mvWx = max( abs((acMv[1] - acMv[0]).getHor()), abs((acMv[1] - acMv[0]).getVer()) ); | Corresponding to Formula (13):<br>$\Delta mv_{hor} = \max(|vx_{(W,y)} - vx_{(0,y)}|, |vy_{(W,y)} - vy_{(0,y)}|)$ |
| Int mvWy = max( abs((acMv[2] - acMv[0]).getHor()), abs((acMv[2] - acMv[0]).getVer()) ); | Corresponding to Formula (14):<br>$\Delta mv_{ver} = \max(|vx_{(x,H)} - vx_{(x,0)}|, |vy_{(x,H)} - vx_{(x,0)}|)$ |
| Int iMvPrecision = 4;<br>#if VCEG_AZ07_MV_ADD_PRECISION_BIT_FOR_STORE<br>  iMvPrecision - = VCEG_AZ07_MV_ADD_PRECISION_BIT_FOR_STORE;<br>#endif | iMvPrecision corresponds to the motion vector precision of the affine block. |
| if (mvWx) | Formula (45): |
| {<br>blockWidth = max( (Int)( ( width >> iMvPrecision ) / mvWx ), 1 ); | $\begin{cases} \text{if } \Delta mv_{hor} \neq 0, M = \dfrac{MvAc}{\Delta mv_{hor}} \times W; & \text{if } \Delta mv_{hor} = 0, M = W \\ \text{if } \Delta mv_{ver} \neq 0, N = \dfrac{MvAc}{\Delta mv_{ver}} \times H; & \text{if } \Delta mv_{ver} = 0, N = H \end{cases}$ |
| while (width % blockWidth)<br>{<br>    blockWidth--;<br>} | Adjust M, so that W is divisible by M. |
| blockWidth = max( AFFINE_MIN_BLOCK_SIZE, blockWidth );<br>} | M is limited to being not less than 4. |
| if (mvWy) | Formula (45): |
| {<br>blockHeight = max( (Int)( ( height >> iMvPrecision ) / mvWy ), 1 ); | $\begin{cases} \text{if } \Delta mv_{hor} \neq 0, M = \dfrac{MvAc}{\Delta mv_{hor}} \times W; & \text{if } \Delta mv_{hor} = 0, M = W \\ \text{if } \Delta mv_{ver} \neq 0, N = \dfrac{MvAc}{\Delta mv_{ver}} \times H; & \text{if } \Delta mv_{ver} = 0, N = H \end{cases}$ |

TABLE 1-continued

| | |
|---|---|
| while (height % blockHeight)<br>{<br>    blockHeight—;<br>}<br>blockHeight = max( AFFINE_MIN_ BLOCK_SIZE, blockHeight );<br>} | Adjust N, so that H is divisible by N.<br><br><br><br>Correspondingly, N is limited to being not less than 4. |

Therefore, according to the video image decoding method in this embodiment of the present disclosure, the decoding device determines the size of the affine motion compensation image sub-block based on the determined motion vector difference and motion vector precision of the affine image block, the distance between the control points, and the size of the affine image block, so that the affine image block can be evenly split into a plurality of affine motion compensation image sub-blocks with a same size. In this way, the method is implemented by using hardware/software, and complexity is reduced. It is proved by using experiments that, in the present disclosure, complexity on the encoder side can be reduced by 50%, complexity on the decoder side can be reduced by 70%, and 90% to 95% of performance is maintained. Therefore, a motion compensation prediction technology based on an affine model can be effectively applied in practice.

Figure 13:
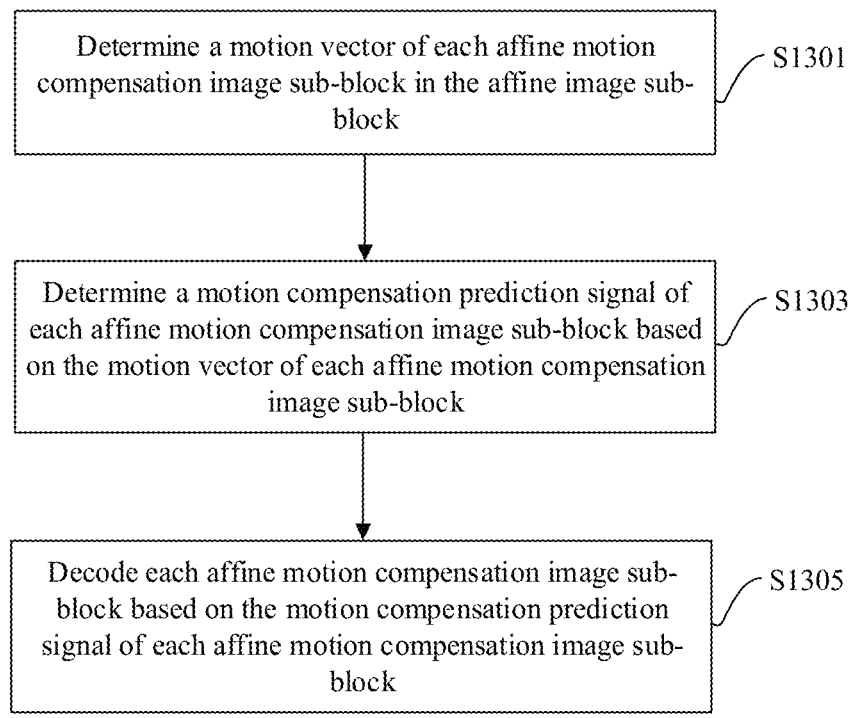
FIG. 13 is still another schematic flowchart of a video image decoding method according to an embodiment of the present disclosure.

Optionally, as shown in FIG. 13, S740 includes the following steps:

S1301. Determine a motion vector of each affine motion compensation image sub-block in the affine image block.

S1303. Determine a motion compensation prediction signal of each affine motion compensation image sub-block based on the motion vector of each affine motion compensation image sub-block.

S1305. Decode each affine motion compensation image sub-block based on the motion compensation prediction signal of each affine motion compensation image sub-block.

It should be understood that, in this embodiment of the present disclosure, each affine-MC block may include a plurality of pixels, and a motion vector of a pixel needs to be selected from each affine-MC block as a motion vector of the affine-MC block.

Optionally, in S1301, a motion vector of a pixel on a central position of an affine-MC block may be selected as a motion vector of the affine-MC block, an average value of motion vectors of all pixels in the affine-MC block may be used as the motion vector of the affine-MC block, or a motion vector of an upper left pixel in the affine-MC block may be selected as the motion vector of the affine-MC block. However, this is not limited in the present disclosure.

Optionally, in this embodiment of the present disclosure, a signal of a boundary pixel in each affine motion compensation image sub-block are filtered, and the boundary pixel is one or more rows of pixels at a boundary of each affine motion compensation image sub-block.

Optionally, in this embodiment of the present disclosure, the signal of the boundary pixel includes a motion compensation prediction signal and/or a reconstructed signal, and the reconstructed signal is a sum of the motion compensation prediction signal and a reconstructed residual signal.

Specifically, a thick solid line block represents an affine block, a thin solid line block represents an affine-MC block, a dashed line box represents a pixel at a boundary of an adjacent affine-MC block, and a cross point represents a pixel. A region of the dashed line box in FIG. 11 includes two rows or two columns of pixels in adjacent affine-MC blocks at respective boundaries of the adjacent affine-MC blocks, or may include one row or one column, three rows or three columns, or the like of pixels at respective boundaries of the adjacent affine-MC blocks. Because motion vectors of the adjacent affine-MC blocks may be different, prediction signals obtained from a reference image are not adjacent in the reference image. This causes discontinuity of the prediction signals at the boundaries of the adjacent affine-MC blocks, further causes discontinuity of residuals, and affects image encoding/decoding performance of the residuals. Therefore, filtering a motion compensation prediction signal at a boundary of an affine-MC block is considered.

The reconstructed signal is usually obtained by adding the motion compensation prediction signal and the reconstructed residual signal. Lossy encoding is usually performed on a residual signal. This causes distortion of the reconstructed residual signal relative to the original residual signal. Distortion cases of pixels at boundaries of adjacent affine-MC blocks may be different. For example, a value of a pixel on the right side in the first affine-MC block becomes larger due to distortion, and a value of a pixel on the left side in an affine-MC block that is adjacent to and on the right of the first affine-MC block becomes smaller due to distortion. This causes discontinuity of boundary pixel values of reconstructed pixels in the affine-MC blocks, and impairs subjective and objective effects. Therefore, the reconstructed signal needs to be filtered.

Optionally, in this embodiment of the present disclosure, filtering may be performed by using a low-pass filter, so that a pixel value in a boundary region changes more smoothly. For example, filtering is performed by using a Gauss filter. However, this is not limited in the present disclosure.

Optionally, in this embodiment of the present disclosure, filtering may be performed by using an overlapped block motion compensation (Overlapped block motion compensation, OBMC for short) method. Motion compensation prediction is performed on a to-be-filtered pixel by using a motion vector of an affine-MC block adjacent to the to-be-filtered pixel, and weighted averaging is performed on an obtained motion compensation prediction signal and a motion compensation prediction signal obtained by using a motion vector of the to-be-filtered pixel, to obtain a final motion compensation prediction signal.

According to the video image decoding method in this embodiment of the present disclosure, the decoding device determines the size of the affine motion compensation image sub-block based on the determined motion vector difference and motion vector precision of the affine image block, and the distance between the control points, and further adjusts the size of the affine motion compensation image sub-block based on a relationship between the size of the affine image block and the size of the affine motion compensation image sub-block, so that the size of the affine motion compensation image sub-block is easy to implement, and complexity is reduced. It is proved by using experiments that, in the present disclosure, complexity on the encoder side can be reduced by 50%, complexity on the decoder side can be reduced by 70%, and 90% to 95% of performance is maintained. Therefore, a motion compensation prediction technology based on an affine model can be effectively applied in practice.

Optionally, a decoding method in the present disclosure may also be:

parsing a bitstream to obtain a motion vector difference of an affine image block and motion vector precision of the affine image block, where pixels in the affine image block have a same affine transform parameter;

determining a size of an affine motion compensation image sub-block in the affine image block based on the motion vector difference, the motion vector precision, and a distance between control points in the affine image block, where the size includes a length in a horizontal direction and a length in a vertical direction, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and the control points are pixels used to determine the motion vector difference; and performing decoding processing on the affine image block based on the size of the affine motion compensation image sub-block; or parsing a bitstream to obtain information about an affine image block;

determining a size of an affine motion compensation image sub-block in the affine image block based on the information about the affine image block, where the size includes a length in a horizontal direction and a length in a vertical direction, a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and performing decoding processing on the affine image block based on the size of the affine motion compensation image sub-block.

In this manner, a decoder side may not need to perform re-calculation, but directly use a parameter transmitted by an encoder side to the decoder side, to determine the size of the affine motion compensation image sub-block. Therefore, calculation complexity is further reduced.

The foregoing describes in detail the video image decoding method according to the embodiments of the present disclosure with reference to FIG. 1 to FIG. 13. The foregoing further illustrates that implementation manners of this solution on the decoder side and the encoder side are basically the same. To describe this more clearly, the following describes a video image encoding method according to the embodiments of the present disclosure with reference to FIG. 14 to FIG. 16. It should be noted that, because related operations on the encoder side are essentially the same as those on the decoder side, to avoid repetition, implementation details are not described herein again.

Figure 14:
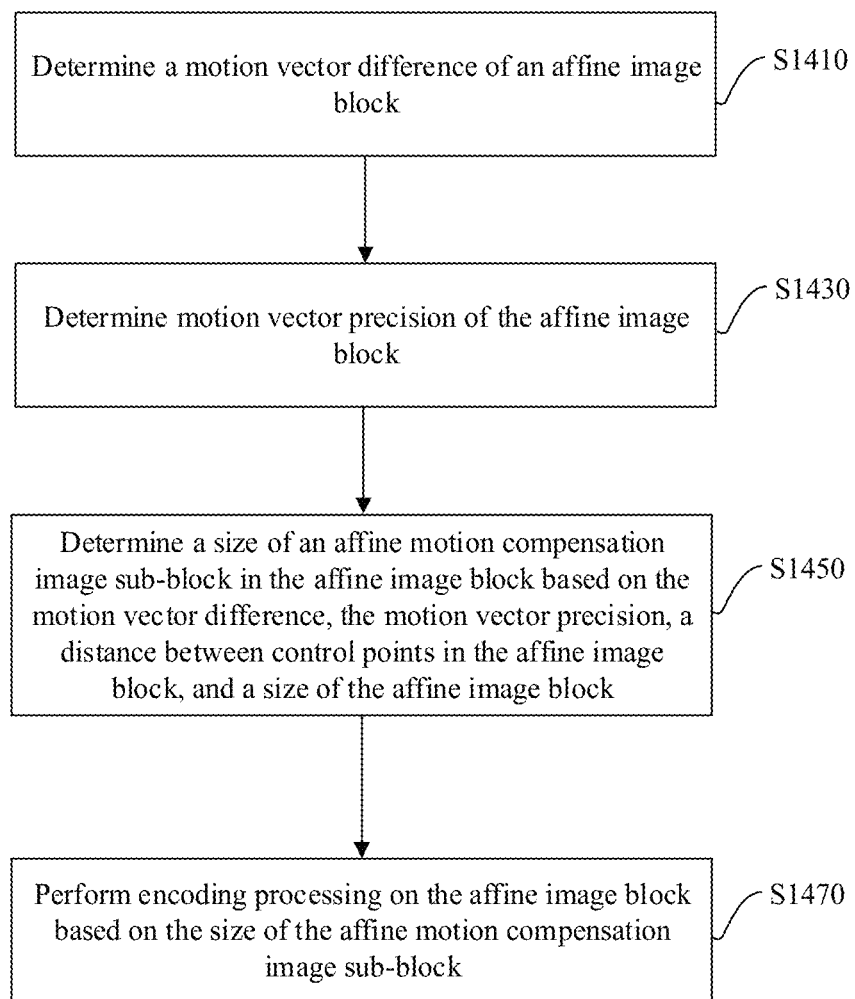
FIG. 14 is a schematic flowchart of a video image encoding method according to an embodiment of the present disclosure.

FIG. 14 is a schematic flowchart of a video image encoding method according to an embodiment of the present disclosure.

The method shown in FIG. 14 may be performed by an encoding device. For example, similar to a decoder, an encoder usually includes a prediction processing unit, a residual generation unit, a transform processing unit, a quantization unit, a dequantization unit, an inverse transform processing unit, a reconstruction unit, a filter unit, a decoded image buffer, and an entropy encoding unit. The entropy encoding unit includes a regular CABAC encoding/decoding engine and a bypass encoding/decoding engine. The prediction processing unit includes an inter-frame prediction processing unit and an intra-frame prediction processing unit. The inter-frame prediction processing unit includes a motion estimation unit and a motion compensation unit. In another embodiment, the encoder may include more or fewer or different function components. Similar to the decoding method, the encoding method of the present disclosure is mainly applied to a process of performing inter-frame prediction by the inter-frame prediction processing unit. For a detailed structure of each function unit of the encoder, refer to regulations and descriptions in the prior art such as the H.265 standard. No detailed descriptions are provided in the present disclosure. In the present disclosure, only the following embodiment is used to describe a basic process of how to adaptively determine a size of an affine motion compensation image sub-block and perform encoding in the method in this embodiment of the present disclosure.

Specifically, as shown in FIG. 14, the method 1400 includes the following steps:

S1410. Determine a motion vector difference of an affine image block.

S1430. Determine motion vector precision of the affine image block.

S1450. Determine a size of an affine motion compensation image sub-block in the affine image block based on the motion vector difference, the motion vector precision, a distance between control points in the affine image block, and a size of the affine image block, where the size includes a length in a horizontal direction and a length in a vertical direction, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and the control points are pixels used to determine the motion vector difference.

S1470. Perform encoding processing on the affine image block based on the size of the affine motion compensation image sub-block.

Specifically, an encoding device determines the motion vector difference of the affine image block based on the determined control points, determines the motion vector precision of the affine image block, and determines the size of the affine motion compensation image sub-block in the affine image block based on the determined motion vector difference and motion vector precision, the distance between the control points, and the size of the affine image block, where the size of the affine motion compensation image sub-block is a size used for splitting the affine image block, and the affine image block is split into a plurality of affine motion compensation image sub-blocks with a same size based on the split size. Then, the encoding device encodes the affine image block based on the affine motion compensation image sub-blocks.

Therefore, by performing the video image encoding method in this embodiment of the present disclosure, the inter-frame prediction processing unit determines the size of the affine motion compensation image sub-block based on the determined motion vector difference and motion vector precision of the affine image block, the distance between the control points, and the size of the affine image block, splits the affine image block into a plurality of affine motion compensation sub-images with a same size based on the size of the affine motion compensation image sub-block, and then performs encoding processing. Therefore, in an encoding process, an affine motion compensation image sub-block with an appropriate size can be adaptively selected based on a change of the foregoing parameters, encoding complexity is reduced, and encoding performance, that is, compression efficiency, is improved.

Preferably, S1410 includes:

determining a first component of the motion vector difference based on a difference between motion vectors of a first control point and a second control point that are located on a same horizontal line; and/or determining a second component of the motion vector difference based on a difference between motion vectors of a third control point and a fourth control point that are located on a same vertical line.

There is a first horizontal distance between the first control point and the second control point, and there is a first vertical distance between the third control point and the fourth control point. It should be noted that and/or in the solution included in step S1410 specifically indicates the following three different technical solutions:

Solution 1: A method for determining the motion vector difference of the affine image block based on three control points includes:

determining the first component of the motion vector difference based on the difference between the motion vectors of the first control point and the second control point that are located on the same horizontal line, and determining the second component of the motion vector difference based on the difference between the motion vectors of the third control point and the fourth control point that are located on the same vertical line.

Solution 2: A method for determining the motion vector difference of the affine image block based on two control points in the horizontal direction includes: determining the first component of the motion vector difference based on the difference between the motion vectors of the first control point and the second control point that are located on the same horizontal line.

Solution 3: A method for determining the motion vector difference of the affine image block based on two control points in the vertical direction includes: determining the second component of the motion vector difference based on the difference between the motion vectors of the third control point and the fourth control point that are located on the same vertical line.

It should be understood that in this embodiment of the present disclosure, the first component of the motion vector difference is a horizontal component of the motion vector difference, and the second component of the motion vector difference is a vertical component of the motion vector difference. In Solution 1, the first component of the motion vector difference and the second component of the motion vector difference jointly reflect the motion vector difference of the affine image block. However, in Solution 2 and Solution 3, the first component of the motion vector difference and the second component of the motion vector difference independently reflect the motion vector difference of the affine image block. In other words, in Solution 1, the motion vector difference of the affine image block includes the first component of the motion vector difference and the second component of the motion vector difference; in Solution 2, the motion vector difference of the affine image block includes the first component of the motion vector difference; and in Solution 3, the motion vector difference of the affine image block includes a second component of the motion vector difference. It should also be understood that in this embodiment of the present disclosure, first, second, third, and fourth are only used to distinguish between pixels and should not constitute any limitation on the protection scope of the present disclosure. For example, the first control point may also be referred to as the second control point, and the second control point may be referred to as the first control point.

Optionally, in this embodiment of the present disclosure, the first control point and the third control point are the same pixel. To be specific, three control points are selected, and one of the three control points is located on a same horizontal line as one of the other two control points, and is located on a same vertical line as the last control point.

Optionally, in this embodiment of the present disclosure, the first control point, the second control point, the third control point, and the fourth control point are vertexes of the affine block. It is assumed that four vertexes in an affine block are respectively denoted as an upper left vertex, a lower left vertex, an upper right vertex, and a lower right vertex.

In Solution 1, any three vertexes in the two orthogonal directions may be selected to determine a motion vector difference of the affine block. For example, the upper left vertex, the lower left vertex, and the upper right vertex may be selected, or the upper left vertex, the upper right vertex, and the lower right vertex may be selected.

In Solution 2, any two vertexes located on a same horizontal line may be selected to determine a motion vector difference of the affine block. For example, the upper left vertex and the upper right vertex may be selected, or the lower left vertex and the lower right vertex may be selected.

In Solution 3, any two vertexes located on a same vertical line may be selected to determine a motion vector difference of the affine block. For example, the upper left vertex and the lower left vertex may be selected, or the upper right vertex and the lower right vertex may be selected. This is not limited in the present disclosure.

Optionally, in this embodiment of the present disclosure, a difference between components that are of the motion vectors of the first control point and the second control point and that are in any one of the two directions (the horizontal direction and the vertical direction, or referred to as an x direction and a y direction) may be determined as the first component of the motion vector difference of the affine block, and a difference between components that are of the motion vectors of the third control point and the fourth control point and that are in any one of the two directions may be determined as the second component of the motion vector difference of the affine block. The manner of determining the motion vector difference is applicable to Solutions 1, 2, and 3. Alternatively, according to actual requirements for encoding complexity and encoding performance, a value between two differences between the components of the motion vectors of the first control point and the second control point in the two directions may be selected and determined as the first component, and a value between two differences between the components of the motion vectors of the third control point and the fourth control point in the two directions may be selected and determined as the second component. This is not limited in the present disclosure.

A motion vector of each of the first control point to the fourth control point usually includes two components, that is, a horizontal component and a vertical component. Therefore, in the foregoing steps, the determining a first component of the motion vector difference based on a difference between motion vectors of a first control point and a second control point that are located on a same horizontal line, and the determining a second component of the motion vector difference based on a difference between motion vectors of a third control point and a fourth control point that are located on a same vertical line may be specifically implemented in the following manner:

determining a first horizontal component difference and a first vertical component difference between the motion vectors of the first control point and the second control point, and determining a larger one of the first horizontal component difference and the first vertical component difference as the first component of the motion vector difference; and correspondingly determining a second horizontal component difference and a second vertical component difference between the motion vectors of the third control point and the fourth control point, and determining a larger one of the second horizontal component difference and the second vertical component difference as the second component of the motion vector difference.

Optionally, in this embodiment of the present disclosure, the motion vector difference is obtained based on an affine model, that is, the motion vector difference is obtained by determining an affine transform parameter of a pixel in the affine image block. It should be noted that pixels in the affine image block have a same affine transform parameter.

Correspondingly, the foregoing step of determining a first horizontal component difference and a first vertical component difference between the motion vectors of the first control point and the second control point is specifically: determining the first horizontal component difference and the first vertical component difference based on the affine transform parameter and the first horizontal distance; and the foregoing step of determining a second horizontal component difference and a second vertical component difference between the motion vectors of the third control point and the fourth control point is specifically: determining the second horizontal component difference and the second vertical component difference based on the affine transform parameter and the first vertical distance.

It should be understood that sequence numbers of the foregoing processes do not indicate an execution sequence. The execution sequence of the processes should be determined based on functions and internal logic of the processes, and should not constitute any limitation on the implementation processes of this embodiment of the present disclosure.

Optionally, in this embodiment of the present disclosure, an affine transform model may be a prior-art 6-parameter affine transform model, or may be a prior-art 4-parameter or 2-parameter affine transform model. The 6-parameter affine transform model is mainly applied to a scenario in Solution 1 based on three control points, and the 4-parameter affine transform model is mainly applied to scenarios in Solution 2 and Solution 3 based on two control points. For specific content, refer to descriptions of the decoding method in this specification.

Optionally, in this embodiment of the present disclosure, the motion vector of the first control point, the motion vector of the second control point, the motion vector of the third control point, and the motion vector of the fourth control point may be determined, to determine the motion vector difference of the affine image block.

Correspondingly, in the scenario in Solution 1, a difference between a horizontal component of the motion vector of the first control point and a horizontal component of the motion vector of the second control point is determined as the first horizontal component difference; a difference between a vertical component of the motion vector of the first control point and a vertical component of the motion vector of the second control point is determined as the first vertical component difference; a difference between a horizontal component of the motion vector of the third control point and a horizontal component of the motion vector of the fourth control point is determined as the second horizontal component difference; and a difference between a vertical component of the motion vector of the third control point and a vertical component of the motion vector of the fourth control point is determined as the second vertical component difference.

In the scenario in Solution 2, a difference between a horizontal component of the motion vector of the first control point and a horizontal component of the motion vector of the second control point is determined as the first horizontal component difference; and a difference between a vertical component of the motion vector of the first control point and a vertical component of the motion vector of the second control point is determined as the first vertical component difference.

In the scenario in Solution 3, a difference between a horizontal component of the motion vector of the third control point and a horizontal component of the motion vector of the fourth control point is determined as the second horizontal component difference; and a difference between a vertical component of the motion vector of the third control point and a vertical component of the motion vector of the fourth control point is determined as the second vertical component difference.

Specifically, the motion vectors of the control points may be directly determined, and the first component and the second component of the motion vector difference of the affine block can be directly obtained by calculating differences between components of the motion vectors.

Optionally, in this embodiment of the present disclosure, the first control point and the second control point are two adjacent pixels, and the third control point and the fourth control point are two adjacent pixels. In other words, the control points are not necessarily selected from the four corner points, also referred to as vertexes, in the affine image block, but may be points that are on any positions in the affine image block and that are jointly set by an encoder side and a decoder side, explicitly indicated in a bitstream by using signaling, or obtained through estimation or duplication based on control points in a surrounding affine image block. In this case, determining the first horizontal component difference, the first vertical component difference, the second horizontal component difference, and the second vertical component difference is specifically as follows:

A motion vector of a first pixel, a motion vector of a second pixel, and a motion vector of a third pixel are determined, where the first pixel, the second pixel, and the third pixel are pixels that do not overlap with each other; a second horizontal distance and a second vertical distance between the first pixel and the second pixel are determined; a third horizontal distance and a third vertical distance between the first pixel and the third pixel are determined; and the first horizontal component difference, the first vertical component difference, the second horizontal component difference, and the second vertical component difference are determined based on the motion vector of the first pixel, the motion vector of the second pixel, the motion vector of the third pixel, the second horizontal distance, the second vertical distance, the third horizontal distance, and the third vertical distance. The foregoing is described by using Solution 1 based on three control points as an example. It can be learned from the foregoing example that a difference between Solution 2 or Solution 3 based on two control points and Solution 1 based on three control points lies in: Only a first component difference or a second component difference in Solution 1 is used as the motion vector difference of the affine image based on two control points.

Optionally, in this embodiment of the present disclosure, an encoding device may obtain motion vectors of all control points through motion estimation and search, may obtain the motion vectors of all the control points based on a surrounding image block, or may calculate the motion vectors of all the control points based on an affine transform model. Alternatively, the encoding device may obtain motion vectors of some control points through motion estimation and search, and obtain motion vectors of other control points based on an adjacent image block. Alternatively, the encoding device may obtain motion vectors of some control points through affine motion estimation and search, and calculate motion vectors of other control points based on an affine transform model. Alternatively, the encoding device may obtain motion vectors of some control points based on an adjacent image block, and calculate motion vectors of other control points based on an affine transform model. However, this is not limited in the present disclosure.

Optionally, in S1430, a first preset value may be determined as the motion vector precision of the affine image block; or the motion vector precision of the affine image block may be determined based on a feature of an adjacent image block of the affine image block. The adjacent image block is an image block adjacent to the affine image block in space and/or in time.

Optionally, as shown in FIG. 15, S1450 specifically includes the following steps.

S1501. Proportionally adjust the first horizontal distance based on a proportion of the motion vector precision to the first component of the motion vector difference, to obtain the length of the affine motion compensation image sub-block in the horizontal direction; and determine whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjust the length of the affine motion compensation image sub-block in the horizontal direction, so that the length of the affine image block in the horizontal direction is an integer multiple of an adjusted length of the affine motion compensation image sub-block in the horizontal direction.

Specifically, the proportion of the motion vector precision to the first component of the motion vector difference is a ratio of the motion vector precision to the first component of the motion vector difference. A product of the ratio and the first horizontal distance is the length of the affine motion compensation image sub-block in the horizontal direction, and may also be referred to as an initial length in the horizontal direction. It may be understood that the initial length of the affine motion compensation image sub-block in the horizontal direction may not be an integer in some cases. In this case, the initial length needs to be rounded. To ensure precision, rounding-down is usually performed. To be specific, a decimal part is directly discarded. For example, an initial length value is 8.35 (that is, a length of 8.35 unit pixels), and 8 is directly used as the length of the affine motion compensation image sub-block in the horizontal direction. Certainly, a rounding-off principle may alternatively be used. To be specific, if a decimal part is less than 5, rounding-down is performed; and if a decimal part is greater than 5, rounding-up is performed. For example, when the length is calculated to be 8.86, 9 is used as the length. To ensure efficiency, a minimum value of the initial length should not be less than a preset value, for example, not less than a preset value such as 2, 4, 8, or $2^N$. The preset value is usually set to 4. The initial length should also not be greater than the length of the affine image block in the horizontal direction. Whether the initial length in the horizontal direction or the rounded initial length in the horizontal direction is appropriate depends on whether the length of the affine image block in the horizontal direction is divisible by the initial length. If the length of the affine image block in the horizontal direction is divisible by the initial length, it indicates whether the affine image block can be split into an integer quantity of sub-blocks in the horizontal direction based on the initial length in the horizontal direction or the rounded initial length in the horizontal direction. An adjustment manner is usually a method in which the initial length in the horizontal direction or the rounded initial length in the horizontal directions is gradually increased/decreased. To be specific, if it is determined that the length of the affine image block in the horizontal direction is not an integer multiple of the length of the affine motion compensation image sub-block in the horizontal direction, the length of the affine motion compensation image sub-block in the horizontal direction is adjusted, that is, increased/decreased, by one or more unit lengths, and then the foregoing solution is cyclically performed until the length of the affine image block in the horizontal direction is an integer multiple of an adjusted length of the affine motion compensation image sub-block in the horizontal direction. The unit length is usually one unit pixel. To be specific, the length of the affine motion compensation image sub-block in the horizontal direction is adjusted, that is, increased/decreased, by 1. Without loss of generality, in other words, the length of the affine motion compensation image sub-block in the horizontal direction is adjusted, that is, increased/decreased, by a fixed step size. The step size is an adjustment value, that is, a basic unit or an amplitude used for adjusting the length of the affine motion compensation image sub-block in the horizontal direction in each cycle. The step size is usually the foregoing one unit pixel, or may be another value, for example, two pixel units. Optionally, the step size/adjustment value used in the foregoing adjustment may vary according to parity of the initial length of the affine motion compensation image sub-block in the horizontal direction. For example, when the initial length of the affine motion compensation image sub-block in the horizontal direction is an odd number, an odd step size is selected. For example, an odd quantity of unit lengths, such as one unit length, is used as the step size for the adjustment. When the initial length of the affine motion compensation image sub-block in the horizontal direction is an even number, an even step size is selected. For example, an even quantity of unit lengths is used as the step size.

In addition, whether the adjustment is an increase or a decrease may be selected according to an agreement between the decoder side and the encoder side, may be explicitly indicated by the encoder side in a bitstream and selected by the decoder side based on the explicit indication, may be deduced by using a motion vector precision value of a surrounding adjacent block, or may be determined based on a ratio relationship between the length of the affine image block in the horizontal direction and the length of the affine motion compensation image sub-block in the horizontal direction. For example, if the ratio is less than a threshold, the decrease is selected; otherwise, the increase is selected.

To simplify an algorithm and ensure encoding and decoding efficiency, if it is determined that the length of the affine image block in the horizontal direction is not an integer multiple of the length of the affine motion compensation image sub-block in the horizontal direction, the length of the affine motion compensation image sub-block in the horizontal direction is adjusted, that is, increased, by one preset unit length, and then the foregoing solution is cyclically performed until the length of the affine image block in the horizontal direction is an integer multiple of an adjusted length of the affine motion compensation image sub-block in the horizontal direction.

In addition, to improve efficiency and reduce an operation time, the length of the affine motion compensation image sub-block in the horizontal direction may be adjusted to a closest value by which the length of the affine image block in the horizontal direction is divisible. For example, the length of the affine motion compensation image sub-block in the horizontal direction is 7, while the length of the affine image block in the horizontal direction is 16. In this case, the length of the affine motion compensation image sub-block in the horizontal direction is increased by 1 to change to 8 by which 16 is divisible. Likewise, if the length of the affine motion compensation image sub-block in the horizontal direction is 5, the length of the affine motion compensation image sub-block in the horizontal direction is decreased by 1 to change to 4 by which 16 is divisible. If differences between the length of the affine motion compensation image sub-block in the horizontal direction and two adjacent values by which the length of the affine image block in the horizontal direction is divisible are equal, for example, the length of the affine motion compensation image sub-block in the horizontal direction is 6, the length of the affine image block in the horizontal direction is 16, and two values that are adjacent to the length 6 and by which 16 is divisible are 4 and 8, respectively, an adjustment may be selected according to requirements of the encoder side and the decoder side. For example, if a low latency is required, an adjustment, that is, an increase, may be selected. If high quality is required, an adjustment, that is, a decrease, is selected. This is not limited in the present disclosure.

In addition, in step S1501, when it is determined that the length of the affine image block in the horizontal direction is not an integer multiple of the length of the affine motion compensation image sub-block in the horizontal direction, to further simplify the algorithm, a same table may be separately established on the encoder side and the decoder side, and a possible maximum length of the affine image block in the horizontal direction is split into a plurality of intervals by using an allowed minimum divisor as a start value, for example, $2^N$. An interval span is $2^{N+i}$, where i∈(0, ($\log_2$ W max)−1), and $W_{max}$ is the possible maximum length of the affine image block in the horizontal direction. An interval within which the length of the affine motion compensation image sub-block in the horizontal direction falls is determined, and a lower limit value or an upper limit value of the interval within which the length of the affine motion compensation image sub-block in the horizontal direction falls is used as a finally determined length of the affine motion compensation image sub-block in the horizontal direction. For a rule for obtaining the lower limit value or the upper limit value, refer to an agreement between the encoder side and the decoder side. An upper limit value or a lower limit value of an approximate interval may be explicitly indicated by using a bitstream, or may be selected in a round-off manner. By using the foregoing table, the final length of the affine motion compensation image sub-block in the horizontal direction may be determined through table lookup based on the initial length of the affine motion compensation image sub-block in the horizontal direction. Therefore, the step of adjusting the length of the affine motion compensation image sub-block in the horizontal direction in step S1501 can be replaced, system complexity is reduced, and a calculation time is reduced.

Optionally, to further reduce calculation complexity in the solution, in step S1501, not only if the length of the affine image block in the horizontal direction is an integer multiple of the length of the affine motion compensation image sub-block in the horizontal direction is determined, but whether the length of the affine motion compensation image sub-block in the horizontal direction is an integer multiple of a preset length S that facilitates a calculation also needs to be determined. To be specific, whether the length of the affine motion compensation image sub-block in the horizontal direction meets the following conditions needs to be determined:

(1) The length of the affine image block in the horizontal direction is an integer multiple of the length of the affine motion compensation image sub-block in the horizontal direction; and (2) the length of the affine motion compensation image sub-block in the horizontal direction is an integer multiple of the preset length S.

If the length of the affine motion compensation image sub-block in the horizontal direction does not meet the two conditions, the length of the affine motion compensation image sub-block in the horizontal direction is adjusted, so that the length of the affine motion compensation image sub-block in the horizontal direction meets the condition (1) and the condition (2). To be specific, the length of the affine image block in the horizontal direction is an integer multiple of an adjusted length of the affine motion compensation image sub-block in the horizontal direction, and the adjusted length of the affine motion compensation image sub-block in the horizontal direction is an integer multiple of the preset length. The preset length S is usually 4, or may be a value such as 8, 16, or 32. In other words, $S=2^n$, where n is zero or a positive integer. This solution is applicable to an affine image block in any shape. When the affine image block is split according to a quadtree (Quad Tree) rule, provided that either of the foregoing determining conditions (1) and (2) is met, the other condition can be met. Therefore, only one of the determining conditions needs to be activated/applied.

Optionally, an amplitude limiting operation needs to be performed on the length that is of the affine motion compensation image sub-block in the horizontal direction and that is determined in the foregoing manner. To be specific, a comparison manner is used, to enable M to fall within a range from a lower limit Tm to an upper limit W. Tm is a preset value and is usually 4, and W is the length of the affine image block in the horizontal direction.

S1503. Proportionally adjust the first vertical distance based on a proportion of the motion vector precision to the second component of the motion vector difference, to obtain the length of the affine motion compensation image sub-block in the vertical direction; and determine whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjust the length of the affine motion compensation image sub-block in the vertical direction, so that the length of the affine image block in the vertical direction is an integer multiple of an adjusted length of the affine motion compensation image sub-block in the vertical direction.

Specifically, the proportion of the motion vector precision to the second component of the motion vector difference is a ratio of the motion vector precision to the second component of the motion vector difference. A product of the ratio and the first vertical distance is the length of the affine motion compensation image sub-block in the vertical direction, and may also be referred to as an initial length in the vertical direction. It may be understood that the initial length of the affine motion compensation image sub-block in the vertical direction may not be an integer in some cases. In this case, the initial length needs to be rounded. To ensure precision, rounding-down is usually performed. To be specific, a decimal part is directly discarded. For example, an initial length value is 8.35 (that is, a length of 8.35 unit pixels), and 8 is directly used as the length of the affine motion compensation image sub-block in the vertical direction. Certainly, a rounding-off principle may alternatively be used. To be specific, if a decimal part is less than 5, rounding-down is performed; and if a decimal part is greater than 5, rounding-up is performed. For example, when the length is calculated to be 8.86, 9 is used as the length. To ensure efficiency, a minimum value of the initial length should not be less than a preset value, for example, not less than a preset value such as 2, 4, 8, or $2^N$. The preset value is usually set to 4. The initial length should also not be greater than the length of the affine image block in the vertical direction. Whether the initial length in the vertical direction or the rounded initial length in the vertical direction is appropriate depends on whether the length of the affine image block in the vertical direction is divisible by the initial length. If the length of the affine image block in the vertical direction is divisible by the initial length, it indicates whether the affine image block can be split into an integer quantity of sub-blocks in the vertical direction based on the initial length in the vertical direction or the rounded initial length in the vertical direction. An adjustment manner is usually a method in which the initial length in the vertical direction or the rounded initial length in the vertical direction is gradually increased/decreased. To be specific, if it is determined that the length of the affine image block in the vertical direction is not an integer multiple of the length of the affine motion compensation image sub-block in the vertical direction, the length of the affine motion compensation image sub-block in the vertical direction is adjusted, that is, increased/decreased, by one or more unit lengths, and then the foregoing solution is cyclically performed until the length of the affine image block in the vertical direction is an integer multiple of an adjusted length of the affine motion compensation image sub-block in the vertical direction. The unit length is usually one unit pixel. To be specific, the length of the affine motion compensation image sub-block in the vertical direction is adjusted, that is, increased/decreased, by 1. Without loss of generality, in other words, the length of the affine motion compensation image sub-block in the vertical direction is adjusted, that is, increased/decreased, by a fixed step size. The step size is an adjustment value, that is, a basic unit or an amplitude used for adjusting the length of the affine motion compensation image sub-block in the vertical direction in each cycle. The step size is usually the foregoing one unit pixel, or may be another value, for example, two pixel units. Optionally, the step size/adjustment value used in the foregoing adjustment may vary according to parity of the initial length of the affine motion compensation image sub-block in the vertical direction. For example, when the initial length of the affine motion compensation image sub-block in the vertical direction is an odd number, an odd step size is selected. For example, an odd quantity of unit lengths, such as one unit length, is used as the step size for the adjustment. When the initial length of the affine motion compensation image sub-block in the vertical direction is an even number, an even step size is selected. For example, an even quantity of unit lengths is used as the step size.

In addition, whether the adjustment is an increase or a decrease may be selected according to an agreement between the decoder side and the encoder side, may be explicitly indicated by the encoder side in a bitstream and selected by the decoder side based on the explicit indication, may be deduced by using a motion vector precision value of a surrounding adjacent block, or may be determined based on a ratio relationship between the length of the affine image block in the vertical direction and the length of the affine motion compensation image sub-block in the vertical direction. For example, if the ratio is less than a threshold, the decrease is selected; otherwise, the increase is selected.

To simplify an algorithm and ensure encoding and decoding efficiency, if it is determined that the length of the affine image block in the vertical direction is not an integer multiple of the length of the affine motion compensation image sub-block in the vertical direction, the length of the affine motion compensation image sub-block in the vertical direction is adjusted, that is, increased, by one preset unit length, and then the foregoing solution is cyclically performed until the length of the affine image block in the vertical direction is an integer multiple of an adjusted length of the affine motion compensation image sub-block in the vertical direction.

In addition, to improve efficiency and reduce an operation time, the length of the affine motion compensation image sub-block in the vertical direction may be adjusted to a closest value by which the length of the affine image block in the vertical direction is divisible. For example, the length of the affine motion compensation image sub-block in the vertical direction is 7, while the length of the affine image block in the vertical direction is 16. In this case, the length of the affine motion compensation image sub-block in the vertical direction is increased by 1 to change to 8 by which 16 is divisible. Likewise, if the length of the affine motion compensation image sub-block in the vertical direction is 5, the length of the affine motion compensation image sub-block in the vertical direction is decreased by 1 to change to 4 by which 16 is divisible. If differences between the length of the affine motion compensation image sub-block in the vertical direction and two adjacent values by which the length of the affine image block in the vertical direction is divisible are equal, for example, the length of the affine motion compensation image sub-block in the vertical direction is 6, the length of the affine image block in the vertical direction is 16, and two values that are adjacent to the length 6 and by which 16 is divisible are 4 and 8, respectively, an adjustment may be selected according to requirements of the encoder side and the decoder side. For example, if a low latency is required, an adjustment, that is, an increase, may be selected. If high quality is required, an adjustment, that is, a decrease, is selected. This is not limited in the present disclosure.

In addition, in step S1503, when it is determined that the length of the affine image block in the vertical direction is not an integer multiple of the length of the affine motion compensation image sub-block in the vertical direction, to further simplify the algorithm, a same table may be separately established on the encoder side and the decoder side, and a possible maximum length of the affine image block in the vertical direction is split into a plurality of intervals by using an allowed minimum divisor as a start value, for example, $2^N$. An interval span is $2^{N+i}$, where i∈(0, (log$_2$ W max)−1), and $W_{max}$ is the possible maximum length of the affine image block in the vertical direction. An interval within which the length of the affine motion compensation image sub-block in the vertical direction falls is determined, and a lower limit value or an upper limit value of the interval within which the length of the affine motion compensation image sub-block in the vertical direction falls is used as a finally determined length of the affine motion compensation image sub-block in the vertical direction. For a rule for obtaining the lower limit value or the upper limit value, refer to an agreement between the encoder side and the decoder side. An upper limit value or a lower limit value of an approximate interval may be explicitly indicated by using a bitstream, or may be selected in a round-off manner. By using the foregoing table, the final length of the affine motion compensation image sub-block in the vertical direction may be determined through table lookup based on the initial length of the affine motion compensation image sub-block in the vertical direction. Therefore, the step of adjusting the length of the affine motion compensation image sub-block in the vertical direction in step S1503 can be replaced, system complexity is reduced, and a calculation time is reduced.

Optionally, to further reduce calculation complexity in the solution, in step S1503, not only if the length of the affine image block in the vertical direction is an integer multiple of the length of the affine motion compensation image sub-block in the vertical direction is determined, but whether the length of the affine motion compensation image sub-block in the vertical direction is an integer multiple of the preset length S that facilitates a calculation also needs to be determined. To be specific, whether the length of the affine motion compensation image sub-block in the vertical direction meets the following conditions needs to be determined:

(1) The length of the affine image block in the vertical direction is an integer multiple of the length of the affine motion compensation image sub-block in the vertical direction; and (2) the length of the affine motion compensation image sub-block in the vertical direction is an integer multiple of the preset length S.

If the length of the affine motion compensation image sub-block in the vertical direction does not meet the two conditions, the length of the affine motion compensation image sub-block in the vertical direction is adjusted, so that the length of the affine motion compensation image sub-block in the vertical direction meets the condition (1) and the condition (2). To be specific, the length of the affine image block in the vertical direction is an integer multiple of an adjusted length of the affine motion compensation image sub-block in the vertical direction, and the adjusted length of the affine motion compensation image sub-block in the vertical direction is an integer multiple of the preset length. The preset length S is usually 4, or may be a value such as 8, 16, or 32. In other words, $S=2^n$, where n is zero or a positive integer. This solution is applicable to an affine image block in any shape. When the affine image block is split according to a quadtree (Quad Tree) rule, provided that either of the foregoing determining conditions (1) and (2) is met, the other condition can be met. Therefore, only one of the determining conditions needs to be activated/applied.

Optionally, an amplitude limiting operation needs to be performed on the length that is of the affine motion compensation image sub-block in the vertical direction and that is determined in the foregoing manner. To be specific, a comparison manner is used, to enable M to fall within a range from a lower limit Tm to an upper limit W. Tm is a preset value and is usually 4, and W is the length of the affine image block in the vertical direction.

For specific implementations of determining and adjusting the size of the affine motion compensation image sub-block, refer to specific descriptions of the decoding method in this specification.

Therefore, according to the video image encoding method in this embodiment of the present disclosure, the encoding device determines the size of the affine motion compensation image sub-block based on the determined motion vector difference and motion vector precision of the affine image block, and the distance between the control points, and further adjusts the size of the affine motion compensation image sub-block based on a relationship between the size of the affine image block and the size of the affine motion compensation image sub-block, so that the size of the affine motion compensation image sub-block is easy to implement, and complexity is reduced. It is proved by using experiments that, in the present disclosure, complexity on the encoder side can be reduced by 50%, complexity on the decoder side can be reduced by 70%, and 90% to 95% of performance is maintained. Therefore, a motion compensation prediction technology based on an affine model can be effectively applied in practice.

Figure 16:
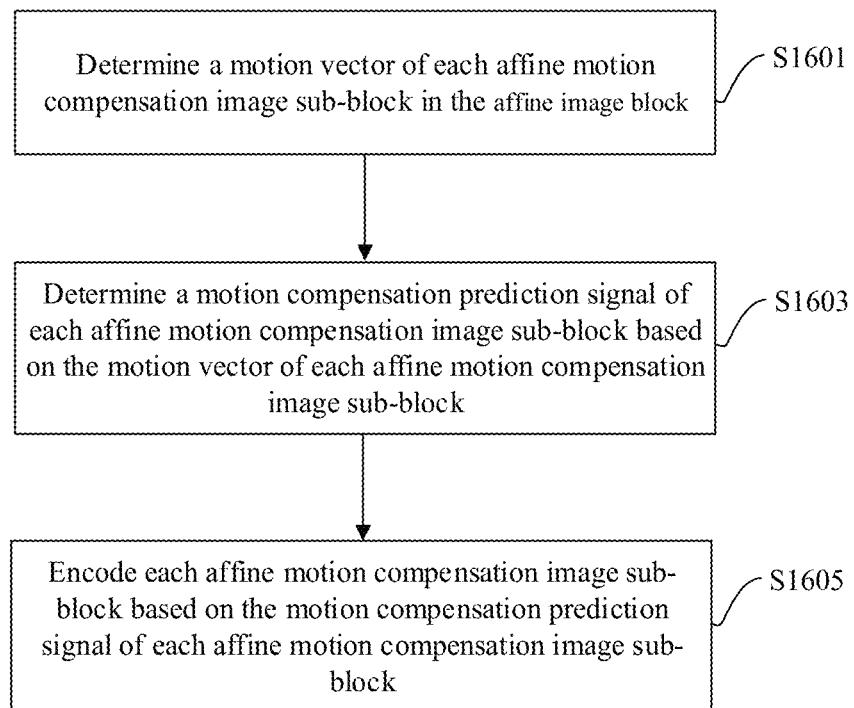
FIG. 16 is still another schematic flowchart of a video image encoding method according to an embodiment of the present disclosure.

Optionally, as shown in FIG. 16, S1470 includes the following steps:

S1601. Determine a motion vector of each affine motion compensation image sub-block in the affine motion compensation image sub-blocks.

S1603. Determine a motion compensation prediction signal of each affine motion compensation image sub-block based on the motion vector of each affine motion compensation image sub-block.

S1605. Encode each affine motion compensation image sub-block based on the motion compensation prediction signal of each affine motion compensation image sub-block.

It should be understood that, in this embodiment of the present disclosure, each affine-MC block may include a plurality of pixels, and a motion vector of a pixel needs to be selected from each affine-MC block as a motion vector of the affine-MC block.

Optionally, in S1601, a motion vector of a pixel on a central position of an affine-MC block may be selected as a motion vector of the affine-MC block, an average value of motion vectors of all pixels in the affine-MC block may be used as the motion vector of the affine-MC block, or a motion vector of an upper left pixel in the affine-MC block may be selected as the motion vector of the affine-MC block. However, this is not limited in the present disclosure.

Optionally, in this embodiment of the present disclosure, a signal of a boundary pixel in each affine motion compensation image sub-block are filtered, and the boundary pixel is one or more rows of pixels at a boundary of each affine motion compensation image sub-block.

Optionally, in this embodiment of the present disclosure, the signal of the boundary pixel includes a motion compensation prediction signal and/or a reconstructed signal, and the reconstructed signal is a sum of the motion compensation prediction signal and a reconstructed residual signal.

The reconstructed signal is usually obtained by adding the motion compensation prediction signal and the reconstructed residual signal. Lossy encoding is usually performed on a residual signal. This causes distortion of the reconstructed residual signal relative to the original residual signal. Distortion cases of pixels at boundaries of adjacent affine-MC blocks may be different. For example, a pixel on the right side in the first affine-MC block becomes larger due to distortion, and a pixel on the left side in an affine-MC block that is adjacent to and on the right of the first affine-MC block becomes smaller due to distortion. This causes discontinuity of boundary pixel values of reconstructed pixels in the affine-MC blocks, and impairs subjective and objective effects. Therefore, the reconstructed signal needs to be filtered.

Optionally, in this embodiment of the present disclosure, filtering may be performed by using a low-pass filter, so that a pixel value in a boundary region changes more smoothly. For example, filtering is performed by using a Gauss filter. However, this is not limited in the present disclosure.

Optionally, in this embodiment of the present disclosure, filtering may be performed by using an overlapped block motion compensation (Overlapped block motion compensation, OBMC for short) method. Motion compensation prediction is performed on a to-be-filtered pixel by using a motion vector of an affine-MC block adjacent to the to-be-filtered pixel, and weighted averaging is performed on an obtained motion compensation prediction signal and a motion compensation prediction signal obtained by using a motion vector of the to-be-filtered pixel, to obtain a final motion compensation prediction signal.

According to the video image encoding method in this embodiment of the present disclosure, the decoding device determines the size of the affine motion compensation image sub-block based on the determined motion vector difference and motion vector precision of the affine image block, and the distance between the control points, and further adjusts the size of the affine motion compensation image sub-block based on a relationship between the size of the affine image block and the size of the affine motion compensation image sub-block, so that the size of the affine motion compensation image sub-block is easy to implement, and complexity is reduced. It is proved by using experiments that, in the present disclosure, complexity on the encoder side can be reduced by 50%, complexity on the decoder side can be reduced by 70%, and 90% to 95% of performance is maintained. Therefore, a motion compensation prediction technology based on an affine model can be effectively applied in practice.

Figure 17:
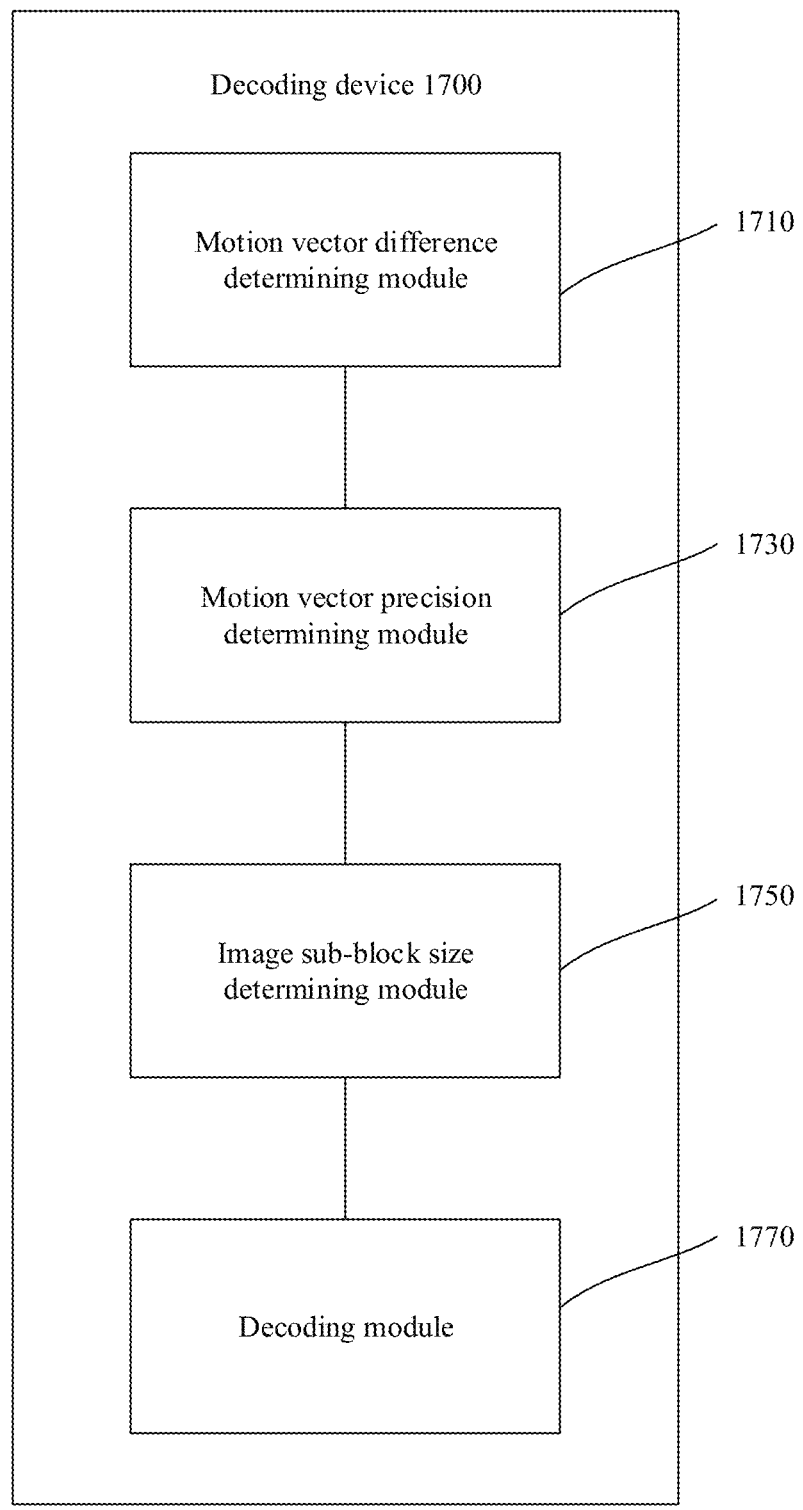
FIG. 17 is a schematic block diagram of a decoding apparatus according to an embodiment of the present disclosure.

The following describes a decoding apparatus 1700 for implementing the present disclosure with reference to FIG. 17. The decoding apparatus 1700 includes:

a motion vector difference determining module 1710, configured to determine a motion vector difference of an affine image block;

a motion vector precision determining module 1730, configured to determine motion vector precision of the affine image block;

an image sub-block size determining module 1750, configured to determine a size of an affine motion compensation image sub-block in the affine image block based on the motion vector difference, the motion vector precision, a distance between control points in the affine image block, and a size of the affine image block, where the size includes a length in a horizontal direction and a length in a vertical direction, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and the control points are pixels used to determine the motion vector difference; and a decoding module 1770, configured to perform decoding processing on the affine image block based on the size of the affine motion compensation image sub-block.

Specifically, the decoding apparatus determines the motion vector difference of the affine image block based on the determined control points, determines the motion vector precision of the affine image block, and determines the size of the affine motion compensation image sub-block in the affine image block based on the determined motion vector difference and motion vector precision, the distance between the control points, and the size of the affine image block, where the size of the affine motion compensation image sub-block is a size used for splitting the affine image block, and the affine image block is split into a plurality of affine motion compensation image sub-blocks with a same size based on the split size. Then, the decoding apparatus decodes the affine image block based on the affine motion compensation image sub-blocks. The modules of the decoding apparatus implement functions of various execution steps included in the decoding method of the present disclosure. To be specific, the modules implement functions of all method steps in the decoding method of the present disclosure, for example, the steps S710 to S740 and extensions and variations of these steps. For details, refer to descriptions of the decoding method in this specification. For brevity, details are not described herein again.

Figure 18:
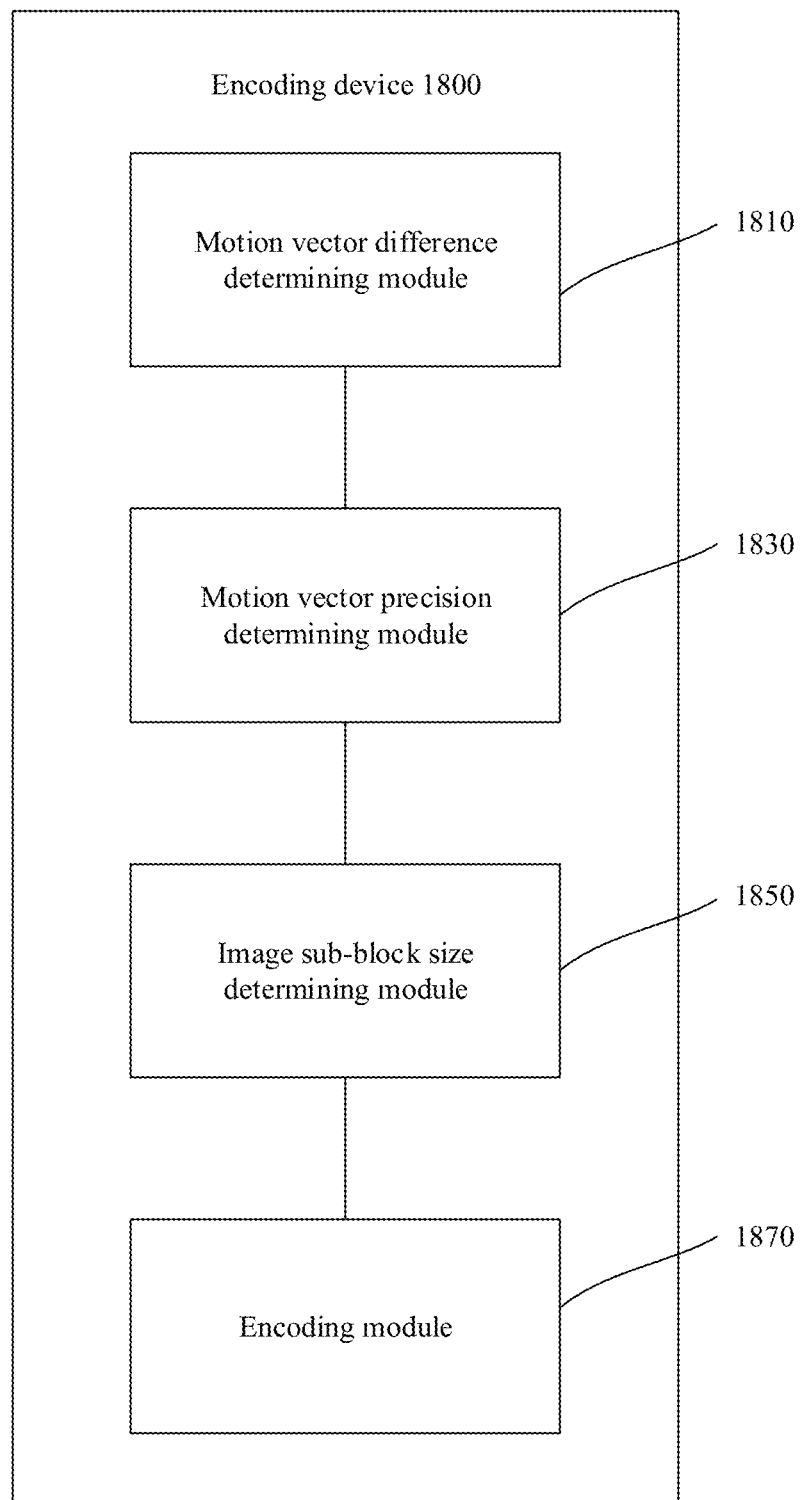
FIG. 18 is a schematic block diagram of an encoding apparatus according to an embodiment of the present disclosure.

The following describes in detail an encoding apparatus according to an embodiment of the present disclosure with reference to FIG. 18. The encoding apparatus 1800 includes:

a motion vector difference determining module 1810, configured to determine a motion vector difference of an affine image block;

a motion vector precision determining module 1830, configured to determine motion vector precision of the affine image block;

an image sub-block size determining module 1850, configured to determine a size of an affine motion compensation image sub-block in the affine image block based on the motion vector difference, the motion vector precision, a distance between control points in the affine image block, and a size of the affine image block, where the size includes a length in a horizontal direction and a length in a vertical direction, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and the control points are pixels used to determine the motion vector difference; and an encoding module 1870, configured to perform encoding processing on the affine image block based on the size of the affine motion compensation image sub-block.

Specifically, the encoding apparatus determines the motion vector difference of the affine image block based on the determined control points, determines the motion vector precision of the affine image block, and determines the size of the affine motion compensation image sub-block in the affine image block based on the determined motion vector difference and motion vector precision, the distance between the control points, and the size of the affine image block, where the size of the affine motion compensation image sub-block is a size used for splitting the affine image block, and the affine image block is split into a plurality of affine motion compensation image sub-blocks with a same size based on the split size. Then, the encoding apparatus encodes the affine image block based on the affine motion compensation image sub-blocks. The modules of the encoding apparatus implement functions of various execution steps included in the encoding method of the present disclosure. To be specific, the modules implement functions of all method steps in the encoding method of the present disclosure, for example, the steps S1410 to S1470 and extensions and variations of these steps. For details, refer to descriptions of the encoding method in this specification. For brevity, details are not described in this specification again.

Figure 19:
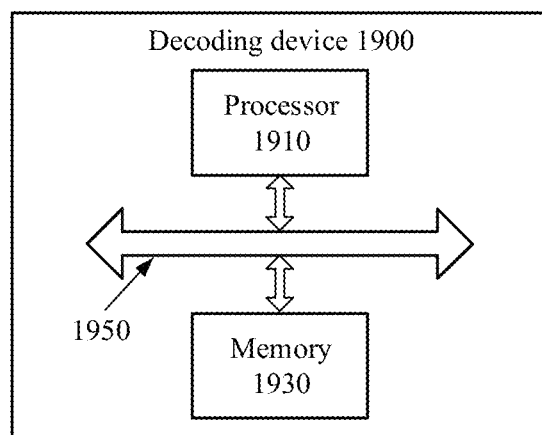
FIG. 19 is a schematic block diagram of a decoding device according to an embodiment of the present disclosure.

As shown in FIG. 19, an embodiment of the present disclosure further provides a decoding device 1900, including a processor 1910, a memory 1930, and a bus system 1950. The processor and the memory are connected by using the bus system. The memory is configured to store an instruction. The processor is configured to execute the instruction stored in the memory. The memory of the decoding device stores program code. The processor may invoke the program code stored in the memory, to perform all steps and extensions of the steps in the decoding method 700 of the present disclosure, that is, all methods described in FIG. 7 to FIG. 13.

For example, the processor may invoke the program code stored in the memory, to perform complete operations in the decoding method of the present disclosure:

determining a motion vector difference of an affine image block;

determining motion vector precision of the affine image block;

determining a size of an affine motion compensation image sub-block in the affine image block based on the motion vector difference, the motion vector precision, a distance between control points in the affine image block, and a size of the affine image block, where the size includes a length in a horizontal direction and a length in a vertical direction, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and the control points are pixels used to determine the motion vector difference; and performing decoding processing on the affine image block based on the size of the affine motion compensation image sub-block.

In the decoding process, an image sub-block with an appropriate size can be selected, and the size of the image sub-block is adjusted, so that the affine image block is split into a plurality of affine motion compensation image sub-blocks with a same size. In this way, decoding complexity is reduced, and decoding performance is improved.

It should be understood that, in this embodiment of the present disclosure, the processor 1910 may be a central processing unit (Central Processing Unit, CPU for short). Alternatively, the processor 1910 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 1930 may include a read-only memory and a random access memory, and provide an instruction and data to the processor 1910. A part of the memory 1930 may further include a nonvolatile random access memory. For example, the memory 1930 may further store information about a device type.

In addition to a data bus, the bus system 1950 may further include a power bus, a control bus, a status signal bus, and the like. However, for clear description, various types of buses in the figure are marked as the bus system 1950.

In an implementation process, the steps of the foregoing methods can be implemented by using a hardware integrated logic circuit in the processor 1910, or by using an instruction in a form of software. The steps of the methods disclosed with reference to the embodiments of the present disclosure may be directly performed by a hardware processor, or may be performed by using a combination of hardware of the processor and a software module. The software module may be located in a mature storage medium in the art, such as a random access memory, a flash memory, a read-only memory, a programmable read-only memory, an electrically erasable programmable memory, or a register. The storage medium is located in the memory 1930, and the processor 1910 reads information from the memory 1930 and completes the steps of the foregoing methods in combination with the hardware of the processor.

Figure 20:
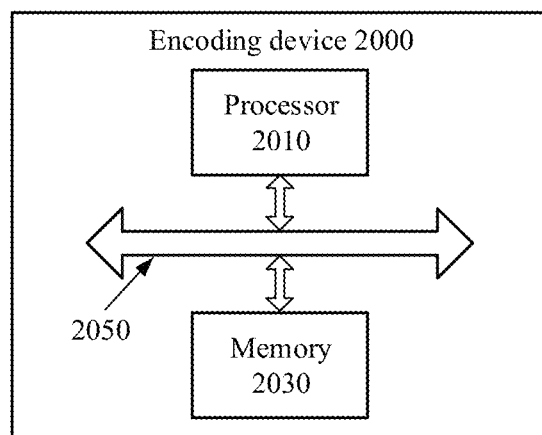
FIG. 20 is a schematic block diagram of an encoding device according to an embodiment of the present disclosure.

As shown in FIG. 20, an embodiment of the present disclosure further provides an encoding device 2000, including a processor 2010, a memory 2030, and a bus system 2050. The processor 2010 and the memory 2030 are connected by using the bus system 2050. The memory 2030 is configured to store an instruction. The processor 2010 is configured to execute the instruction stored in the memory 2030. The memory 2030 of the encoding device 2000 stores program code. The processor 2010 may invoke the program code stored in the memory 2030, to perform all steps and extensions of the steps in the encoding method 1400 of the present disclosure, that is, all method steps described in FIG. 14 to FIG. 16. For example, the processor 2010 may invoke the program code stored in the memory 2030, to perform the following operations:

determining a motion vector difference of an affine image block;

determining motion vector precision of the affine image block;

determining a size of an affine motion compensation image sub-block in the affine image block based on the motion vector difference, the motion vector precision, a distance between control points in the affine image block, and a size of the affine image block, where the size includes a length in a horizontal direction and a length in a vertical direction, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction; and the control points are pixels used to determine the motion vector difference; and performing encoding processing on the affine image block based on the size of the affine motion compensation image sub-block.

In the encoding process, an image sub-block with an appropriate size can be selected, and the size of the image sub-block is adjusted, so that the affine image block is split into a plurality of affine motion compensation image sub-blocks with a same size. In this way, encoding complexity is reduced, and encoding performance is improved.

It should be understood that, in this embodiment of the present disclosure, the processor 2010 may be a central processing unit (Central Processing Unit, CPU for short). Alternatively, the processor 2010 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 2030 may include a read-only memory and a random access memory, and provide an instruction and data to the processor 2010. A part of the memory 2030 may further include a nonvolatile random access memory. For example, the memory 2030 may further store information about a device type.

In addition to a data bus, the bus system 2050 may further include a power bus, a control bus, a status signal bus, and the like. However, for clear description, various types of buses in the figure are marked as the bus system 2050.

In an implementation process, the steps of the foregoing methods can be implemented by using a hardware integrated logic circuit in the processor 2010, or by using an instruction in a form of software. The steps of the methods disclosed with reference to the embodiments of the present disclosure may be directly performed by a hardware processor, or may be performed by using a combination of hardware of the processor and a software module. The software module may be located in a mature storage medium in the art, such as a random access memory, a flash memory, a read-only memory, a programmable read-only memory, an electrically erasable programmable memory, or a register. The storage medium is located in the memory 2030, and the processor 2010 reads information from the memory 2030 and completes the steps of the foregoing methods in combination with the hardware of the processor. To avoid repetition, details are not described herein again.

What is claimed is:

1. A video image decoding method, comprising:
   determining a motion vector difference of an affine image block;
   determining a motion vector precision of the affine image block;
   determining a size of an affine motion compensation image sub-block in the affine image block based on the motion vector difference, the motion vector precision, a distance between control points in the affine image block, and a size of the affine image block, so that a length of the affine image block in a horizontal direction is an integer multiple of a length of the affine motion compensation image sub-block in the horizontal direction, and a length of the affine image block in a vertical direction is an integer multiple of a length of the affine motion compensation image sub-block in the vertical direction; and the control points are pixels used to determine the motion vector difference; and
   performing decoding processing on the affine image block based on the size of the affine motion compensation image sub-block.

2. The method according to claim 1, wherein the determining a size of an affine motion compensation image sub-block in the affine image block based on the motion vector difference, the motion vector precision, a distance between control points in the affine image block, and a size of the affine image block, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction comprises:
   proportionally adjusting a first horizontal distance based on a proportion of the motion vector precision to a first component of the motion vector difference, to obtain the length of the affine motion compensation image sub-block in the horizontal direction and the length of the affine motion compensation image sub-block in the vertical direction, wherein both the lengths of the affine motion compensation image sub-block in the horizontal direction and the vertical direction are an integer number of pixels;
   determining whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjusting the length of the affine motion compensation image sub-block in the horizontal direction, so that the length of the affine image block in the horizontal direction is an integer multiple of an adjusted length of the affine motion compensation image sub-block in the horizontal direction; and
   determining whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjusting the length of the affine motion compensation image sub-block in the vertical direction, so that the length of the affine image block in the vertical direction is an integer multiple of an adjusted length of the affine motion compensation image sub-block in the vertical direction.

3. The method according to claim 1, wherein the determining a size of an affine motion compensation image sub-block in the affine image block based on the motion vector difference, the motion vector precision, a distance between control points in the affine image block, and a size of the affine image block, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction comprises:
proportionally adjusting a first vertical distance based on a proportion of the motion vector precision to a second component of the motion vector difference, to obtain the length of the affine motion compensation image sub-block in the vertical direction and the length of the affine motion compensation image sub-block in the horizontal direction, wherein both the lengths of the affine motion compensation image sub-block in the vertical direction and the horizontal direction are an integer number of pixels;
determining whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjusting the length of the affine motion compensation image sub-block in the vertical direction, so that the length of the affine image block in the vertical direction is an integer multiple of an adjusted length of the affine motion compensation image sub-block in the vertical direction; and
determining whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjusting the length of the affine motion compensation image sub-block in the horizontal direction, so that the length of the affine image block in the horizontal direction is an integer multiple of an adjusted length of the affine motion compensation image sub-block in the horizontal direction.

4. The method according to claim 1, wherein the determining a size of an affine motion compensation image sub-block in the affine image block based on the motion vector difference, the motion vector precision, a distance between control points in the affine image block, and a size of the affine image block, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction comprises:
proportionally adjusting a first horizontal distance based on a proportion of the motion vector precision to a first component of the motion vector difference, to obtain the length of the affine motion compensation image sub-block in the horizontal direction, wherein the length of the affine motion compensation image sub-block in the horizontal direction is an integer number of pixels;
determining whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjusting the length of the affine motion compensation image sub-block in the horizontal direction, so that the length of the affine image block in the horizontal direction is an integer multiple of an adjusted length of the affine motion compensation image sub-block in the horizontal direction;
proportionally adjusting a first vertical distance based on a proportion of the motion vector precision to a second component of the motion vector difference, to obtain the length of the affine motion compensation image sub-block in the vertical direction, wherein the length of the affine motion compensation image sub-block in the vertical direction is an integer number of pixels; and
determining whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjusting the length of the affine motion compensation image sub-block in the vertical direction, so that the length of the affine image block in the vertical direction is an integer multiple of an adjusted length of the affine motion compensation image sub-block in the vertical direction.

5. The method according to claim 2, further comprising determining at least one of that the length of the affine image block in the horizontal direction is not an integer multiple of the length of the affine motion compensation image sub-block in the horizontal direction, or that the length of the affine image block in the vertical direction is not an integer multiple of the length of the affine motion compensation image sub-block in the vertical direction, and wherein
the adjusting the length of the affine motion compensation image sub-block in the horizontal direction, so that the length of the affine image block in the horizontal direction is an integer multiple of an adjusted length of the affine motion compensation image sub-block in the horizontal direction comprises:
adjusting, that is, increasing/decreasing, the length of the affine motion compensation image sub-block in the horizontal direction by one or more pixels; and
determining whether the length of the affine image block in the horizontal direction is an integer multiple of an adjusted length of the affine motion compensation image sub-block in the horizontal direction, and if the length of the affine image block in the horizontal direction is not an integer multiple of the adjusted length of the affine motion compensation image sub-block in the horizontal direction, repeating the adjusting and determining steps until the length of the affine image block in the horizontal direction is an integer multiple of an adjusted length of the affine motion compensation image sub-block in the horizontal direction; and
the adjusting the length of the affine motion compensation image sub-block in the vertical direction, so that the length of the affine image block in the vertical direction is an integer multiple of an adjusted length of the affine motion compensation image sub-block in the vertical direction comprises:
adjusting, that is, increasing/decreasing, the length of the affine motion compensation image sub-block in the vertical direction by one or more pixels; and
determining whether the length of the affine image block in the vertical direction is an integer multiple of an adjusted length of the affine motion compensation image sub-block in the vertical direction, and if the length of the affine image block in the vertical direction is not an integer multiple of the adjusted length of the affine motion compensation image sub-block in the vertical direction, repeating the adjusting and determining steps until the length of the affine image block in the vertical direction is an integer multiple of an adjusted length of the affine motion compensation image sub-block in the vertical direction.

6. The method according to claim 2, further comprising determining at least one of that the length of the affine image block in the horizontal direction is not an integer multiple of the length of the affine motion compensation image sub-block in the horizontal direction, or that the length of the affine image block in the vertical direction is not an integer multiple of the length of the affine motion compensation image sub-block in the vertical direction, and wherein the adjusting the length of the affine motion compensation image sub-block in the horizontal direction, so that the length of the affine image block in the horizontal direction is an integer multiple of an adjusted length of the affine motion compensation image sub-block in the horizontal direction comprises:

adjusting, that is, increasing/decreasing, by one or more pixels, the length of the affine motion compensation image sub-block in the horizontal direction to a closest value by which the length of the affine image block in the horizontal direction is divisible; and determining whether the length of the affine image block in the horizontal direction is an integer multiple of an adjusted length of the affine motion compensation image sub-block in the horizontal direction, and if the length of the affine image block in the horizontal direction is not an integer multiple of the adjusted length of the affine motion compensation image sub-block in the horizontal direction, repeating the adjusting and determining steps until the length of the affine image block in the horizontal direction is an integer multiple of an adjusted length of the affine motion compensation image sub-block in the horizontal direction; and the adjusting the length of the affine motion compensation image sub-block in the vertical direction, so that the length of the affine image block in the vertical direction is an integer multiple of an adjusted length of the affine motion compensation image sub-block in the vertical direction comprises:

adjusting, that is, increasing/decreasing, by one or more pixels, the length of the affine motion compensation image sub-block in the vertical direction to a closest value by which the length of the affine image block in the vertical direction is divisible; and determining whether the length of the affine image block in the vertical direction is an integer multiple of an adjusted length of the affine motion compensation image sub-block in the vertical direction, and if the length of the affine image block in the vertical direction is not an integer multiple of the adjusted length of the affine motion compensation image sub-block in the vertical direction, repeating the adjusting and determining steps until the length of the affine image block in the vertical direction is an integer multiple of an adjusted length of the affine motion compensation image sub-block in the vertical direction.

7. The method according to claim 2, wherein the method further comprises:

determining that the adjusted length of the affine motion compensation image sub-block in at least one of the horizontal or vertical directions is not an integer multiple of a preset length S, and readjusting, that is, increasing/decreasing, the adjusted length of the affine motion compensation image sub-block in the at least one of the horizontal or vertical directions by one or more pixels, until a readjusted length of the affine motion compensation image sub-block in the at least one of the horizontal or vertical directions is an integer multiple of the preset length S, wherein S is equal to $2^n$ pixels, and n is zero or a positive integer.

8. The method according to claim 1, wherein the determining a size of an affine motion compensation image sub-block in the affine image block based on the motion vector difference, the motion vector precision, a distance between control points in the affine image block, and a size of the affine image block, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction comprises:

determining the size of the affine motion compensation image sub-block based on the motion vector difference, the motion vector precision, the distance between the control points in the affine image block, and the size of the affine image block by using a preset size table, wherein the preset size table stores sizes of the affine motion compensation image sub-block predetermined based on the motion vector difference, the motion vector precision, the distance between the control points in the affine image block, and the size of the affine image block, and the predetermined sizes of the affine motion compensation image sub-block meet the following conditions: the length of the affine image block in the horizontal direction is an integer multiple of the length of the affine motion compensation image sub-block in the horizontal direction, and the length of the affine image block in the vertical direction is an integer multiple of the length of the affine motion compensation image sub-block in the vertical direction.

9. The method according to claim 8, wherein the predetermined sizes of the affine motion compensation image sub-block further meet the following conditions: the length of the affine motion compensation image sub-block in the horizontal direction is an integer multiple of a preset length S, and the length of the affine motion compensation image sub-block in the vertical direction is an integer multiple of the preset length S, wherein S is equal to $2^n$ pixels, and n is zero or a positive integer.

10. A video image encoding method, comprising:
determining a motion vector difference of an affine image block;
determining motion vector precision of the affine image block;
determining a size of an affine motion compensation image sub-block in the affine image block based on the motion vector difference, the motion vector precision, a distance between control points in the affine image block, and a size of the affine image block, so that a length of the affine image block in a horizontal direction is an integer multiple of a length of the affine motion compensation image sub-block in the horizontal direction, and a length of the affine image block in a vertical direction is an integer multiple of a length of the affine motion compensation image sub-block in the vertical direction; and the control points are pixels used to determine the motion vector difference; and performing encoding processing on the affine image block based on the size of the affine motion compensation image sub-block.

11. The method according to claim 10, wherein the determining a size of an affine motion compensation image sub-block in the affine image block based on the motion vector difference, the motion vector precision, a distance between control points in the affine image block, and a size of the affine image block, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction comprises:

proportionally adjusting a first horizontal distance based on a proportion of the motion vector precision to a first component of the motion vector difference, to obtain the length of the affine motion compensation image sub-block in the horizontal direction and the length of the affine motion compensation image sub-block in the vertical direction, wherein both the lengths of the affine motion compensation image sub-block in the horizontal direction and the vertical direction are an integer number of pixels;

determining whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjusting the length of the affine motion compensation image sub-block in the horizontal direction, so that the length of the affine image block in the horizontal direction is an integer multiple of an adjusted length of the affine motion compensation image sub-block in the horizontal direction; and determining whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjusting the length of the affine motion compensation image sub-block in the vertical direction, so that the length of the affine image block in the vertical direction is an integer multiple of an adjusted length of the affine motion compensation image sub-block in the vertical direction.

12. The method according to claim 10, wherein the determining a size of an affine motion compensation image sub-block in the affine image block based on the motion vector difference, the motion vector precision, a distance between control points in the affine image block, and a size of the affine image block, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction comprises:

proportionally adjusting a first vertical distance based on a proportion of the motion vector precision to a second component of the motion vector difference, to obtain the length of the affine motion compensation image sub-block in the vertical direction and the length of the affine motion compensation image sub-block in the horizontal direction, wherein both the lengths of the affine motion compensation image sub-block in the vertical direction and the horizontal direction are an integer number of pixels;

determining whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjusting the length of the affine motion compensation image sub-block in the vertical direction, so that the length of the affine image block in the vertical direction is an integer multiple of an adjusted length of the affine motion compensation image sub-block in the vertical direction; and determining whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjusting the length of the affine motion compensation image sub-block in the horizontal direction, so that the length of the affine image block in the horizontal direction is an integer multiple of an adjusted length of the affine motion compensation image sub-block in the horizontal direction.

13. The method according to claim 10, wherein the determining a size of an affine motion compensation image sub-block in the affine image block based on the motion vector difference, the motion vector precision, a distance between control points in the affine image block, and a size of the affine image block, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction comprises:

proportionally adjusting a first horizontal distance based on a proportion of the motion vector precision to a first component of the motion vector difference, to obtain the length of the affine motion compensation image sub-block in the horizontal direction, wherein the length of the affine motion compensation image sub-block in the horizontal direction is an integer number of pixels;

determining whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjusting the length of the affine motion compensation image sub-block in the horizontal direction, so that the length of the affine image block in the horizontal direction is an integer multiple of an adjusted length of the affine motion compensation image sub-block in the horizontal direction;

proportionally adjusting a first vertical distance based on a proportion of the motion vector precision to a second component of the motion vector difference, to obtain the length of the affine motion compensation image sub-block in the vertical direction, wherein the length of the affine motion compensation image sub-block in the vertical direction is an integer number of pixels; and determining whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjusting the length of the affine motion compensation image sub-block in the vertical direction, so that the length of the affine image block in the vertical direction is an integer multiple of an adjusted length of the affine motion compensation image sub-block in the vertical direction.

14. The method according to claim 11, further comprising determining at least one of that the length of the affine image block in the horizontal direction is not an integer multiple of the length of the affine motion compensation image sub-block in the horizontal direction, or that the length of the affine image block in the vertical direction is not an integer multiple of the length of the affine motion compensation image sub-block in the vertical direction, and wherein the adjusting the length of the affine motion compensation image sub-block in the horizontal direction, so that the length of the affine image block in the horizontal direction is an integer multiple of an adjusted length of the affine motion compensation image sub-block in the horizontal direction comprises:

adjusting, that is, increasing/decreasing, the length of the affine motion compensation image sub-block in the horizontal direction by one or more pixels; and determining whether the length of the affine image block in the horizontal direction is an integer multiple of an adjusted length of the affine motion compensation image sub-block in the horizontal direction, and if the length of the affine image block in the horizontal direction is not an integer multiple of the adjusted length of the affine motion compensation image sub-block in the horizontal direction, repeating the adjusting and determining steps until the length of the affine image block in the horizontal direction is an integer multiple of an adjusted length of the affine motion compensation image sub-block in the horizontal direction; and the adjusting the length of the affine motion compensation image sub-block in the vertical direction, so that the length of the affine image block in the vertical direction is an integer multiple of an adjusted length of the affine motion compensation image sub-block in the vertical direction comprises:

adjusting, that is, increasing/decreasing, the length of the affine motion compensation image sub-block in the vertical direction by one or more pixels; and determining whether the length of the affine image block in the vertical direction is an integer multiple of an adjusted length of the affine motion compensation image sub-block in the vertical direction, and if the length of the affine image block in the vertical direction is not an integer multiple of the adjusted length of the affine motion compensation image sub-block in the vertical direction, repeating the adjusting and determining steps until the length of the affine image block in the vertical direction is an integer multiple of an adjusted length of the affine motion compensation image sub-block in the vertical direction.

15. The method according to claim 11, further comprising determining at least one of that the length of the affine image block in the horizontal direction is not an integer multiple of the length of the affine motion compensation image sub-block in the horizontal direction, or that the length of the affine image block in the vertical direction is not an integer multiple of the length of the affine motion compensation image sub-block in the vertical direction, and wherein the adjusting the length of the affine motion compensation image sub-block in the horizontal direction, so that the length of the affine image block in the horizontal direction is an integer multiple of an adjusted length of the affine motion compensation image sub-block in the horizontal direction comprises:

adjusting, that is, increasing/decreasing, by one or more pixels, the length of the affine motion compensation image sub-block in the horizontal direction to a closest value by which the length of the affine image block in the horizontal direction is divisible; and determining whether the length of the affine image block in the horizontal direction is an integer multiple of an adjusted length of the affine motion compensation image sub-block in the horizontal direction, and if the length of the affine image block in the horizontal direction is not an integer multiple of the adjusted length of the affine motion compensation image sub-block in the horizontal direction, repeating the adjusting and determining steps until the length of the affine image block in the horizontal direction is an integer multiple of an adjusted length of the affine motion compensation image sub-block in the horizontal direction; and the adjusting the length of the affine motion compensation image sub-block in the vertical direction, so that the length of the affine image block in the vertical direction is an integer multiple of an adjusted length of the affine motion compensation image sub-block in the vertical direction comprises:

adjusting, that is, increasing/decreasing, by one or more pixels, the length of the affine motion compensation image sub-block in the vertical direction to a closest value by which the length of the affine image block in the vertical direction is divisible; and determining whether the length of the affine image block in the vertical direction is an integer multiple of an adjusted length of the affine motion compensation image sub-block in the vertical direction, and if the length of the affine image block in the vertical direction is not an integer multiple of the adjusted length of the affine motion compensation image sub-block in the vertical direction, repeating the adjusting and determining steps until the length of the affine image block in the vertical direction is an integer multiple of an adjusted length of the affine motion compensation image sub-block in the vertical direction.

16. The method according to claim 11, wherein the method further comprises:
  determining that the adjusted length of the affine motion compensation image sub-block in at least one of the horizontal or vertical directions is not an integer multiple of a preset length S, and
  readjusting, that is, increasing/decreasing, the adjusted length of the affine motion compensation image sub-block in the at least one of the horizontal or vertical directions by one or more pixels, until a readjusted length of the affine motion compensation image sub-block in the at least one of the horizontal or vertical directions is an integer multiple of the preset length S, wherein S is equal to $2^n$ pixels, and n is zero or a positive integer.

17. The method according to claim 10, wherein the determining a size of an affine motion compensation image sub-block in the affine image block based on the motion vector difference, the motion vector precision, a distance between control points in the affine image block, and a size of the affine image block, so that a length of the affine image block in the horizontal direction is an integer multiple of the length of the affine motion compensation image sub-block in the horizontal direction, and a length of the affine image block in the vertical direction is an integer multiple of the length of the affine motion compensation image sub-block in the vertical direction comprises:
  determining the size of the affine motion compensation image sub-block based on the motion vector difference, the motion vector precision, the distance between the control points in the affine image block, and the size of the affine image block by using a preset size table, wherein the preset size table stores sizes of the affine motion compensation image sub-block predetermined based on the motion vector difference, the motion vector precision, the distance between the control points in the affine image block, and the size of the affine image block, and the predetermined sizes of the affine motion compensation image sub-block meet the following conditions: the length of the affine image block in the horizontal direction is an integer multiple of the length of the affine motion compensation image sub-block in the horizontal direction, and the length of the affine image block in the vertical direction is an integer multiple of the length of the affine motion compensation image sub-block in the vertical direction.

18. The method according to claim 17, wherein the predetermined sizes of the affine motion compensation image sub-block further meet the following conditions: the length of the affine motion compensation image sub-block in the horizontal direction is an integer multiple of a preset length S, and the length of the affine motion compensation image sub-block in the vertical direction is an integer multiple of the preset length S, wherein S is equal to $2^n$ pixels, and n is zero or a positive integer.

19. A video image decoding apparatus, comprising:
  a motion vector difference determining module, configured to determine a motion vector difference of an affine image block;
  a motion vector precision determining module, configured to determine motion vector precision of the affine image block;
  an image sub-block size determining module, configured to determine a size of an affine motion compensation image sub-block in the affine image block based on the motion vector difference, the motion vector precision, a distance between control points in the affine image block, and a size of the affine image block, so that a length of the affine image block in a horizontal direction is an integer multiple of a length of the affine motion compensation image sub-block in the horizontal direction, and a length of the affine image block in a vertical direction is an integer multiple of a length of the affine motion compensation image sub-block in the vertical direction; and the control points are pixels used to determine the motion vector difference; and
  a decoding module, configured to perform decoding processing on the affine image block based on the size of the affine motion compensation image sub-block.

20. The apparatus according to claim 19, wherein the image sub-block size determining module is configured to:
  proportionally adjust a first horizontal distance based on a proportion of the motion vector precision to a first component of the motion vector difference, to obtain the length of the affine motion compensation image sub-block in the horizontal direction and the length of the affine motion compensation image sub-block in the vertical direction, wherein both the lengths of the affine motion compensation image sub-block in the horizontal direction and the vertical direction are an integer number of pixels;
  determine whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjust the length of the affine motion compensation image sub-block in the horizontal direction, so that the length of the affine image block in the horizontal direction is an integer multiple of an adjusted length of the affine motion compensation image sub-block in the horizontal direction; and
  determine whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjust the length of the affine motion compensation image sub-block in the vertical direction, so that the length of the affine image block in the vertical direction is an integer multiple of an adjusted length of the affine motion compensation image sub-block in the vertical direction.

21. The apparatus according to claim 19, wherein the image sub-block size determining module is configured to:
  proportionally adjust a first vertical distance based on a proportion of the motion vector precision to a second component of the motion vector difference, to obtain the length of the affine motion compensation image sub-block in the vertical direction and the length of the affine motion compensation image sub-block in the horizontal direction, wherein both the lengths of the affine motion compensation image sub-block in the vertical direction and the horizontal direction are an integer number of pixels;
  determine whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjust the length of the affine motion compensation image sub-block in the vertical direction, so that the length of the affine image block in the vertical direction is an integer multiple of an adjusted length of the affine motion compensation image sub-block in the vertical direction; and determine whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjust the length of the affine motion compensation image sub-block in the horizontal direction, so that the length of the affine image block in the horizontal direction is an integer multiple of an adjusted length of the affine motion compensation image sub-block in the horizontal direction.

22. The apparatus according to claim 19, wherein the image sub-block size determining module is configured to:

proportionally adjust a first horizontal distance based on a proportion of the motion vector precision to a first component of the motion vector difference, to obtain the length of the affine motion compensation image sub-block in the horizontal direction, wherein the length of the affine motion compensation image sub-block in the horizontal direction is an integer number of pixels;

determine whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjust the length of the affine motion compensation image sub-block in the horizontal direction, so that the length of the affine image block in the horizontal direction is an integer multiple of an adjusted length of the affine motion compensation image sub-block in the horizontal direction;

proportionally adjust a first vertical distance based on a proportion of the motion vector precision to a second component of the motion vector difference, to obtain the length of the affine motion compensation image sub-block in the vertical direction, wherein the length of the affine motion compensation image sub-block in the vertical direction is an integer number of pixels; and determine whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjust the length of the affine motion compensation image sub-block in the vertical direction, so that the length of the affine image block in the vertical direction is an integer multiple of an adjusted length of the affine motion compensation image sub-block in the vertical direction.

23. The apparatus according to claim 20, wherein the image sub-block size determining module is further configured to:

adjust, that is, increase/decrease, the length of the affine motion compensation image sub-block in the horizontal direction by one or more pixels;

determine whether the length of the affine image block in the horizontal direction is an integer multiple of an adjusted length of the affine motion compensation image sub-block in the horizontal direction, and if the length of the affine image block in the horizontal direction is not an integer multiple of the adjusted length of the affine motion compensation image sub-block in the horizontal direction, repeat the adjusting and determining steps until the length of the affine image block in the horizontal direction is an integer multiple of an adjusted length of the affine motion compensation image sub-block in the horizontal direction;

adjust, that is, increase/decrease, the length of the affine motion compensation image sub-block in the vertical direction by one or more pixels; and determine whether the length of the affine image block in the vertical direction is an integer multiple of an adjusted length of the affine motion compensation image sub-block in the vertical direction, and if the length of the affine image block in the vertical direction is not an integer multiple of the adjusted length of the affine motion compensation image sub-block in the vertical direction, repeat the adjusting and determining steps until the length of the affine image block in the vertical direction is an integer multiple of an adjusted length of the affine motion compensation image sub-block in the vertical direction.

24. The apparatus according to claim 20, wherein the image sub-block size determining module is further configured to:

adjust, that is, increase/decrease, by one or more pixels, the length of the affine motion compensation image sub-block in the horizontal direction to a closest value by which the length of the affine image block in the horizontal direction is divisible;

determine whether the length of the affine image block in the horizontal direction is an integer multiple of an adjusted length of the affine motion compensation image sub-block in the horizontal direction, and if the length of the affine image block in the horizontal direction is not an integer multiple of the adjusted length of the affine motion compensation image sub-block in the horizontal direction, repeat the adjusting and determining steps until the length of the affine image block in the horizontal direction is an integer multiple of an adjusted length of the affine motion compensation image sub-block in the horizontal direction;

adjust, that is, increase/decrease, by one or more pixels, the length of the affine motion compensation image sub-block in the vertical direction to a closest value by which the length of the affine image block in the vertical direction is divisible; and determine whether the length of the affine image block in the vertical direction is an integer multiple of an adjusted length of the affine motion compensation image sub-block in the vertical direction, and if the length of the affine image block in the vertical direction is not an integer multiple of the adjusted length of the affine motion compensation image sub-block in the vertical direction, repeat the adjusting and determining steps until the length of the affine image block in the vertical direction is an integer multiple of an adjusted length of the affine motion compensation image sub-block in the vertical direction.

25. The apparatus according to claim 20, wherein the image sub-block size determining module is further configured to:
   determine whether the adjusted length of the affine motion compensation image sub-block in at least one of the horizontal or vertical directions is not an integer multiple of a preset length S, and
   readjust, that is, increasing/decreasing, the adjusted length of the affine motion compensation image sub-block in the at least one of the horizontal or vertical directions by one or more pixels, until a readjusted length of the affine motion compensation image sub-block in the at least one of the horizontal or vertical directions is an integer multiple of the preset length S, wherein S is equal to $2^n$ pixels, and n is zero or a positive integer.

26. The apparatus according to claim 19, wherein the image sub-block size determining module is configured to:
   determine the size of the affine motion compensation image sub-block based on the motion vector difference, the motion vector precision, the distance between the control points in the affine image block, and the size of the affine image block by using a preset size table, wherein the preset size table stores sizes of the affine motion compensation image sub-block predetermined based on the motion vector difference, the motion vector precision, the distance between the control points in the affine image block, and the size of the affine image block, and the predetermined sizes of the affine motion compensation image sub-block meet the following conditions: the length of the affine image block in the horizontal direction is an integer multiple of the length of the affine motion compensation image sub-block in the horizontal direction, and the length of the affine image block in the vertical direction is an integer multiple of the length of the affine motion compensation image sub-block in the vertical direction.

27. The apparatus according to claim 26, wherein the predetermined sizes of the affine motion compensation image sub-block further meet the following conditions: the length of the affine motion compensation image sub-block in the horizontal direction is an integer multiple of a preset length S, and the length of the affine motion compensation image sub-block in the vertical direction is an integer multiple of the preset length S, wherein S is equal to $2^n$ pixels, and n is zero or a positive integer.

28. A video image encoding apparatus, comprising:
   a motion vector difference determining module, configured to determine a motion vector difference of an affine image block;
   a motion vector precision determining module, configured to determine motion vector precision of the affine image block;
   an image sub-block size determining module, configured to determine a size of an affine motion compensation image sub-block in the affine image block based on the motion vector difference, the motion vector precision, a distance between control points in the affine image block, and a size of the affine image block, so that a length of the affine image block in a horizontal direction is an integer multiple of a length of the affine motion compensation image sub-block in the horizontal direction, and a length of the affine image block in a vertical direction is an integer multiple of a length of the affine motion compensation image sub-block in the vertical direction; and the control points are pixels used to determine the motion vector difference; and
   an encoding module, configured to perform encoding processing on the affine image block based on the size of the affine motion compensation image sub-block.

29. The apparatus according to claim 28, wherein the image sub-block size determining module is configured to:
   proportionally adjust a first horizontal distance based on a proportion of the motion vector precision to a first component of the motion vector difference, to obtain the length of the affine motion compensation image sub-block in the horizontal direction and the length of the affine motion compensation image sub-block in the vertical direction, wherein both the lengths of the affine motion compensation image sub-block in the horizontal direction and the vertical direction are an integer number of pixels;
   determine whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjust the length of the affine motion compensation image sub-block in the horizontal direction, so that the length of the affine image block in the horizontal direction is an integer multiple of an adjusted length of the affine motion compensation image sub-block in the horizontal direction; and
   determine whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjust the length of the affine motion compensation image sub-block in the vertical direction, so that the length of the affine image block in the vertical direction is an integer multiple of an adjusted length of the affine motion compensation image sub-block in the vertical direction.

30. The apparatus according to claim 28, wherein the image sub-block size determining module is configured to:
   proportionally adjust a first vertical distance based on a proportion of the motion vector precision to a second component of the motion vector difference, to obtain the length of the affine motion compensation image sub-block in the vertical direction and the length of the affine motion compensation image sub-block in the horizontal direction, wherein both the lengths of the affine motion compensation image sub-block in the vertical direction and the horizontal direction are an integer number of pixels;
   determine whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjust the length of the affine motion compensation image sub-block in the vertical direction, so that the length of the affine image block in the vertical direction is an integer multiple of an adjusted length of the affine motion compensation image sub-block in the vertical direction; and determine whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjust the length of the affine motion compensation image sub-block in the horizontal direction, so that the length of the affine image block in the horizontal direction is an integer multiple of an adjusted length of the affine motion compensation image sub-block in the horizontal direction.

31. The method according to claim 28, wherein the image sub-block size determining module is configured to:
proportionally adjust a first horizontal distance based on a proportion of the motion vector precision to a first component of the motion vector difference, to obtain the length of the affine motion compensation image sub-block in the horizontal direction, wherein the length of the affine motion compensation image sub-block in the horizontal direction is an integer number of pixels;
determine whether the length of the affine image block in the horizontal direction is an integer multiple of the length of the affine motion compensation image sub-block in the horizontal direction, and if the length of the affine image block in the horizontal direction is not an integer multiple of the length of the affine motion compensation image sub-block in the horizontal direction, adjust the length of the affine motion compensation image sub-block in the horizontal direction, so that the length of the affine image block in the horizontal direction is an integer multiple of an adjusted length of the affine motion compensation image sub-block in the horizontal direction;
proportionally adjust a first vertical distance based on a proportion of the motion vector precision to a second component of the motion vector difference, to obtain the length of the affine motion compensation image sub-block in the vertical direction, wherein the length of the affine motion compensation image sub-block in the vertical direction is an integer number of pixels; and
determine whether the length of the affine image block in the vertical direction is an integer multiple of the length of the affine motion compensation image sub-block in the vertical direction, and if the length of the affine image block in the vertical direction is not an integer multiple of the length of the affine motion compensation image sub-block in the vertical direction, adjust the length of the affine motion compensation image sub-block in the vertical direction, so that the length of the affine image block in the vertical direction is an integer multiple of an adjusted length of the affine motion compensation image sub-block in the vertical direction.

32. The apparatus according to claim 29, wherein the image sub-block size determining module is further configured to:
adjust, that is, increase/decrease, the length of the affine motion compensation image sub-block in the horizontal direction by one or more pixels;
determine whether the length of the affine image block in the horizontal direction is an integer multiple of an adjusted length of the affine motion compensation image sub-block in the horizontal direction, and if the length of the affine image block in the horizontal direction is not an integer multiple of the adjusted length of the affine motion compensation image sub-block in the horizontal direction, repeat the adjusting and determining steps until the length of the affine image block in the horizontal direction is an integer multiple of an adjusted length of the affine motion compensation image sub-block in the horizontal direction;
adjust, that is, increase/decrease, the length of the affine motion compensation image sub-block in the vertical direction by one or more pixels; and
determine whether the length of the affine image block in the vertical direction is an integer multiple of an adjusted length of the affine motion compensation image sub-block in the vertical direction, and if the length of the affine image block in the vertical direction is not an integer multiple of the adjusted length of the affine motion compensation image sub-block in the vertical direction, repeat the adjusting and determining steps until the length of the affine image block in the vertical direction is an integer multiple of an adjusted length of the affine motion compensation image sub-block in the vertical direction.

33. The apparatus according to claim 29, wherein the image sub-block size determining module is further configured to:
adjust, that is, increase/decrease, by one or more pixels, the length of the affine motion compensation image sub-block in the horizontal direction to a closest value by which the length of the affine image block in the horizontal direction is divisible;
determine whether the length of the affine image block in the horizontal direction is an integer multiple of an adjusted length of the affine motion compensation image sub-block in the horizontal direction, and if the length of the affine image block in the horizontal direction is not an integer multiple of the adjusted length of the affine motion compensation image sub-block in the horizontal direction, repeat the adjusting and determining steps until the length of the affine image block in the horizontal direction is an integer multiple of an adjusted length of the affine motion compensation image sub-block in the horizontal direction;
adjust, that is, increase/decrease, by one or more pixels, the length of the affine motion compensation image sub-block in the vertical direction to a closest value by which the length of the affine image block in the vertical direction is divisible; and
determine whether the length of the affine image block in the vertical direction is an integer multiple of an adjusted length of the affine motion compensation image sub-block in the vertical direction, and if the length of the affine image block in the vertical direction is not an integer multiple of the adjusted length of the affine motion compensation image sub-block in the vertical direction, repeat the adjusting and determining steps until the length of the affine image block in the vertical direction is an integer multiple of an adjusted length of the affine motion compensation image sub-block in the vertical direction.

34. The apparatus according to claim 29, wherein the image sub-block size determining module is further configured to:
determine whether the adjusted length of the affine motion compensation image sub-block in at least one of the horizontal or vertical directions is not an integer multiple of a preset length S, and readjust, that is, increasing/decreasing, the adjusted length of the affine motion compensation image sub-block in the at least one of the horizontal or vertical directions by one or more pixels, until a readjusted length of the affine motion compensation image sub-block in the at least one of the horizontal or vertical directions is an integer multiple of the preset length S, wherein S is equal to $2^n$ pixels, and n is zero or a positive integer.

35. The method according to claim 28, wherein the image sub-block size determining module is configured to:
determine the size of the affine motion compensation image sub-block based on the motion vector difference, the motion vector precision, the distance between the control points in the affine image block, and the size of the affine image block by using a preset size table, wherein the preset size table stores sizes of the affine motion compensation image sub-block predetermined based on the motion vector difference, the motion vector precision, the distance between the control points in the affine image block, and the size of the affine image block, and the predetermined sizes of the affine motion compensation image sub-block meet the following conditions: the length of the affine image block in the horizontal direction is an integer multiple of the length of the affine motion compensation image sub-block in the horizontal direction, and the length of the affine image block in the vertical direction is an integer multiple of the length of the affine motion compensation image sub-block in the vertical direction.

36. The apparatus according to claim 35, wherein the predetermined sizes of the affine motion compensation image sub-block further meet the following conditions: the length of the affine motion compensation image sub-block in the horizontal direction is an integer multiple of a preset length S, and the length of the affine motion compensation image sub-block in the vertical direction is an integer multiple of the preset length S, wherein S is equal to $2^n$ pixels, and n is zero or a positive integer.

37. A decoding device, comprising a processor and a nonvolatile memory, wherein the processor invokes program code stored in the memory to implement the decoding method according to claim 1.

38. An encoding device, comprising a processor and a nonvolatile memory, wherein the processor invokes program code stored in the memory to implement the encoding method according to claim 10.

* * * * *